United States Patent
Maeda et al.

(10) Patent No.: US 10,708,449 B2
(45) Date of Patent: Jul. 7, 2020

(54) INFORMATION PROCESSING SYSTEM, TERMINAL DEVICE, AND INFORMATION PROCESSING DEVICE THAT USES SETTING RELATED INFORMATION, WHICH CORRESPONDS TO MANUAL ITEM DISPLAYED AT TERMINAL DEVICE

(71) Applicant: Oki Data Corporation, Tokyo (JP)

(72) Inventors: Masayuki Maeda, Tokyo (JP); Osamu Iijima, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/982,732

(22) Filed: May 17, 2018

(65) Prior Publication Data

US 2018/0352097 A1 Dec. 6, 2018

(30) Foreign Application Priority Data

May 30, 2017 (JP) .................................. 2017-106420
Feb. 9, 2018 (JP) .................................. 2018-022304

(51) Int. Cl.
*H04N 1/00* (2006.01)
*G06F 9/00* (2006.01)
(Continued)

(52) U.S. Cl.
CPC ..... *H04N 1/00408* (2013.01); *G06F 16/9566* (2019.01); *G06F 16/986* (2019.01);
(Continued)

(58) Field of Classification Search
CPC .... G06F 3/1205; G06F 3/1231; G06F 3/1232; G06F 3/1253; G06F 3/1257; G06F 3/1288; G06F 3/1292; G06F 3/1293
See application file for complete search history.

(56) References Cited

U.S. PATENT DOCUMENTS

| 2002/0055922 A1* | 5/2002 | Minowa | G06F 16/93 |
| 2002/0120682 A1* | 8/2002 | Funaki | H04L 67/18 |
| | | | 709/203 |

(Continued)

FOREIGN PATENT DOCUMENTS

JP 2015-118437 A 6/2015

*Primary Examiner* — Juan M Guillermety
(74) *Attorney, Agent, or Firm* — Muncy, Geissler, Olds & Lowe, P.C.

(57) ABSTRACT

An information processing system includes a terminal device and an information processing device. The terminal device has a first display part displaying first explanatory information and first setting related information, a first communication part that supplies a first information identifier corresponding to the first explanatory information displayed by the first display part to the information processing device, and receives first information corresponding to the first information identifier, and a control part that causes the first display part to display the first setting related information based on the first information, and the information processing device has a second communication part that receives the first information identifier supplied from the terminal device, and supplies the first information corresponding to the first information identifier to the terminal device, and a generation part that generates the first information corresponding to the first information identifier based on the first information identifier received by the second communication part.

22 Claims, 55 Drawing Sheets

(51) Int. Cl.
  *G09B 5/02* (2006.01)
  *G09B 19/00* (2006.01)
  *G06F 16/958* (2019.01)
  *G06F 16/955* (2019.01)
(52) U.S. Cl.
  CPC ............ *G09B 5/02* (2013.01); *G09B 19/0053* (2013.01); *H04N 1/00307* (2013.01); *H04N 1/00342* (2013.01); *H04N 2201/006* (2013.01); *H04N 2201/0041* (2013.01)

(56) References Cited

U.S. PATENT DOCUMENTS

| | | | | |
|---|---|---|---|---|
| 2002/0180579 A1* | 12/2002 | Nagaoka | ............ | H04L 12/2803 340/3.1 |
| 2008/0016449 A1* | 1/2008 | Ookuma | ............ | H04N 1/00244 715/744 |
| 2008/0094659 A1* | 4/2008 | Ito | ............ | G06F 3/1252 358/1.15 |
| 2009/0304228 A1* | 12/2009 | Ishikawa | ............ | H04N 1/32144 715/810 |
| 2012/0075658 A1* | 3/2012 | Yasui | ............ | G06F 3/1292 358/1.14 |
| 2013/0111318 A1* | 5/2013 | Fujino | ............ | G06F 3/04812 715/205 |
| 2014/0233060 A1* | 8/2014 | Anezaki | ............ | G06F 3/1292 358/1.15 |
| 2014/0240763 A1* | 8/2014 | Urakawa | ............ | G06F 3/1292 358/1.15 |
| 2014/0289289 A1* | 9/2014 | Fujioka | ............ | G06F 9/453 707/827 |
| 2014/0347696 A1* | 11/2014 | Otsuka | ............ | G06F 3/1293 358/1.15 |
| 2016/0301826 A1* | 10/2016 | Hiraike | ............ | H04N 1/32771 |

\* cited by examiner

Fig. 3

| Device Info. | Sheet | Destination List | Admin. Setting | Job List | Link |
| User Management | Usage Management | | | | |

SPA

Admin. Setting
- Network
  - General Network Setting
  - Wireless (Infrastructure) Setting
  - Wireless (AP Mode) Setting
  - Access Setting
  - TCP/IP
  - NBT
  - Mail Server Setting
  - Email
  - SNMP
  - IPP

Connection Setting

| Wireless (AP Mode) | Disabled ⌄ |
| SSID | abcdef |
| Password | ghi123 |
| IP Address | 192.168.0.10 |
| Channel | Auto ⌄ |
| AP Mode User Setting | Disabled ⌄ |

Fig. 4

| Device Info. | Direct Print | Link |

Device Info.
- Status
- Count
- Remaining Amount of Consume Item(s)
- Network
  - General Info.
  - Wireless Setting
  - Wireless Setting
- Maintenance
- System Info.

SPB

Wireless (AP Mode) Status
- Wireless (AP Mode): Disable
- IP Address: 192.168.0.10
- SSID: abcdef
- Channel:
- Connection Terminal No.:

TCP/IP Status
- IP Address Setting: Manual
- IP Address: 192.168.0.9
- Sub Net Mask: 255.255.252.0
- Gateway Address: 192.168.0.1
- IPv6 Address:

| Table Index | URL Info. of Manual Page MP | URL Info. of Device Setting Page SPA | URL Info. of Setting Confirmation Page SPB |
|---|---|---|---|
| [0] | http://XXX/XX0.html | http://YYY/YY0.html | http://ZZZ/ZZ0.html |
| [1] | http://XXX/XX1.html | http://YYY/YY1.html | http://ZZZ/ZZ1.html |
| [2] | http://XXX/XX2.html | http://YYY/YY2.html | http://ZZZ/ZZ2.html |
| ⋮ | ⋮ | ⋮ | ⋮ |

| Table Index | Application ID AID | Write Process Pointer |
|---|---|---|
| [0] | 10 | 0x0800 |
| [1] | −1 | |

| Table Index | Application ID AID | Address of NDEF Message Region 321 |
|---|---|---|
| [0] | 10 | 0x0000 |
| [1] | −1 | |

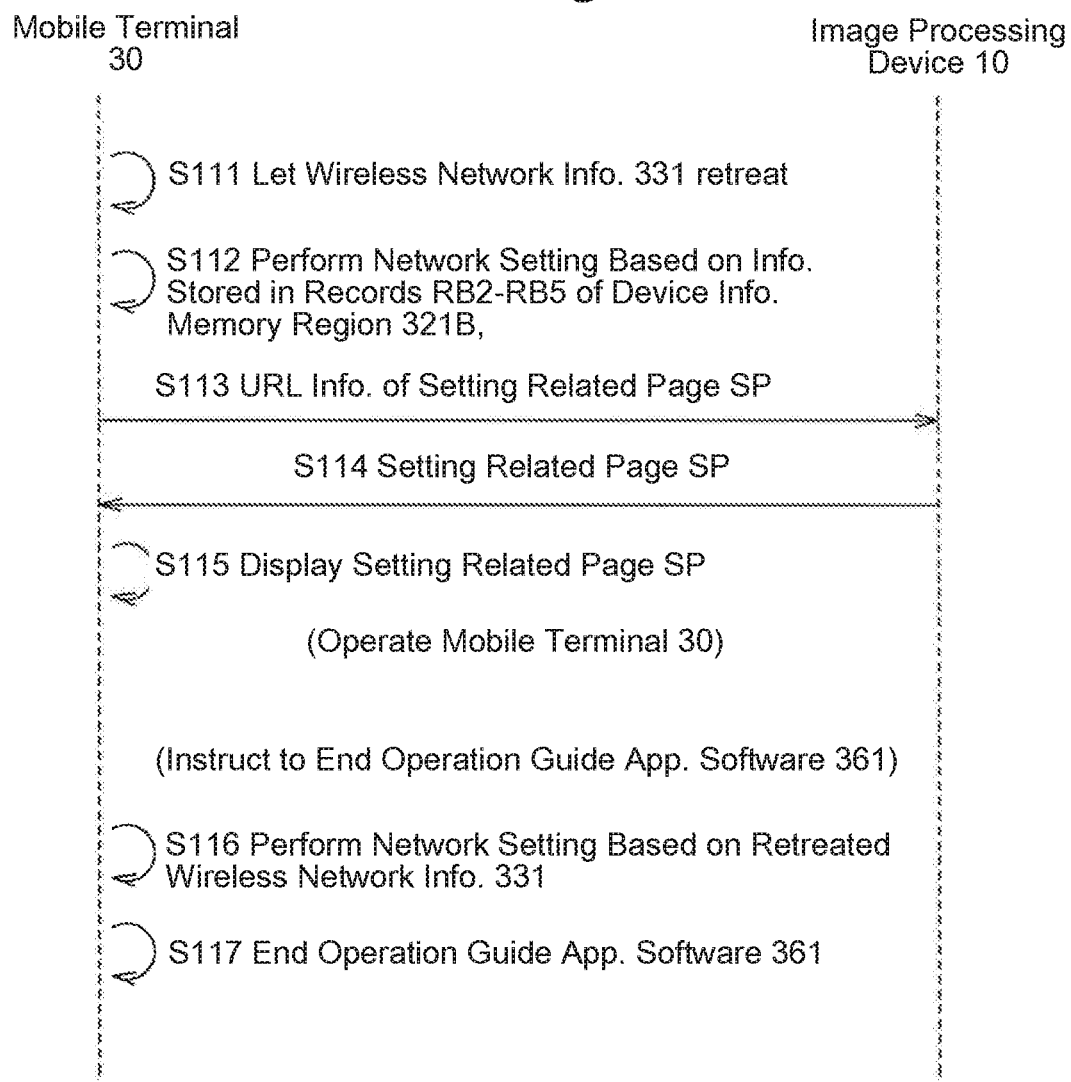

| Table Index | URL Info. of Manual Page MP | URL Info. of Job Setting Page SPC | Lock Flag |
|---|---|---|---|
| [0] | http://XXX/XX0.html | http://AAA/AA0.html | Display Lock Screen |
| [1] | http://XXX/XX1.html | http://AAA/AA1.html | Do Not Display Lock Screen |
| [2] | http://XXX/XX2.html | http://AAA/AA2.html | Do Not Display Lock Screen |
| ⋮ | ⋮ | ⋮ | ⋮ |

Fig. 29

| Table Index | URL Info. of Manual Page MP | Display Flag | URL Info. of Device Setting Page SPA | Hierarchy Info. INF |
|---|---|---|---|---|
| [0] | http://XXX/XX0.html | Image Processing Device | --- | 1-1-2 |
| [1] | http://XXX/XX1.html | Mobile Terminal | http://YYY/YY1.html | --- |
| [2] | http://XXX/XX2.html | Image Processing Device | --- | 1-2-1 |
| ... | ... | ... | ... | ... |

| Table Index | URL Info. of Manual Page MP | URL Info. of Device Setting Page SPA | URL Info. of Setting Confirmation Page SPB | Screen Identifier QID of Device Setting Screen SQA | Screen Identifier QID of Setting Confirmation Screen SQB |
|---|---|---|---|---|---|
| [0] | http://XXX/XX0.html | http://YYY/YY0.html | http://ZZZ/ZZ0.html | YYYYY1 | ZZZZZ1 |
| [1] | http://XXX/XX1.html | http://YYY/YY1.html | http://ZZZ/ZZ1.html | YYYYY2 | ZZZZZ2 |
| [2] | http://XXX/XX2.html | http://YYY/YY2.html | http://ZZZ/ZZ2.html | YYYYY3 | ZZZZZ3 |
| ... | ... | ... | ... | ... | ... |

623

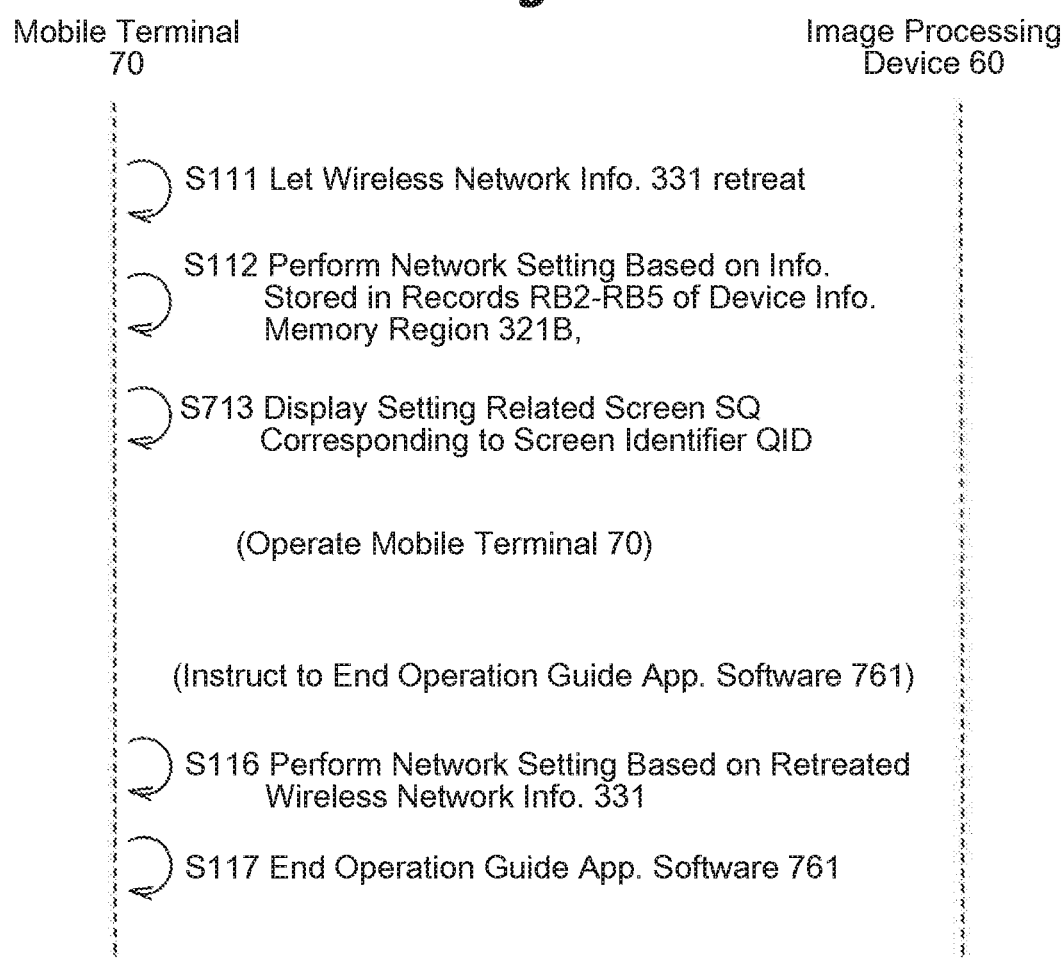

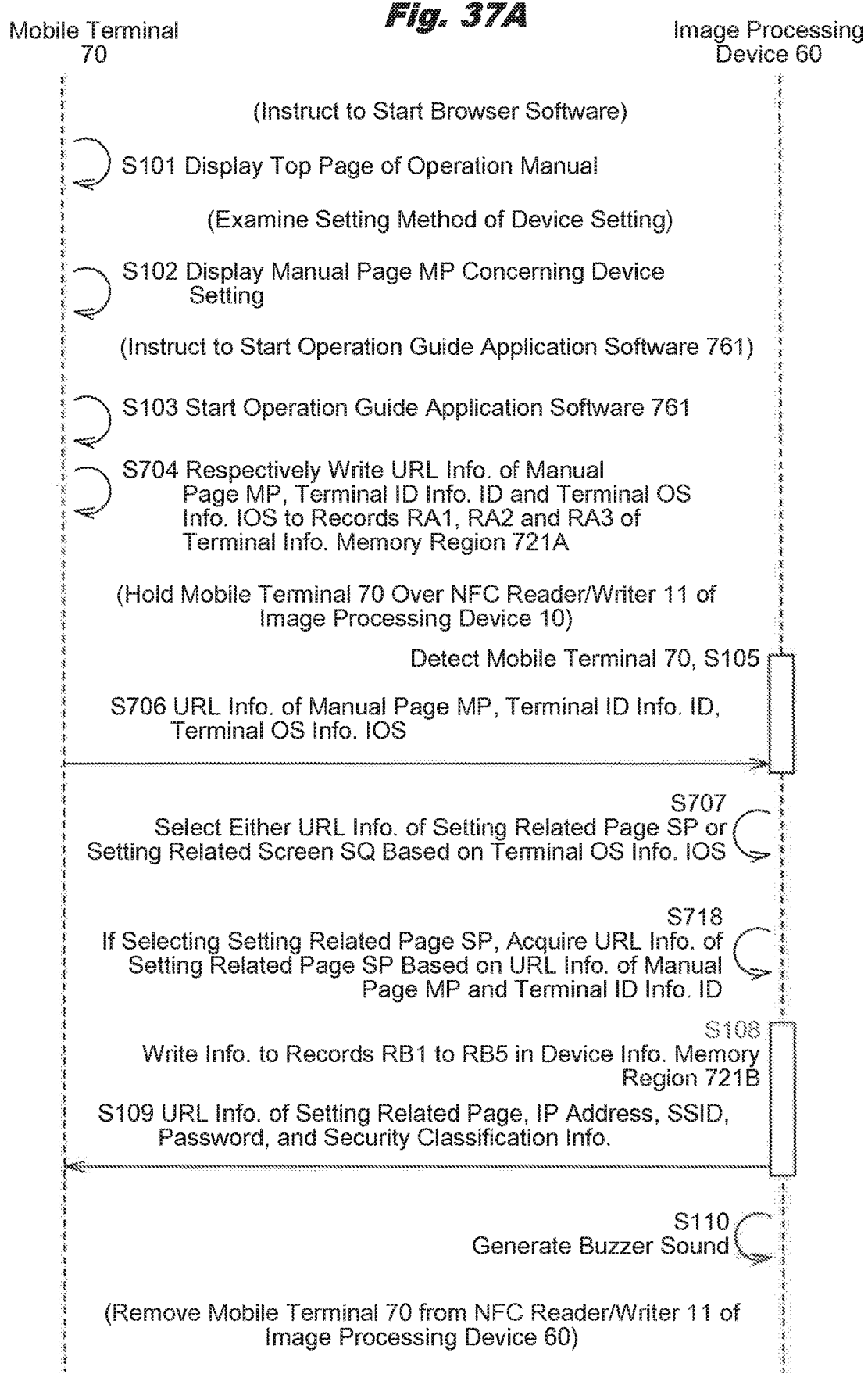

Fig. 41

| Table Index | URL Info. of Manual Page MP | Screen Identifier QID of Device Setting Screen SQA | Screen Identifier QID of Setting Confirmation Screen SQB | IP Address | SSIP | Password | Security Classification Info. |
|---|---|---|---|---|---|---|---|
| [0] | http://XXX/XX0.html | YYYYY3 | | 192.168.0.10 | abcdef | ghi123 | WPA |
| [1] | http://XXX/XX1.html | YYYYY9 | | 192.168.0.10 | abcdef | ghi123 | WPA |
| [2] | http://XXX/XX2.html | YYYYY7 | | 192.168.0.10 | abcdef | ghi123 | WPA |
| ... | ... | ... | ... | ... | ... | ... | ... |

Mobile Terminal 80          Image Processing Device 60

(Instruct to Start Browser Software)

S101 Display Top Page of Operation Manual (Examine Setting Method of Device Setting)

S102 Display Manual Page MP Concerning Operation Setting (Instruct to Start Operation Guide Application Software 861)

S103 Start Operation Guide Application Software 861

S803 Check Whether URL Info. of Manual Page MP Is Registered in History Database 863

S804 If URL Info. of Manual Page MP Is Registered in History Database 863, Acquire Screen Identifier QID Corresponding to URL, IP Address, SSID, Password and Security Classification Info.

S805 Let Wireless Network Info. 331 retreat

S806 Perform Network Setting

S807 Display Setting Related Screen SQ Corresponding to Screen Identifier QID (Operate Mobile Terminal 80)

(Instruct to End Operation Guide App. Software 861)

S116 Perform Network Setting Based on Retreated Wireless Network Info. 331

S117 End Operation Guide App. Software 861

Mobile Terminal 80     Fig. 43A     Image Processing Device 60

(Instruct to Start Browser Software)

S101 Display Top Page of Operation Manual (Examine Setting Method of Device Setting)

S102 Display Manual Page MP Concerning Operation Setting (Instruct to Start Operation Guide Application Software 861)

S103 Start Operation Guide Application Software 861

S803 Check Whether URL Info. of Manual Page MP Is Registered in History Database 863

S814 If URL Info. of Manual Page MP Is Not Registered in History Database 863, Respectively Write URL Info. of Manual Page, Terminal ID Info. ID, Terminal OS Info. IOS to Records RA1, RA2, RA3 in Terminal Info. Memory Region 721A (Hold Mobile Terminal 80 Over NFC Reader/Writer 11 of Image Processing Device 60)

Detect Mobile Terminal 80, S105

S706 URL Info. of Manual Page MP, Terminal ID Info. ID, Terminal OS Info. IOS

S707 Select Either URL Info. of Setting Related Page SP or Setting Related Screen SQ Based on Terminal OS Info. IOS S708 If Selecting Setting Related Screen SQ, Acquire Screen Identifier QID of Setting Related Screen SQ Based on URL Info. of Manual Page MP and Terminal ID Info. ID S709 Write Info. to Records RB1 to RB5 in Device Info. Memory Region 721B S710 Screen Identifier QID, IP Address, SSID, Password, and Security Classification Info.

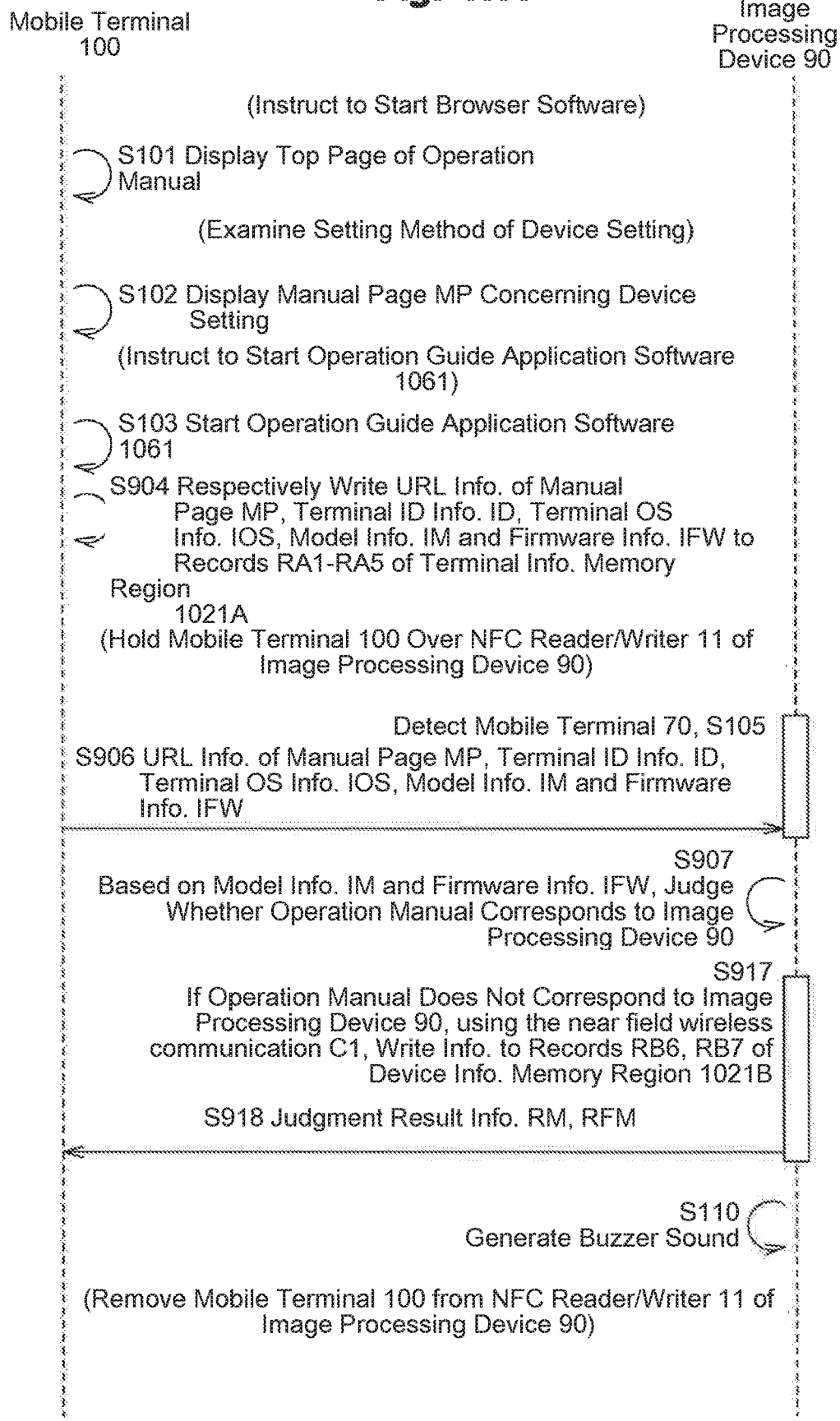

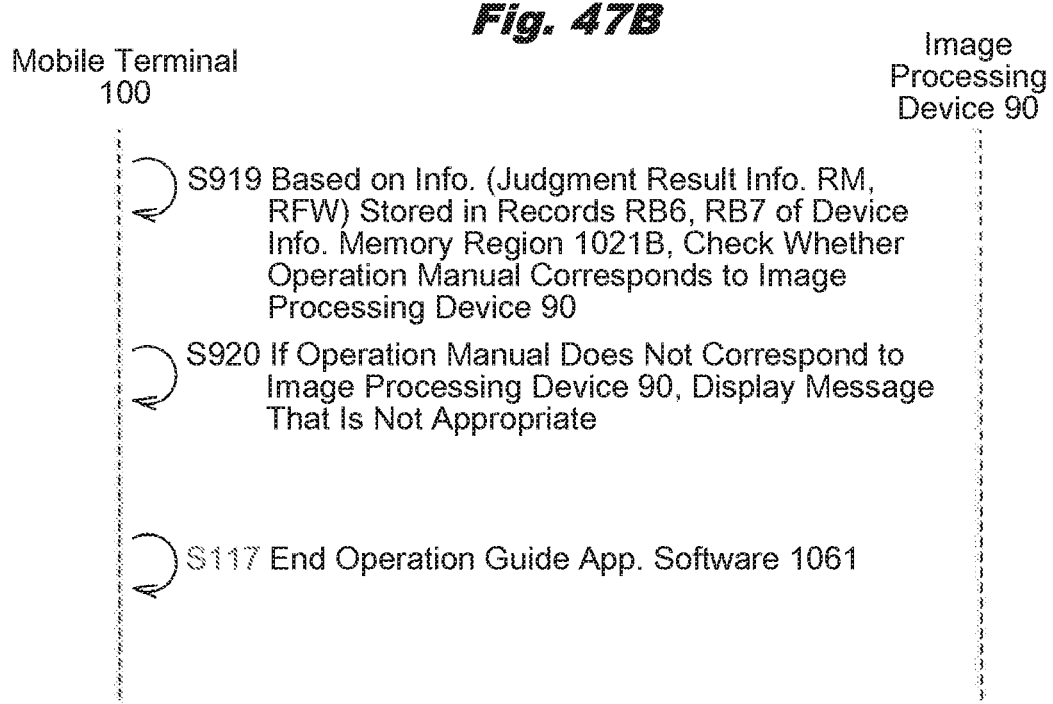

INFORMATION PROCESSING SYSTEM, TERMINAL DEVICE, AND INFORMATION PROCESSING DEVICE THAT USES SETTING RELATED INFORMATION, WHICH CORRESPONDS TO MANUAL ITEM DISPLAYED AT TERMINAL DEVICE

TECHNICAL FIELD

This invention relates to an information processing system, a terminal device used in an information processing system, and an image processing device used in an information processing system.

BACKGROUND

In recent years, operation manuals of electronic equipment etc. are often digitized. Also, such operation manuals are often viewed on mobile terminals. Disclosed in Patent Document 1 is an image forming system where an operation screen is displayed on an operation panel of an image forming apparatus according to a selected function in an operation manual displayed on a mobile terminal.

RELATED ART

[Patent Doc.]
[Patent Doc. 1] JP Laid-Open Patent Application Publication 2015-118437

By the way, in general, electronic equipment is desired to be highly convenient to its users, and further improvement in convenience is expected.

It is desirable to offer an information processing system, a terminal device, and an image processing device that can enhance user's convenience.

SUMMARY

An information processing system disclosed in the application includes a terminal device, and an information processing device, wherein the terminal device has a first display part that displays first explanatory information of the information processing device and first setting related information corresponding to the first explanatory information, a first communication part that supplies a first information identifier corresponding to the first explanatory information displayed by the first display part to the information processing device, and receives first information corresponding to the first information identifier supplied from the information processing device, and a control part that causes the first display part to display the first setting related information based on the first information corresponding to the first information identifier received by the first communication part, and the information processing device has a second communication part that receives the first information identifier supplied from the terminal device, and supplies the first information corresponding to the first information identifier to the terminal device, and a generation part that generates the first information corresponding to the first information identifier based on the first information identifier received by the second communication part.

A terminal device provided disclosed in the application includes a first display part that displays first explanatory information of an information processing device, and first setting related information corresponding to the first explanatory information, a first communication part that supplies a first information identifier corresponding to the first explanatory information displayed by the first display part to the information processing device, and receives first information corresponding to the first information identifier supplied from the information processing device, and a control part that causes the first display part to display the first setting related information based on the first information corresponding to the first information identifier received by the first communication part.

An image processing device disclosed in the application includes an image forming part, a second communication part that receives a first information identifier corresponding to first explanatory information supplied from a terminal device, and supplies first information corresponding to the first information identifier to the terminal device, and a generation part that generates the first information corresponding to the first information identifier based on the first information identifier received by the second communication part.

According to an information processing system and a terminal device in an embodiment of this invention, a first information identifier corresponding to first explanatory information displayed by a first display part is supplied to an information processing device, and based on first information corresponding to the first information identifier supplied from the information processing device, first setting related information is displayed on the first display part, therefor user's convenience can be enhanced.

According to an information processing system and an image processing device in an embodiment of this invention, a first information identifier corresponding to first explanatory information supplied from a terminal device is received, first information corresponding to the first information identifier is generated based on the first information identifier, and the first information is supplied to the terminal device, therefore user's convenience can be enhanced.

BRIEF DESCRIPTION OF DRAWINGS

FIG. 3 is an explanatory diagram showing an example of the device setting page.

FIG. 4 is an explanatory diagram showing an example of the setting confirmation page.

FIG. 8 is an explanatory diagram showing an example of the URL information table managed by the information management part shown in FIG. 5.

FIG. 9 is an explanatory diagram showing an example of the application identifier table managed by the terminal information control part shown in FIG. 5.

FIG. 10 is an explanatory diagram showing an example of the application identifier table managed by the NFC communication part shown in FIG. 5.

FIG. 14B is another sequence diagram showing an operation example of the information processing system of the first embodiment.

FIG. 25 is an explanatory diagram showing an example of the URL information table managed by the information management part shown in FIG. 24.

FIG. 29 is an explanatory diagram showing an example of the URL information table managed by the information management part shown in FIG. 28.

FIG. 34 is an explanatory diagram showing an example of the URL information table managed by the information management part shown in FIG. 33.

FIG. 36B is another sequence diagram showing an operation example of the information processing system of the fourth embodiment.

FIG. 37A is a sequence diagram showing another operation example of the information processing system of the fourth embodiment.

FIG. 41 is an explanatory diagram showing an example of the history database shown in FIG. 40.

FIG. 42 is a sequence diagram showing an operation example of the information processing system of the fifth embodiment.

FIG. 43A is a sequence diagram showing another operation example of the information processing system of the fifth embodiment.

FIG. 47A is a sequence diagram showing another operation example of the information processing system of the sixth embodiment.

FIG. 47B is another sequence diagram showing another operation example of the information processing system of the sixth embodiment.

DESCRIPTION OF THE EMBODIMENTS

Below, embodiments of this invention are explained in detail referring to drawings. Note that the explanations are made in the following order.
1. First embodiment (Example of displaying a device setting page and a setting confirmation page on a mobile terminal)
2. Second embodiment (Example of displaying a job setting page on a mobile terminal)
3. Third embodiment (Example of selectively displaying a device setting page on a mobile terminal)
4. Fourth embodiment (Example of displaying the same setting related screen on a mobile terminal as the screen displayed on an image processing device)
5. Fifth embodiment (Example of displaying a setting related screen on a mobile terminal based on history)
6. Sixth embodiment (Example of displaying a setting related screen on a mobile terminal based on device information of an image processing device)

1. First Embodiment

Figure 1:
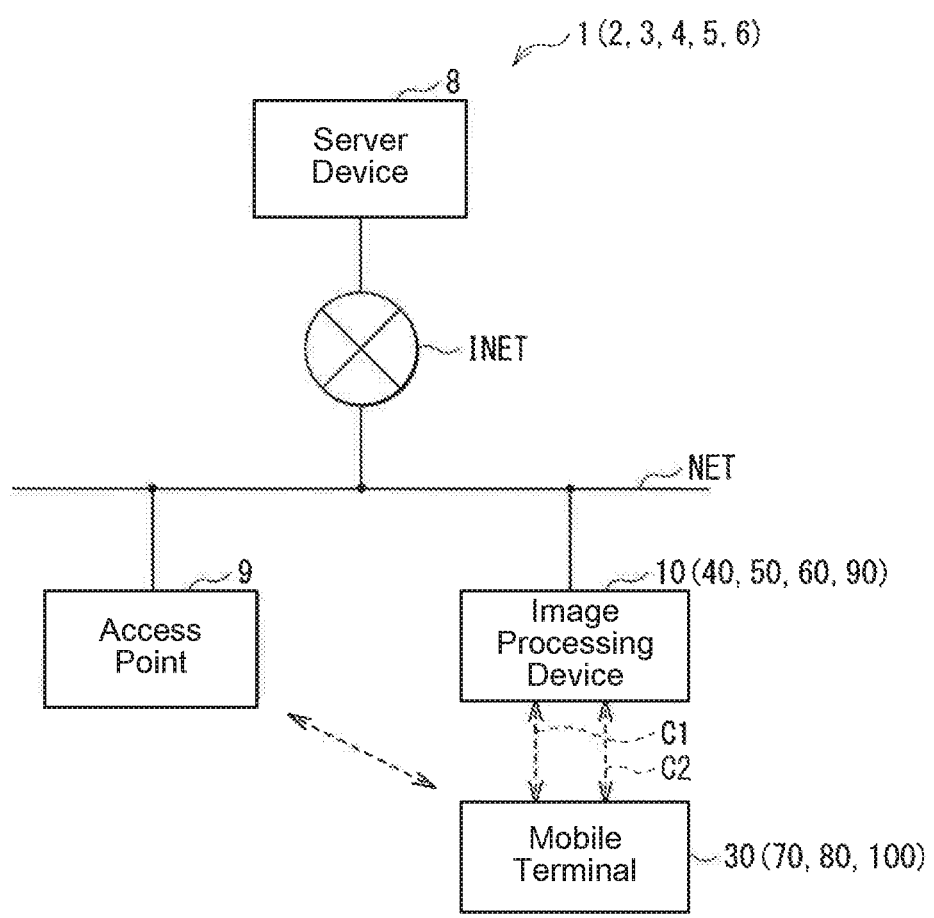
FIG. 1 is a block diagram showing a configuration example of the information processing system of an embodiment.

[Configuration Example]
FIG. 1 shows a configuration example of an information processing system (information system 1) of the first embodiment of this invention. Note that because a terminal device and an image processing device of this disclosed embodiment are embodied by this embodiment, they are explained together. The information processing system 1 is provided with a server device 8, an access point 9, an image processing device 10, and a mobile terminal 30. The access point 9 and the image processing device 10 are connected to a wired network NET. Then, this wired network NET is connected to the server device 8 through the Internet INET.

The server device 8 offers manual pages MPs of an operation manual of the image processing device 10. The access point 9 is an access point of a wireless LAN (Local Area Network). The image processing device 10 is so-called a multifunction peripheral (MFP) having a copy function, a fax function, a scan function, a print function, etc. Also, the image processing device 10 also has a function to offer device setting pages SPAs for performing a device setting and setting confirmation pages SPBs for confirming a device setting. The mobile terminal 30 is a portable terminal device such as a smartphone and a tablet terminal. The mobile terminal 30 can perform communication with the image processing device 10 using near field communication (NFC) C1 and wireless network communication C2. Also, the mobile terminal 30 can be connected with the access point 9 using the wireless LAN and perform communication with the server device 8 through this access point 9.

By this configuration, the mobile terminal 30 can display a manual page MP of the operation manual of the image processing device 10 supplied from the server device 8 and also display the device setting page SPA and the setting confirmation page SPB supplied from the image processing device 10.

Figure 2:
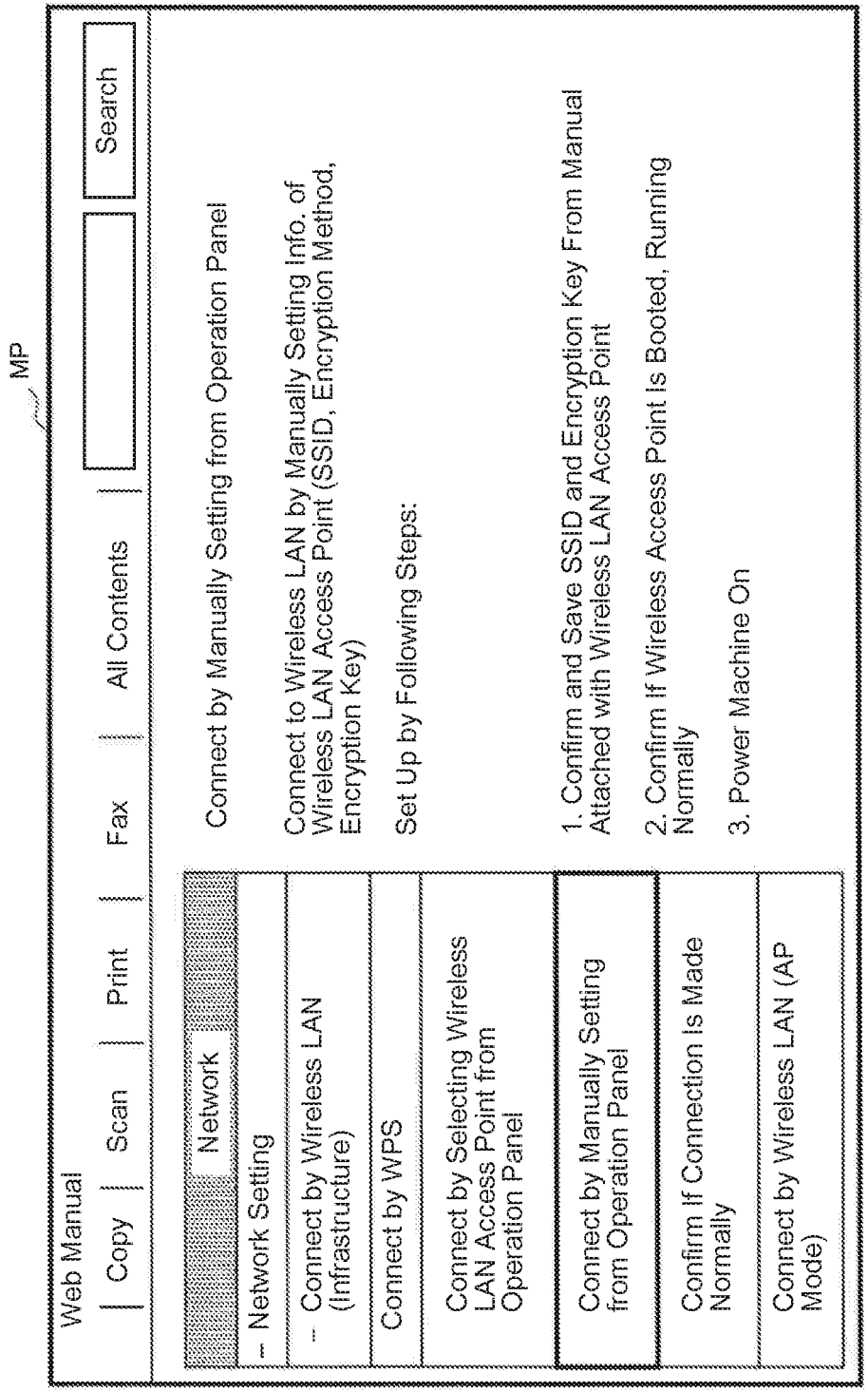
FIG. 2 is an explanatory diagram showing an example of the manual page.

FIG. 2 shows an example of the display screen when the mobile terminal 30 is displaying a manual page MP. In this example, the mobile terminal 30 is displaying the manual page MP concerning the operation method for the network setting. The manual page MP is described using HTML (HyperText Markup Language), and the user can view the manual page MP by starting browser software. Note that although the operation manual is so-called an online manual supplied from the servicer device 8 in this example, it is not limited to this but can be installed in the mobile terminal 30 in advance for example.

FIG. 3 shows an example of the display screen when the mobile terminal 30 is displaying a device setting page SPA. In this example, the mobile terminal 30 is displaying a device setting page SPA concerning the network setting. That is, the device setting page SPA shown in FIG. 3 corresponds to the manual page MP shown in FIG. 2. The device setting page SPA is described using HTML.

FIG. 4 shows an example of the display screen when the mobile terminal 30 is displaying a setting confirmation page SPB. In this example, the mobile terminal 30 is displaying a setting confirmation page SPB concerning the network setting. In the same manner as the device setting page SPA, the setting confirmation page SPB is described using HTML.

In the information processing system 1, when the mobile terminal 30 is displaying a manual page MP concerning a device setting, by the user holding the mobile terminal 30 over the image processing device 10, the mobile terminal 30 can display the device setting page SPA or the setting confirmation page SPB corresponding to the displayed manual page MP.

Specifically, if the user of the mobile terminal 30 is an administrator of the image processing device 10, by the user holding the mobile terminal 30 displaying the manual page MP shown in FIG. 2 over the image processing device 10, the mobile terminal 30 displays such a device setting page SPA as shown in FIG. 3. Then, by operating the mobile terminal 30 displaying such device setting page SPA, the user can perform a device setting of the image processing device 10.

Also, if the user of the mobile terminal 30 is a general user, by the user holding the mobile terminal 30 displaying the manual page MP shown in FIG. 2 over the image processing device 10, the mobile terminal 30 displays such a setting confirmation page SPB as shown in FIG. 4. Thereby, the user can confirm the device setting of the image processing device 10.

Hereafter, as indicating either device setting page SPA or setting confirmation page SPB, "setting related page SP" is used as appropriate.

Figure 5:
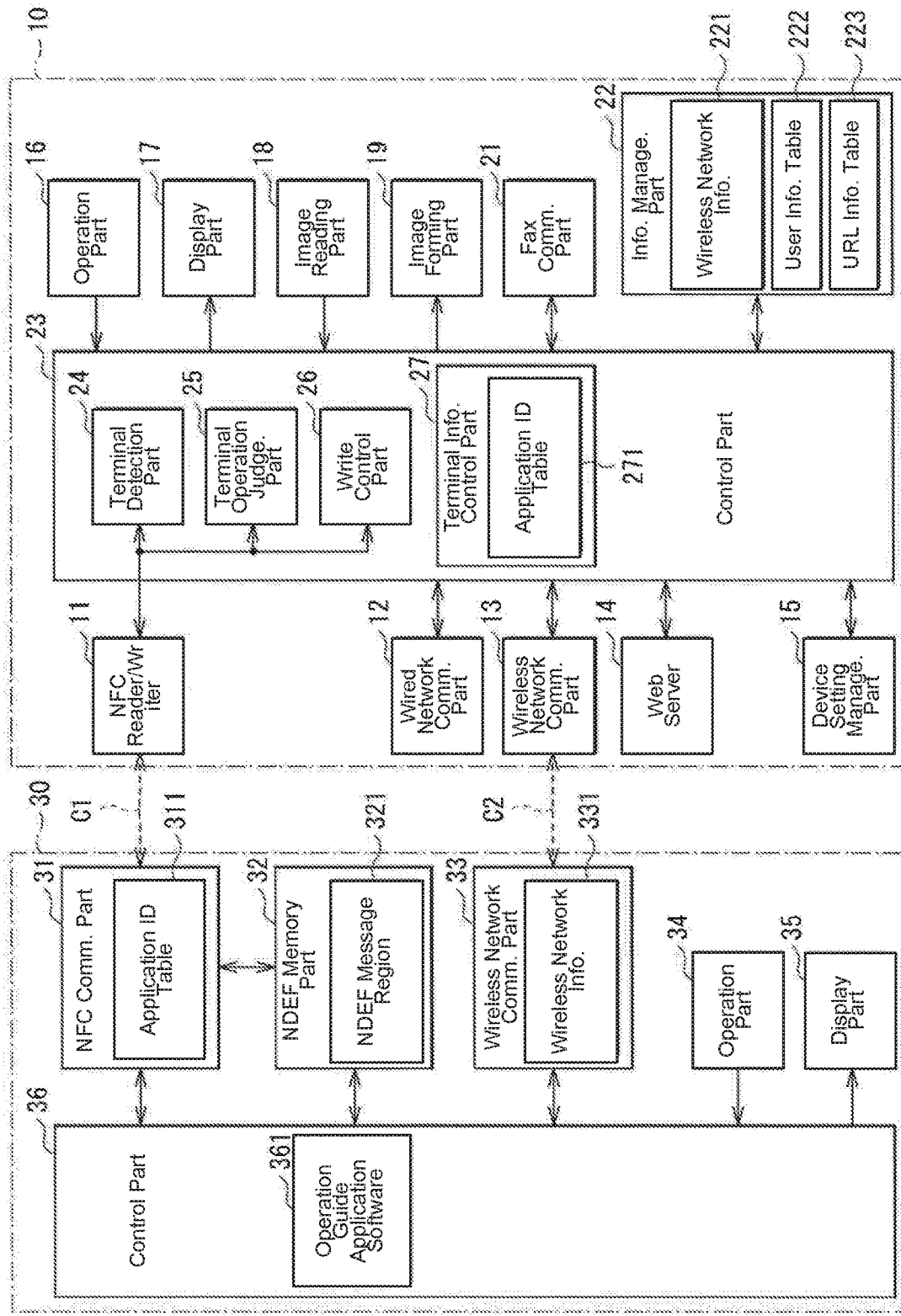
FIG. 5 is a block diagram showing a configuration example of the image processing device and the mobile terminal of the first embodiment.

FIG. 5 shows a configuration example of the image processing device 10 and the mobile terminal 30.

(Image Processing Device 10)
The image processing device 10 has an NFC reader/writer 11, a wired network communication part 12, a wireless network communication part 13, a web server 14, a device setting management part 15, an operation part 16, a display part 17, an image reading part 18, an image forming part 19, a fax communication part 21, an information management part 22, and a control part 23.

The NFC reader/write 11 performs the near field wireless communication C1 with the mobile terminal 30.

The wired network communication part 12 is a network interface for connecting to the wired network NET.

The wireless network communication part 13 performs the wireless network communication C2 using the wireless LAN with the mobile terminal 30. This wireless network communication part 13 supports the WiFi Direct (trademark) scheme. Thereby, the image processing device 10 can perform wireless communication through a peer-to-peer connection with the mobile terminal 30 without going through an access point.

The web server 14 offers a setting related page SP to a device (the mobile terminal 30 in this example) that communicates with the wireless network communication part 13. This setting related page SP is so-called a web page described using HTML. The web server 14 generates the setting related page SP based on the device setting of the image processing device 10 managed by the device setting management part 15.

The device setting management part 15 manages the device setting of the image processing device 10. The device setting is stored in a nonvolatile memory device for example. The user can change the device setting of the image processing device 10 managed by the device setting management part 15 by operating the operation part 16 for example. Also, the user can change the device setting of the image processing device 10 managed by the device setting management part 15 by operating the mobile terminal 30 where the device setting page SPA is displayed for example.

The operation part 16 accepts the user's operations and is configured using various kinds of buttons, a touch panel, etc. for example. The display part 17 displays the operation state etc. of the image processing device 10 and is configured using a liquid-crystal display and/or various kinds of indicators for example.

The image reading part 18 reads information recorded on a reading medium such as paper and is configured using a CIS (Contact Image Sensor) for example. The image forming part 19 forms an image on a recording medium such as paper and forms a developer image on the recording medium by the electrophotographic system for example.

The fax communication part 21 sends/receives fax data with a communication partner via a telephone line.

The information management part 22 manages various pieces of information on the image processing device 10. These pieces of information are stored in the nonvolatile memory device for example. The information management part 22 manages wireless network information, a user information table 222, and a URL (Uniform Resource Locator) information table 223.

Figures 6, 7:
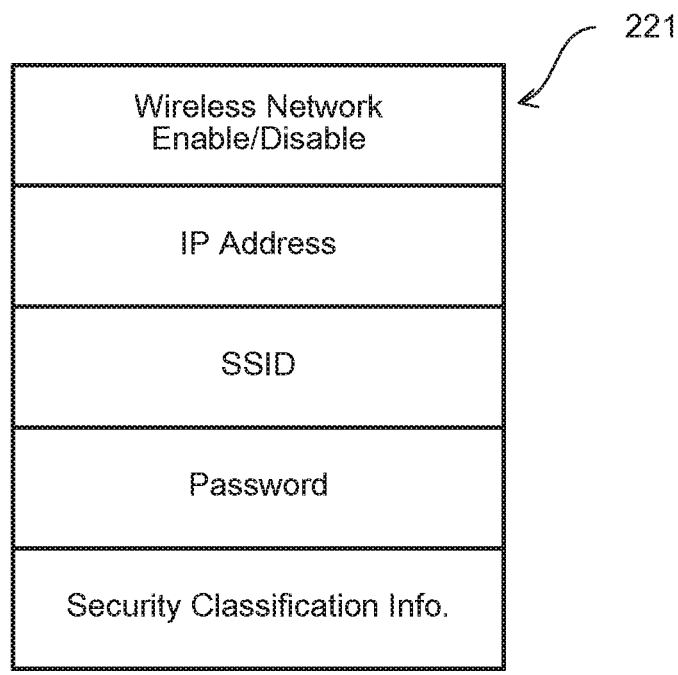
FIG. 6 is an explanatory diagram showing an example of the wireless network information managed by the information management part shown in FIG. 5.
FIG. 7 is an explanatory diagram showing an example of the user information table managed by the information management part shown in FIG. 5.

FIG. 6 shows an example of the wireless network information 221. The wireless network information 221 is information on the wireless network communication C2. Specifically, the wireless network information 221 contains information on whether the wireless network communication C2 is enabled or disabled ("wireless network enabled/disabled"), an IP (Internet Protocol) address, an SSID (Service Set Identifier), a password, and security classification information. The security classification information is, for example, information on WEP (Wired Equivalent Privacy), WPA (Wi-Fi Protected Access), etc. The SSID, the IP address, the password, and the security classification information are information used when the mobile terminal 30 communicates with the image processing device 10 using the wireless network communication C2 as mentioned below.

FIG. 7 shows an example of the user information table 222. The user information table 222 stores a user name, authority information, PIN (Personal Identification Number) information, and terminal identification information ID in association with each other. The authority information indicates whether the user is registered as an administrator or as a general user. The terminal identification information ID is identification information for identifying a device (e.g., the mobile terminal 30) that communicates with the image processing device 10 using the near field wireless communication C1 or the wireless network communication C2. In the information processing system 1, the user name, the authority information, the PIN information, and the terminal identification information ID are stored in this user information table 222 by performing user registration in advance.

FIG. 8 shows an example of the URL information table 223. The URL information table 223 stores URL information of a manual page MP, URL information of a device setting page SPA, and URL information of a setting confirmation page SPB in association with each other. According to this configuration, as mentioned below, by utilizing this URL information table 223 based on the URL information of the manual page MP supplied from the mobile terminal 30, the image processing device 10 acquires the URL information of the device setting page SPA or the URL information of the setting confirmation page SPB corresponding to the URL information of the manual page MP, and supplies the acquired URL information to the mobile terminal 30.

The control part 23 controls the whole operation of the image processing device 10 by controlling the operation of each block inside the image processing device 10. The control part 23 is configured, for example, using a processor that can execute programs, RAM (Random Access Memory), etc. The control part 23 has a terminal detection part 24, a terminal operation judgment part 25, a write control part 26, and a terminal information control part 27.

The terminal detection part 24 detects that the mobile terminal 30 is held over the NFC reader/writer 11. The terminal operation judgment part 25 performs a startup judgment process A1 that judges the operation state of application software in the mobile terminal 30. The write control part 26 performs a write process A2 that writes information to the mobile terminal 30.

The terminal information control part 27 controls the operations of the terminal detection part 24, the terminal operation judgment part 25, and the write control part 26. The terminal information control part 27 stores an application identifier table 271.

FIG. 9 shows a configuration example of the application identifier table 271. Stored in the application identifier table 271 are the identifier of application software (application identifier AID) executed in a device (e.g., the mobile terminal 30) that communicates with the image processing device 10 using the near field wireless communication C1 or the wireless network communication C2, and a pointer (write process pointer) used in writing information to such a device in association with each other. This pointer indicates which write process function to be executed. In this example, stored in the application identifier table 271 is the value "10" of the application identifier AID together with a corresponding pointer. This value "10" of the application identifier AID is the application identifier AID of operation guide application software 361 mentioned below. Also, the value "−1" of the application identifier AID indicates the last part of the application identifier table 271. This application identifier table 271 is read from the nonvolatile memory device and stored in the RAM when the image processing device 10 is powered on for example.

(Mobile Terminal 30)

The mobile terminal 30 has a control part 36, an NFC communication part 31, and an NDEF (NFC Data Exchange Format) memory part 32, a wireless network communication part 33, an operation part 34, and a display part 35.

The control part 36 controls the whole operation of the mobile terminal 30 by controlling the operation of each block inside the mobile terminal 30. The control part 36 is configured using a processor, RAM, a nonvolatile memory device, etc., and executes an operating system and various kinds of application software. In this example, installed in the mobile terminal 30 is the operation guide application software 361. The operation guide application software 361 is started when performing the device setting of the image processing device 10 or when confirming the device setting of the image processing device 10. The value of the application identifier AID of the operation guide application software 361 is set to "10" in this example.

The NFC communication part 31 performs the near field wireless communication C1 with the NFC reader/writer 11 of the image processing device 10. The NFC communication part 31 stores an application identifier table 311.

FIG. 10 shows a configuration example of the application identifier table 311. Stored in the application identifier table 311 are the application identifier AID of application software installed in the mobile terminal 30, and the address of an NDEF message region 321 (mentioned below) assigned to the application software in the NDEF memory part 32 in association with each other. In this example, only the operation guide application software 361 is installed in the mobile terminal 30, and stored in the application identifier table 311 is the value "10" of the application identifier AID of the operation guide application software 361 together with the address of the corresponding NDEF message region 321. Also, the value "−1" of the application identifier AID indicates the last part of the application identifier table 311.

The NDEF memory part 32 stores information exchanged using the near field wireless communication C1. Set in the NDEF memory part 32 is an NDEF message region 321. This NDEF message region 321 is set corresponding to the operation guide application software 361 installed in the mobile terminal 30. That is, for example, if multiple pieces of application software are installed in the mobile terminal 30, multiple NDEF message regions 321 are set corresponding respectively to those multiple pieces of application software. The size of each NDEF message region 321 is 4 KB for example.

Figure 11:
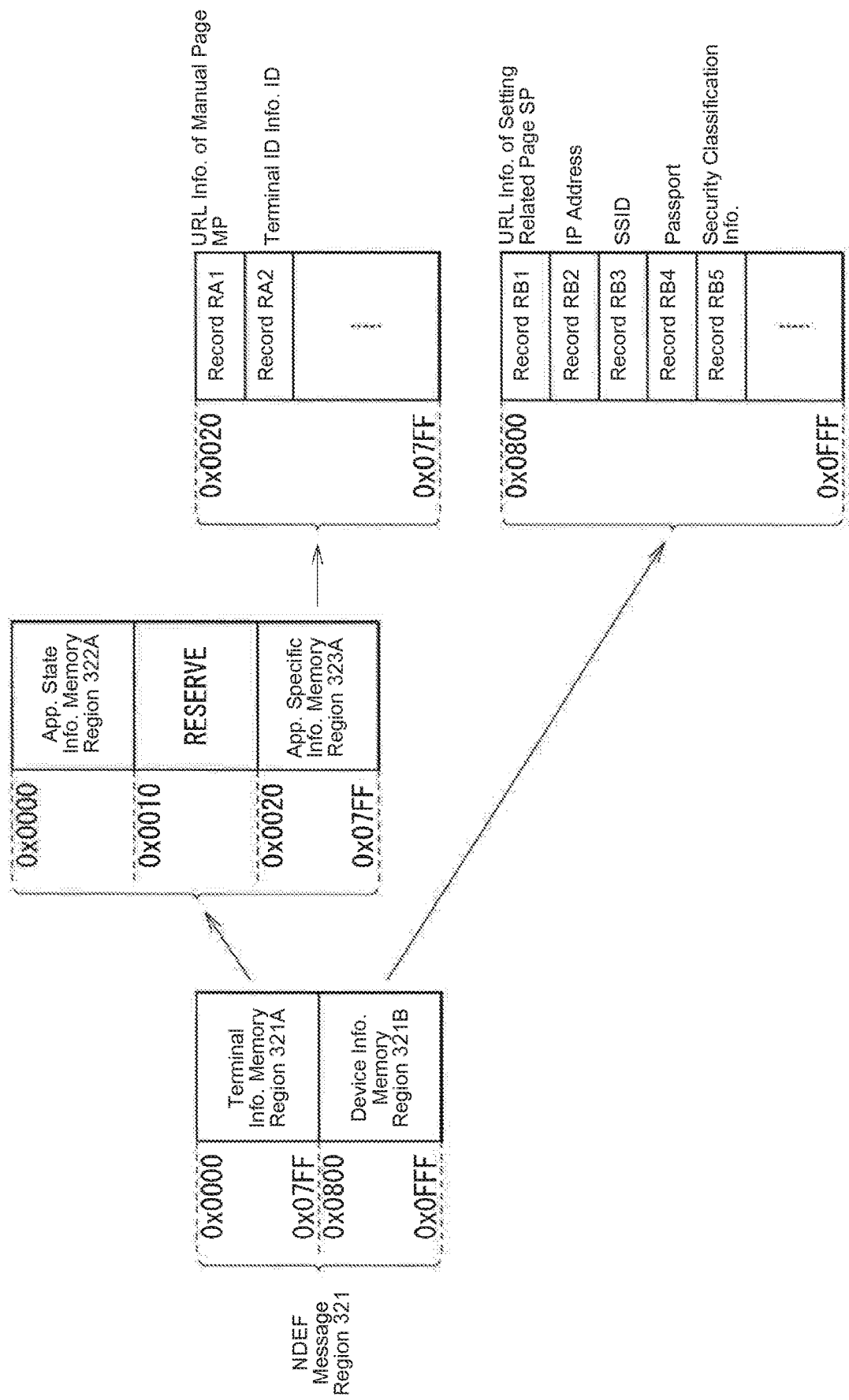
FIG. 11 is an explanatory diagram showing a configuration example of the NDEF message region shown in FIG. 5.

FIG. 11 shows an example of the NDEF message region 321. The NDEF message region 321 contains a terminal information memory region 321A and a device information memory region 321B. The terminal information memory region 321A is a region for the mobile terminal 30 to write information and for the image processing device 10 to read information. The device information memory region 321B is a region for the image processing device 10 to write information and for the mobile terminal 30 to read information. The size of the terminal information memory region 321A is 2 KB for example, and in the same manner, the size of the device information memory region 321B is 2 KB for example.

The terminal information memory region 321A contains an application state information memory region 322A and an application specific information memory region 323A.

The application state information memory region 322A is a region where application state information is stored. This application state information contains a flag ("0" or "1" in this example) indicating whether the corresponding application software (the operation guide application software 361 in this example) has been started. The value "0" indicates a state where the corresponding application software is installed and has not been started. The value "1" indicates a state where the corresponding application software is installed and has been started. The size of the application state information memory region 322A is 16 bytes in this example.

Figure 12:
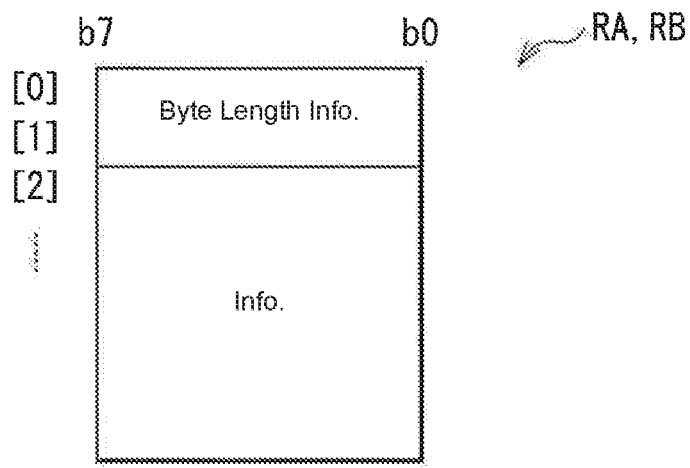
FIG. 12 is an explanatory diagram showing a configuration example of the record shown in FIG. 11.

The application specific information memory region 323A is a region that the corresponding application software can freely use. This application specific information memory region 323A contains multiple records RA (records RA1, RA2, and so on). The size of each of the records RA is variable. As shown in FIG. 12, stored in the first 2 byte region of each of the records RA is information on the byte length of the subsequent information. Stored in the record RA1 is the URL information of a manual page MP, and the record RA2 is the terminal identification information ID of the mobile terminal 30. The terminal identification information ID is information for identifying the mobile terminal 30 and is specific to the mobile terminal 30.

The device information memory region 321B contains multiple records RB (records RB1, RB2, RB3, RB4, RB5, and so on). The size of each of the records RB is variable. As shown in FIG. 12, stored in the first 2 byte region of each of the records RB is information on the byte length of the subsequent information in the same manner as in the records RA. Stored in the record RB1 is the URL information of a setting related page SP (device setting page SPA or setting confirmation page SPB), the record RB2 is the IP address, the record RB3 is the SSID, the record RB4 is the password, and the record RB5 is the security classification information. These pieces of information stored in the records RB2-RB5 are information used when the mobile terminal 30 communicates with the image processing device 10 using the wireless network communication C2 as mentioned below.

The wireless network communication part 33 communicates with the access point 9 using the wireless LAN, and also performs the wireless network communication C2 with the image processing device 10 using the wireless LAN. The wireless network communication part 33 stores wireless network information 331.

Figure 13:
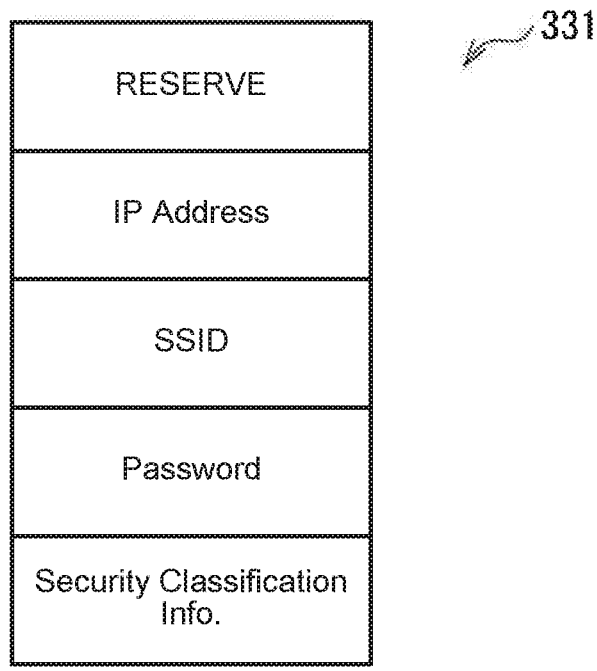
FIG. 13 is an explanatory diagram showing an example of the wireless network information managed by the wireless network communication part shown in FIG. 5.

FIG. 13 shows an example of the wireless network information 331. The wireless network information 331 is information used by the mobile terminal 30 when communicating with the image processing device 10 using the wireless network communication C2. The wireless network information 331 contains the IP address, the SSID, the password, and the security classification information. This wireless network information 331 is set based on information written in the records RB2-RB5 of the device information memory region 321B of the NDEF memory part 32.

The operation part 34 accepts the user's operation and is configured using a touch panel, etc. The display part 35 displays the manual page MP, the device setting page SPA, and the setting confirmation page SPB for example, and is configured using a liquid-crystal display for example.

Here, the mobile terminal 30 corresponds to a specific example of the "terminal device" in this invention. The display part 35 corresponds to a specific example of the "first display part" in this invention. The NFC communication part 31 and the wireless network communication part 33 correspond to a specific example of the "first communication part" in this invention. The control part 36 corresponds to a specific example of the "control part" in this invention. The control part 34 corresponds to a specific example of the "operation part" in this invention.

The image processing device 10 corresponds to a specific example of the "information processing device" in this invention. The NFC reader/writer 11 and the wireless network communication part 13 correspond to a specific example of the "second communication part" in this invention. The information management part 22, the web server 14, the device setting management part 15, and the control part 23 correspond to a specific example of the "generation part" in this invention. The information management part 22 corresponds to a specific example of the "database" in this invention. The display part 17 corresponds to a specific example of the "second display part" in this invention.

The manual page MP corresponds to a specific example of the "first explanatory information" in this invention. The URL information of the manual page MP corresponds to a specific example of the "first information identifier" in this invention. The device setting page SPA and the setting confirmation page SPB correspond to a specific example of the "first setting related information" in this invention. The terminal identification information ID corresponds to a specific example of the "terminal identifier" in this invention. The near field wireless communication C1 corresponds to a specific example of the "first wireless communication" in this invention. The wireless network communication C2 corresponds to a specific example of the "second wireless communication" in this invention.

[Operations and Actions]

Next, the operations and actions of the information processing system 1 of this embodiment are explained.

(Outline of the Overall Operation)

First, referring to FIGS. 1-4, outline of the overall operation of the information processing system 1 is explained. Using browser software, the mobile terminal 30 lets the display part 35 display a manual page MP shown in FIG. 4 for example. Then, the user starts the operation guide application software 361 by operating the operation part 34, and holds the mobile terminal 30 over the image processing device 10. Thereby, the image processing device 10 acquires URL information of the manual page MP displayed by the mobile terminal 30 using the near field wireless communication C1. Based on this URL information of the manual page MP, the image processing device 10 acquires URL information of the setting related page SP (device setting page SPA or setting confirmation page SPB) corresponding to the URL information of this manual page utilizing the URL information table 223 managed by the information management part 22. Then, using the near field wireless communication C1, the image processing device 10 supplies this URL information of the setting related page SP, the IP address, the SSID, the password, and the security classification information contained in the wireless network information 221 managed by the information management part 22 to the mobile terminal 30. Based on these IP address, SSID, password, and security classification information, the mobile terminal 30 performs the network setting of the wireless network communication C2. Then, based on the URL information of the setting related page SP, the mobile terminal 30 requests the image processing device 10 for the setting related page SP using the wireless network communication C2. In response to this request, the web server 14 of the image processing device 10 supplies the setting related page SP to the mobile terminal 30 using the wireless network communication C2. Then, the display part 35 of the mobile terminal 30 displays the setting related page SP.

Below, the operations of the information processing system 1 are explained in detail.

(Installation of the Operation Guide Application Software 361)

First, the user installs the operation guide application software 361 in the mobile terminal 30 in advance of using of the information processing system 1. Once the user instructs to install the operation guide application software 361 by operating the operation part 34, first, the control part 36 secures the NDEF message region 321 in the NDEF memory part 32 to be assigned to the operation guide application software 361. Then, the control part 36 stores the application identifier AID (AID="10" in this example) of the operation guide application software 361 and the address of the NDEF message region 321 assigned to the operation guide application software 361 in the application identifier table 311 (FIG. 10) of the NFC communication part 31. Then, the control part 36 stores application state information containing the flag "0" indicating a state where the operation guide application software 361 is installed and has not been started, in the application state information memory region 322A of the terminal information memory region 321A in the assigned NDEF message region 321. Then, the control part 36 deletes all the information stored in the device information memory region 321B in the assigned NDEF message region 321.

In this manner, the operation guide application software 361 is installed in the mobile terminal 30. Hereafter, in the information processing system 1, when the mobile terminal 30 is displaying a manual page MP concerning the device setting, by the user starting the operation guide application software 361 and holding the mobile terminal 30 over the image processing device 10, the mobile terminal 30 can display the device setting page SPA or the setting confirmation page SPB corresponding to the displayed manual page MP. Below, this operation is explained in detail.

(Operation Sequence of the Information Processing System 1)

Figure 14A:
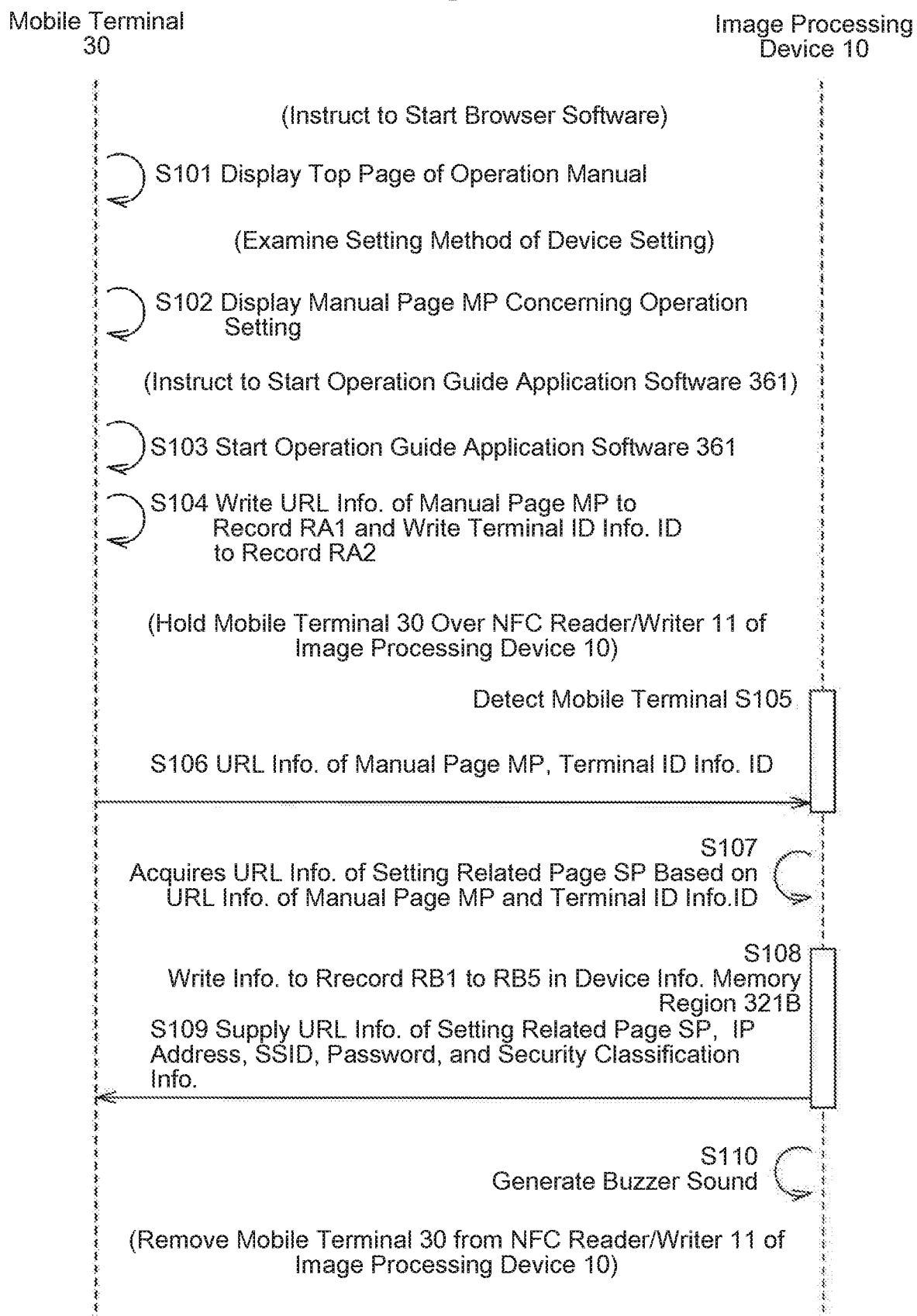
FIG. 14A is a sequence diagram showing an operation example of the information processing system of the first embodiment.

FIGS. 14A and 14B show an operation example of the information processing system 1. In FIGS. 14A and 14B, the user's operations are shown in parentheses.

First, once the user instructs to start the browser software by operating the operation part 34 of the mobile terminal 30, the display part 35 of the mobile terminal 30 displays the top page of the operation manual of the image processing device 10 (S101). Specifically, for example, the wireless network communication part 33 of the mobile terminal 30 supplies URL information of the top page of the operation manual registered in advance to the server device 8 through the access point 9. Then, based on the URL information of the top page, the server device 8 supplies page data of the top page to the mobile terminal 30 through the access point 9. Then, the display part 35 of the mobile terminal 30 displays this top page.

Next, the user examines the setting method of the device setting by continuing to operate the operation part 34 and performing a keyword search in the operation manual for example. Then, as shown in FIG. 2 for example, the display part 35 of the mobile terminal 30 displays the manual page MP concerning the device setting (S102). Specifically, the wireless network communication part 33 of the mobile terminal 30 supplies URL information of the manual page MP to the server device 8 through the access point 9, and based on the URL information, the server device 8 supplies page data of the manual page MP to the mobile terminal 30 through the access point 9. Then, the display part 35 of the mobile terminal 30 displays this manual page MP.

Next, once the user instructs to start the operation guide application software 361, the control part 36 of the mobile terminal 30 starts the operation guide application software 361 (S103). Specifically, for example, the user instructs in the browser software to supply URL information of the displayed manual page MP to the operation guide application software 361. Thereby, the control part 36 starts the operation guide application software 361. Then, the operation guide application software 361 stores application state information containing the flag "1" indicating a state where the operation guide application software 361 is installed and has been started, in the application state information memory region 322A in the terminal information memory region 321A of the NDEF message region 321 corresponding to the operation guide application software 361.

Next, the operation guide application software 361 writes URL information of the manual page MP displayed by the display part 35 to the record RA1 and the terminal identification information ID of the mobile terminal 30 to the record RA2 in the terminal information memory region 321A of the NDEF message region 321 (S104). Then, the operation guide application software 361 deletes all the information stored in the device information memory region 321B of the NDEF message region 321.

Next, once the user holds the mobile terminal 30 over the NFC reader/writer 11 of the image processing device 10, the terminal detection part 24 of the image processing device 10 detects the mobile terminal 30 (S105). Then, using the near field wireless communication C1, the NFC reader/writer 11 of the image processing device 10 reads URL information of the manual page MP stored in the record RA1 and the terminal identification information ID stored in the record RA2 in the terminal information memory region 321A of the mobile terminal 30 (S106).

Next, based on the URL information of the manual page MP and the terminal identification information ID read in S106, the control part 23 of the image processing device 10 acquires URL information of the setting related page SP (S107). Specifically, first, based on the terminal identification information ID read in S106, the control part 23 acquires authority information corresponding to the terminal identification information ID using the user information table 222 (FIG. 7) managed by the information management part 22. Then, based on the URL information of the manual page MP read in S106, the control part 23 acquires URL information of the setting related page SP (device setting page SPA or setting confirmation page SPB) corresponding to the URL information of the manual page MP using the URL information table 223 (FIG. 8) managed by the information management part 22. In doing so, if the acquired authority information indicates that the user is registered as an administrator, the control part 23 acquires URL information of the device setting page SPA, and if it indicates that the user is registered as a general user, acquires URL information of the setting confirmation page SPB.

Next, using the near field wireless communication C1, the NFC reader/writer 11 of the image processing device 10 writes the URL information of the setting related page SP to the record RB1, and the IP address, the password, and the security classification information to the records RB2-RB5, respectively, in the device information memory region 321B of the mobile terminal 30 (S108). Thereby, the URL information of the setting related page SP, the IP address, the SSID, the password, and the security classification information are supplied to the mobile terminal 30 (S109).

Next, the image processing device 10 generates a buzzer sound (S110). Thereby, the image processing device 10 notifies the user that the mobile terminal 30 can be removed from the NFC reader/writer 11. In response to this, the user removes the mobile terminal 30 from the NFC reader/writer 11 of the image processing device 10.

The operation guide application software 361 of the mobile terminal 30 detects that the mobile terminal 30 has been removed from the NFC reader/writer 11, and lets the wireless network information 331 stored in the wireless network communication part 33 retreat tentatively to the RAM as wireless network information 331A (S111).

Next, based on information stored in the records RB2-RB5 of the device information memory region 321B, the operation guide application software 361 of the mobile terminal 30 performs the network setting (S112). Specifically, the operation guide application software 361 lets the wireless network communication part 33 store the information (IP address, SSID, password, and security classification information) stored in the records RB2-RB5 as the wireless network information 331. Thereby, hereafter the wireless network communication part 33 can communicate with the image processing device 10 using the wireless network communication C2.

Next, the operation guide application software 361 of the mobile terminal 30 supplies the information (URL information of the setting related page SP) stored in the record RB1 of the device information memory region 321B to the browser software, and the browser software supplies this URL information of the setting related page SP to the image processing device 10 to request the setting related page SP (S113). At this time, using the wireless network communication C2, the wireless network communication part 33 requests the image processing device 10 for the setting related page SP. The wireless network communication part 13 of the image processing device 10 receives the request supplied from the mobile terminal 30.

Next, based on the URL information of the setting related page SP and the device setting managed by the device setting management part 15, the web server 14 of the image processing device 10 supplies the setting related page SP to the mobile terminal 30 (S114). At this time, using the wireless network communication C2, the wireless network communication part 13 supplies the setting related page SP to the mobile terminal 30. The wireless network communication part 33 of the mobile terminal 30 receives the setting related page SP supplied from the image processing device 10.

Next, based on an instruction from the control part 36, the display part 35 of the mobile terminal 30 displays the setting related page SP (S115).

Then, the user operates the operation part 34 of the mobile terminal 30. That is, for example, if the user is an administrator of the image processing device 10, as shown in FIG. 3 for example, the display part 35 displays the device setting page SPA. In this case, the user instructs to change the device setting by operating the operation part 34. The mobile terminal 30 supplies the device setting change instruction to the image processing device 10, and the device setting management part 15 of the image processing device 10 changes the device setting based on the instruction. In this manner, the user can perform the device setting of the image processing device 10. Also, for example, if the user is a general user of the image processing device 10, as shown in FIG. 4 for example, the display part 35 displays the setting confirmation page SPB. In this case, the user can confirm the device setting of the image processing device 10.

Then, once the user instructs to end the operation guide application software 361 by operating the operation part 34 of the mobile terminal 30, the operation guide application software 361 performs the network setting by having the wireless network information 331A that retreated to the RAM in S111 stored again by the wireless network communication part 33 as the wireless network information 331 (S116).

Then, the control part 36 of the mobile terminal 30 ends the operation guide application software 361 (S117).

Here, this sequence ends.

(Concerning the Operation in S105-S109)

Figure 15:
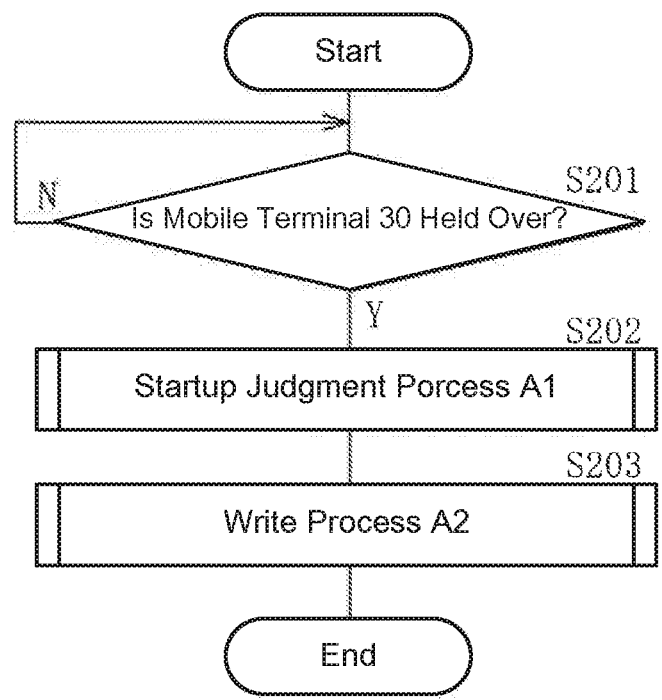
FIG. 15 is a flow chart showing an operation example of the information processing system of the first embodiment.

FIG. 15 shows an operation example of the image processing device 10 in S105-S109 in FIG. 14A.

First, the terminal detection part 24 of the image processing device 10 checks whether the mobile terminal 30 has been held over the NFC reader/writer 11 (S201). If the mobile terminal 30 has not been held over the NFC reader/writer 11 ("N" in S201), it returns to S201.

If the mobile terminal 30 has been held over the NFC reader/writer 11 ("Y" in S201), the terminal operation judgment part 25 of the image processing device 10 performs the startup judgment process A1 (S202).

Figure 16:
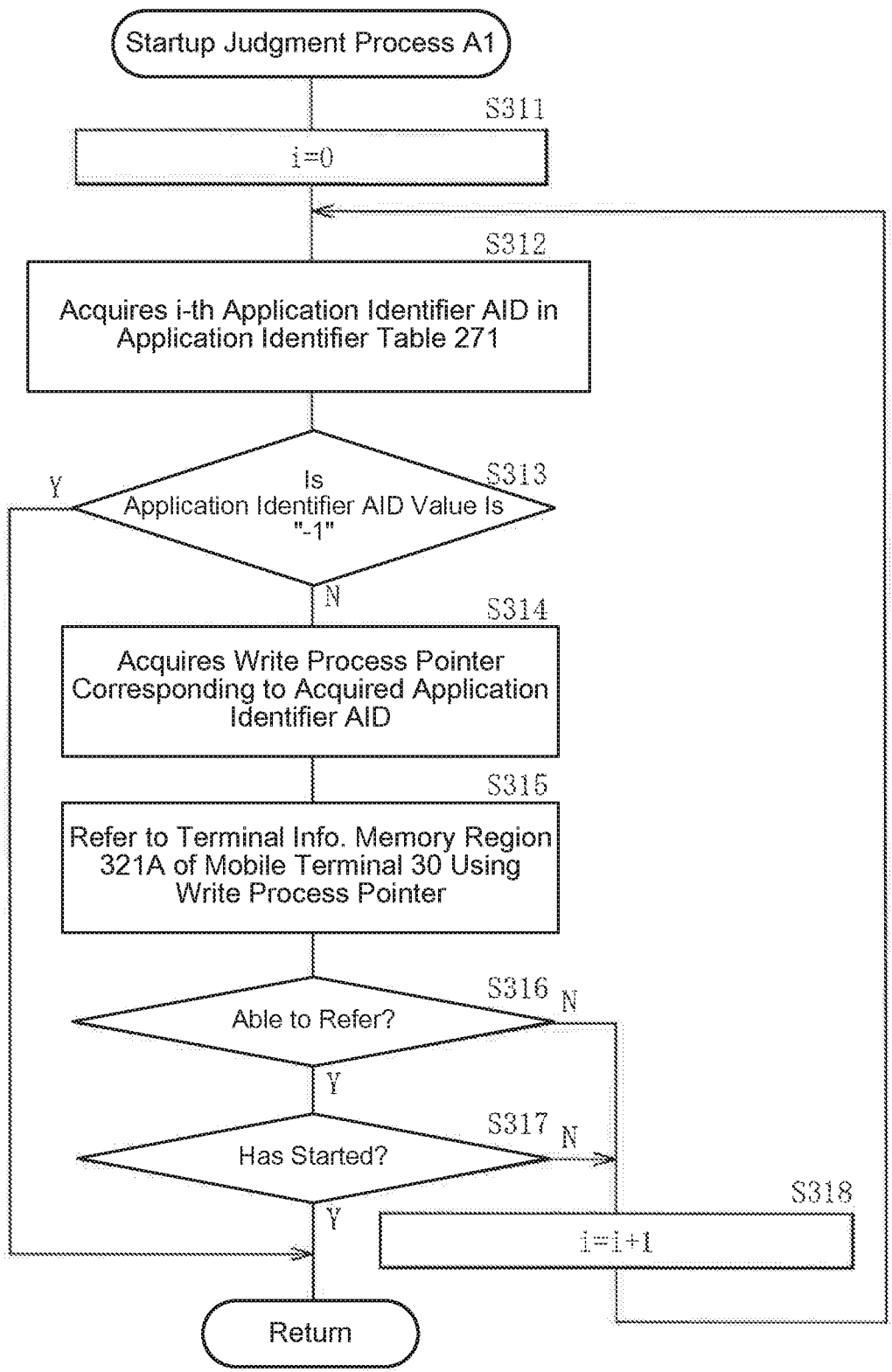
FIG. 16 is a flow chart showing an example of the startup judgment process shown in FIG. 15.

FIG. 16 shows an example subroutine of the startup judgment process A1 of the terminal operation judgment part 25.

First, the terminal operation judgment part 25 sets a variable i to 0 (i=0) (S312).

Next, the terminal operation judgment part 25 acquires the i-th application identifier AID in the application identifier table 271 (FIG. 9) (S312).

Next, the terminal operation judgment part 25 checks whether the application identifier AID value acquired in S312 is "−1" (S313). If the application identifier AID value is "−1" ("Y" in S313), because no more application identifier AID is stored in this application identifier table 271, this subroutine of the startup judgment process A1 ends.

If the application identifier AID value is not "−1" in S313 ("N" in S313), the terminal operation judgment part 25 acquires the write process pointer corresponding to the acquired application identifier AID value by using the application identifier table 271 (FIG. 9) (S314). Then, using the write process pointer acquired in S314, the terminal operation judgment part 25 refers to the terminal information memory region 321A of the mobile terminal 30 (S315).

Next, the terminal operation judgment part 25 checks whether the terminal information memory region 321A of the mobile terminal 30 could be referred to in S315 (S316). If the terminal information memory region 321A could not be referred to ("N" in S316), the terminal operation judgment part 25 increments the variable i (S318) and returns to S312.

If the terminal information memory region 321A could be referred to ("Y" in S316), the terminal operation judgment part 25 refers to the application state information memory region 322A in the terminal information memory region 321A of the mobile terminal 30, and checks whether the application software corresponding to the application identifier AID acquired in S312 has been started (S317). If the application software has not been started ("N" in S317), it proceeds to S318.

If the application software has been started ("Y" in S317), this subroutine of the startup judgment process A1 ends.

By such startup judgment process A1 as this, the terminal operation judgment part 25 acquires the write process pointer for accessing the NDEF message region 321 corresponding to the application identifier AID=10. Also, the terminal operation judgment part 25 judges that the operation guide application software 361 has been started in the mobile terminal 30.

Next, as shown in FIG. 15, the write control part 26 of the image processing device 10 performs the write process A2 (S203).

Figure 17A:
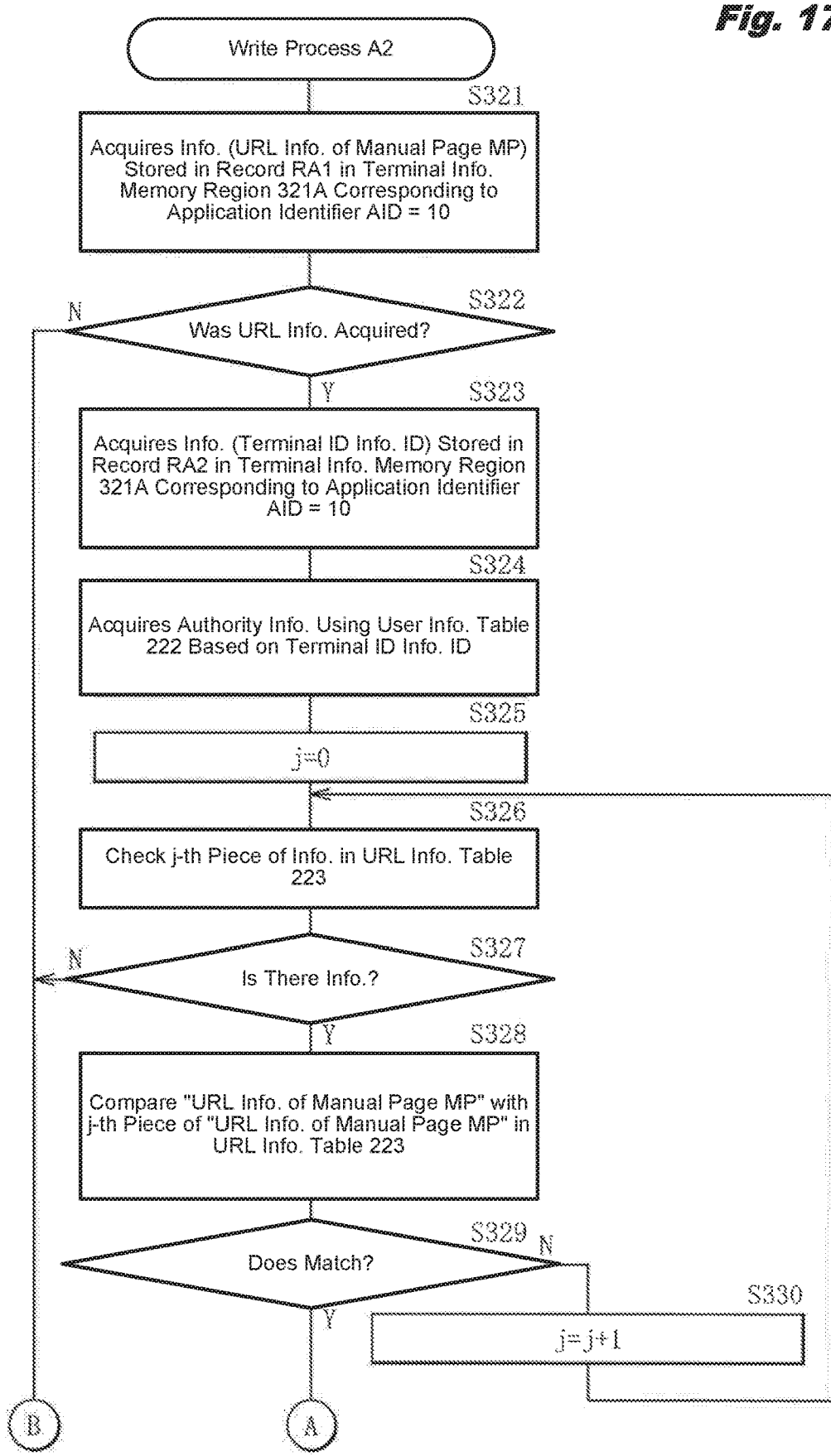
FIG. 17A is a flow chart showing an example of the write process shown in FIG. 15.
Figure 17B:
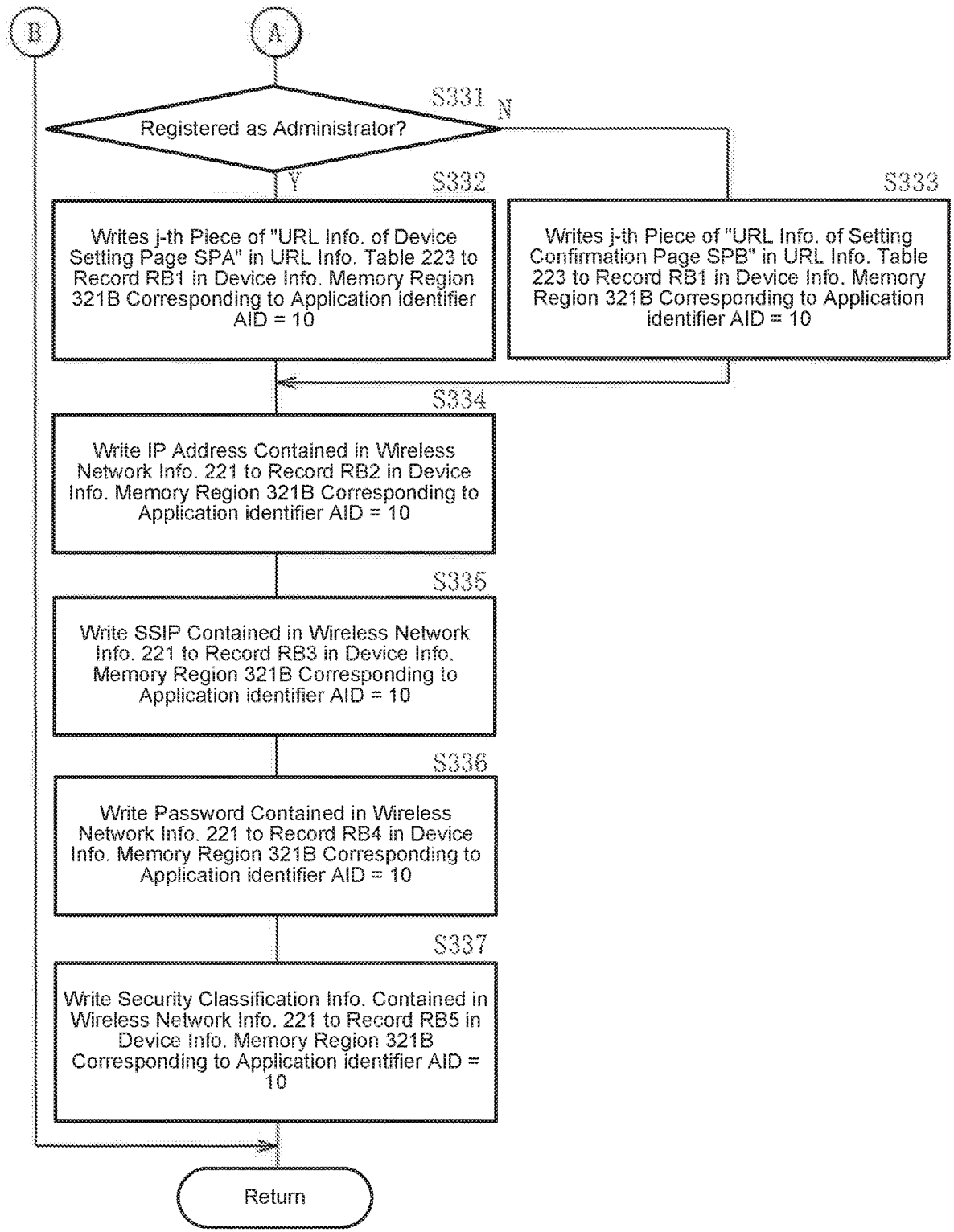
FIG. 17B is another flow chart showing an example of the write process shown in FIG. 15.

FIGS. 17A and 17B show an example subroutine of the write process A2 of the write control part 26.

First, the write control part 26 acquires the information (URL information of the manual page MP) stored in the record RA1 in the terminal information memory region 321A of the NDEF message region 321 corresponding to the application identifier AID=10 (S321). If URL information of the manual page MP could not be acquired ("N" in S322), this subroutine of the write process A2 ends.

If URL information of the manual page MP could be acquired ("Y" in S322), the write control part 26 acquires the information (terminal identification information ID) stored in the record RA2 in the terminal information memory region 321A of the NDEF message region 321 corresponding to the application identifier AID=10 (S323).

Next, based on the terminal identification information ID acquired in S323, the write control part 26 acquires authority information corresponding to the terminal identification information ID using the user information table 222 (FIG. 7) (S324).

Next, the write control part 26 sets a variable j to 0 (j=0) (S325).

Next, the write control part 26 checks the j-th piece of information in the URL information table 223 (FIG. 8) (S326). If there is no j-th piece of information in the URL information table 223 ("N" in S327), this subroutine of the write process A2 ends.

If there is the j-th piece of information in the URL information table 223 ("Y" in S327), the write control part 26 compares the "URL information of the manual page MP" acquired in S321 with the j-th piece of "URL information of the manual page MP" in the URL information table 223 (S328). If the two pieces of "URL information of the manual page MP" do not match ("N" in S329), the write control part 26 increments the variable j (S330) and returns to S326.

If the two pieces of "URL information of the manual page MP" match ("Y" in S329), the write control part 26 checks the authority information acquired in S324 (S331). If this authority information indicates that the user is registered as an administrator ("Y" in S331), the write control part 26 writes the j-th piece of "URL information of the device setting page SPA" in the URL information table 223 to the record RB1 in the device information memory region 321B of the NDEF message region 321 corresponding to the application identifier AID=10 (S332). Also, if the authority information indicates that the user is registered as a general user ("N" in S331), the write control part 26 writes the j-th piece of "URL information of the setting confirmation page SPB" in the URL information table 223 to the record RB1 in the device information memory region 321B of the NDEF message region 321 corresponding to the application identifier AID=10 (S333).

Next, the write control part 26 writes the IP address contained in the wireless network information 221 to the record RB2 in the device information memory region 321B of the NDEF message region 321 corresponding to the application identifier AID=10 (S334).

Next, the write control part writes the SSID contained in the wireless network information 221 to the record RB3 in the device information memory region 321B of the NDEF message region 321 corresponding to the application identifier AID=10 (S335).

Next, the write control part writes the password contained in the wireless network information 221 to the record RB4 in the device information memory region 321B of the NDEF message region 321 corresponding to the application identifier AID=10 (S336).

Next, the write control part writes the security classification information contained in the wireless network information 221 to the record RB5 in the device information memory region 321B of the NDEF message region 321 corresponding to the application identifier AID=10 (S337).

Here, this subroutine of the write process A2 ends.

In such write process A2 as this, the write control part 26 writes the URL information of the setting related page SP, the IP address, the SSID, the password, and the security classification information to the device information memory region 321B of the NDEF message region 321 corresponding to the operation guide application software 361.

In this manner, the operation shown in FIG. 15 ends.

(Concerning the Operation in S111-S115)

Figure 18:
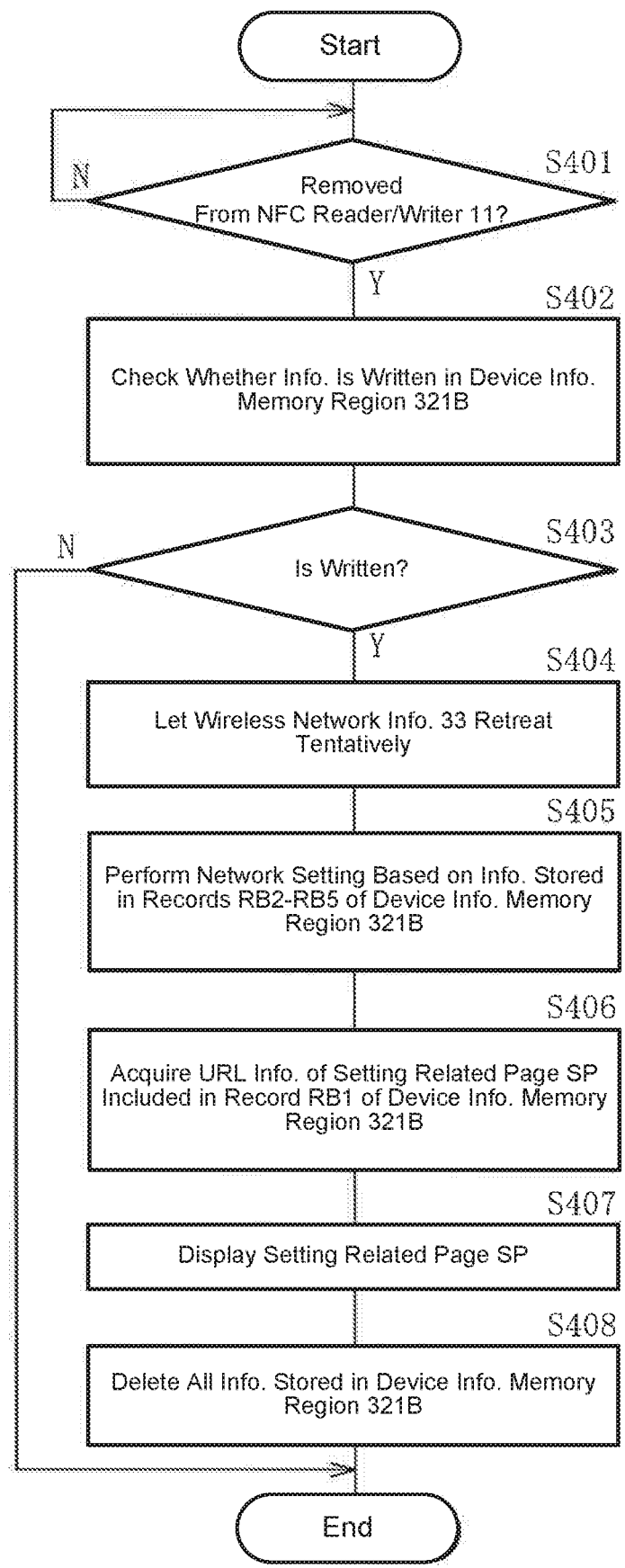
FIG. 18 is another flow chart showing an operation example of the information processing system of the first embodiment.

FIG. 18 shows an operation example of the mobile terminal 30 in S111-S115 in FIG. 14B.

First, the operation guide application software 361 checks whether the mobile terminal 30 has been removed from the NFC reader/writer 11 (S401). If the mobile terminal 30 has not been removed from the NFC reader/writer 11 ("N" in S401), it returns to S401.

If the mobile terminal 30 has been removed from the NFC reader/writer 11 ("Y" in S401), the operation guide application software 361 checks whether information is written in the device information memory region 321B of the NDEF message region 321 corresponding to the operation guide application software 361 (S402). If no information is written in the device information memory region 321B ("N" in S403), this flow ends.

If information is written in the device information memory region 321B ("Y" in S403), the operation guide application software 361 lets the wireless network information 331 stored in the wireless network communication part 33 retreat tentatively to the RAM as the wireless network information 331A (S404).

Next, based on information stored in the records RB2-RB5 of the device information memory region 321B, the operation guide application software 361 performs the network setting (S405). Specifically, the operation guide application software 361 lets the wireless network communication part 33 store the information (IP address, SSID, password, and security classification information) stored in the records RB2-RB5, as the wireless network information 331.

Next, the operation guide application software 361 acquires the information (URL information of the setting related page SP) stored in the record RB1 of the device information memory region 321B (S406). Then, the operation guide application software 361 supplies the URL information of the setting related page SP to the browser software.

Next, based on the URL information of the setting related page SP, the browser software acquires the setting related page SP, and the display part 35 displays this setting related page SP (S407). Specifically, the browser software requests the image processing device 10 for the setting related page SP by supplying this URL information of the setting related page SP. At this time, the wireless network communication part 33 requests the image processing device 10 for the setting related page SP using the wireless network communication C2. Then, the wireless network communication part 33 receives the setting related page SP using the wireless network communication C2. The display part 35 displays this setting related page SP.

Next, the operation guide application software 361 deletes all the information stored in the device information memory region 321B (S408).

Here, this flow ends.

In this manner, in the information processing system 1, by the user holding the mobile terminal 30 over the image processing device 10 when the mobile terminal 30 is displaying a manual page MP concerning a device setting, the mobile terminal 30 displays the device setting page SPA or the setting confirmation page SPB corresponding to the displayed manual page MP. Thereby, the user can save labor of searching for the device setting page SPA or the setting confirmation page SPB concerning the desired device setting, therefore user's convenience can be enhanced.

Especially, in the information processing system 1, the mobile terminal 30 displays the device setting page SPA or the setting confirmation page SPB, and the user performs the device setting of the image processing device 10 or confirms the device setting of the image processing device 10 by operating the mobile terminal 30, therefore user's convenience can be enhanced. That is, if the user directly operates the image processing device 10, user's convenience could decline. Specifically, for example, if the display part 17 of the image processing device 10 is a panel such as so-called a character panel that cannot display much information, of if the operation part 16 has only several buttons and is difficult to operate, user's convenience could decline. On the other hand, in the information processing system 1, the mobile terminal 30 can display the device setting page SPA or the setting confirmation page SPB, and the user can operate using the operation part 34 (touch panel). This mobile terminal 30 can graphically display various information, and the user can intuitively operate it by touching the display screen for example. Thereby, in the information processing system 1, user's convenience can be enhanced.

Also, in the information processing system 1, based on the terminal identification information ID of the mobile terminal 30, the image processing device 10 judges which of the URL information of the device setting page SPA and the URL information of the setting confirmation page SPB should be supplied to the mobile terminal 30. Thereby, in the information processing system 1, for example, if the user of the mobile terminal 30 is an administrator of the image processing device 10, the mobile terminal 30 can display the device setting page SPA, and if the user of the mobile terminal 30 is a general user of the image processing device 10, the mobile terminal 30 can display the setting confirmation page SPB. Therefore, for example, the risk that a general user of the image processing device 10 changes the device setting of the image processing device 10 can be reduced, therefore user's convenience can be enhanced.

[Efficacy]

As stated above, in this embodiment, by the user holding the mobile terminal over the image processing device when the mobile terminal is displaying the manual page concerning a device setting, the mobile terminal displays the device setting page or the setting confirmation page corresponding to the displayed manual page, therefore user's convenience can be enhanced.

In this embodiment, the mobile terminal displays the device setting page or the setting confirmation page, and the user performs the device setting of the image processing device or confirms the device setting of the image processing device by operating the mobile terminal, therefore user's convenience can be enhanced.

In this embodiment, it is judged which of the URL information of the device setting page and the URL information of the setting confirmation page should be supplied to the mobile terminal based on the terminal identification information of the mobile terminal, therefore user's convenience can be enhanced.

2. Second Embodiment

Next, an information processing system 2 of the second embodiment is explained. This embodiment displays a job setting page on a mobile terminal 30 for setting a job such as copying. Note that its components that are essentially the same as those of the information processing system 1 of the first embodiment mentioned above are given the same codes, and their explanations are omitted as appropriate.

As shown in FIG. 1, the information processing system 2 is provided with an image processing device 40 and the mobile terminal 30. The image processing device 40 has a function to offer a job setting page SPC for setting a job to be executed in the image processing device 40.

In the information processing system 2, by the user holding the mobile terminal 30 over the image processing device 40 when the mobile terminal 30 is displaying a manual page MP concerning a job setting, the mobile terminal 30 can display the job setting page SPC corresponding to the displayed manual page MP.

Figure 19:
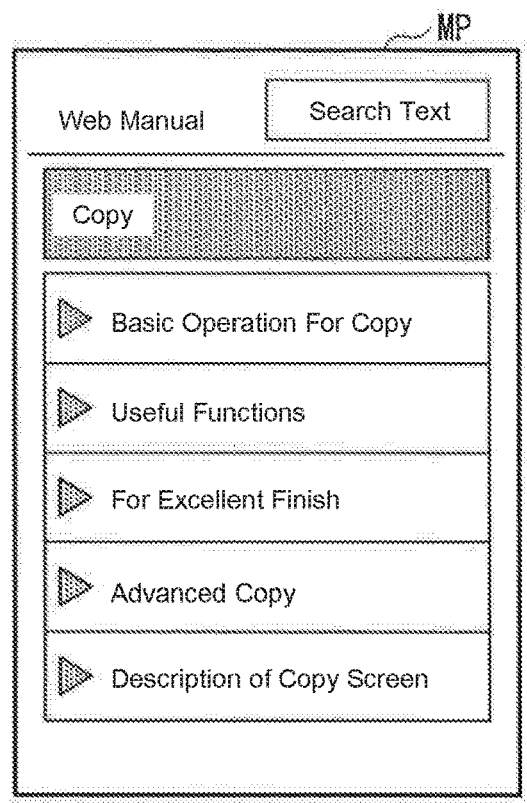
FIG. 19 is an explanatory diagram showing an example of the manual page of the second embodiment.

FIG. 19 shows an example of display screen when the mobile terminal 30 is displaying the manual page MP. In this example, the mobile terminal 30 is displaying the manual page MP concerning the copy operation method.

Figure 20:
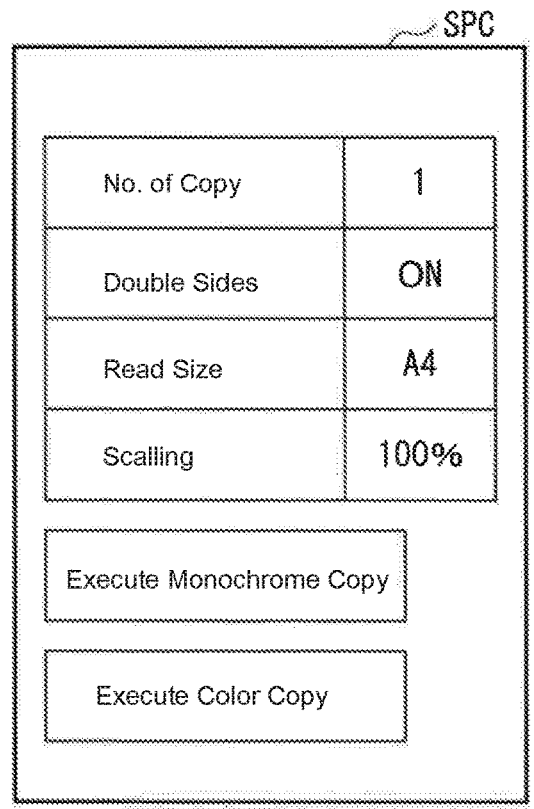
FIG. 20 is an explanatory diagram showing an example of the job setting page of the second embodiment.

FIG. 20 shows an example of display screen when the mobile terminal 30 is displaying the job setting page SPC. In this example, the mobile terminal 30 is displaying the job setting page SPC concerning the copy setting. That is, the job setting page SPC shown in FIG. 20 corresponds to the manual page MP shown in FIG. 19. In this example, using this job setting page SPC, the user can perform settings on the number of copies, duplex copying, reading size, and enlarging or shrinking. Also, the user can instruct to execute monochrome copying by operating "Execute Monochrome Copying" or instruct to execute color copying by operating "Execute Color Copying".

Figure 21:
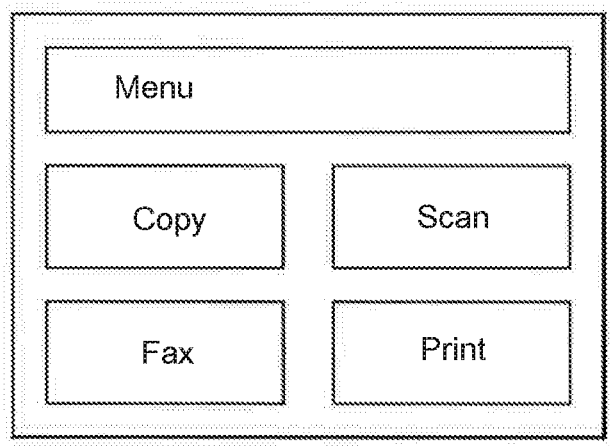
FIG. 21 is an explanatory diagram showing an example of the display screen of the image processing device of the second embodiment.
Figure 22:
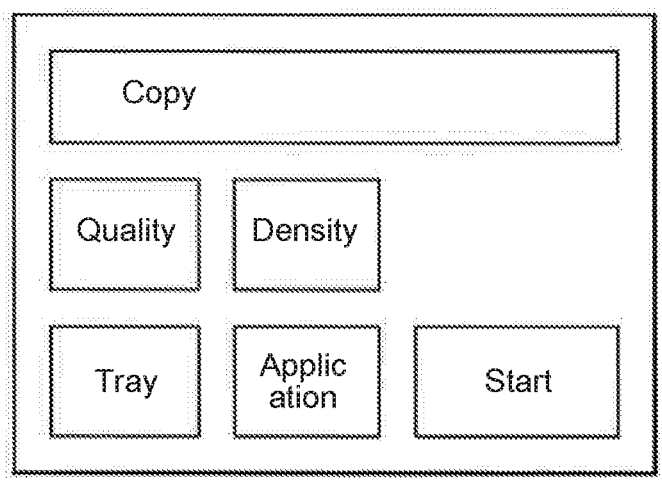
FIG. 22 is an explanatory diagram showing another example of the display screen of the image processing device of the second embodiment.
Figure 23:
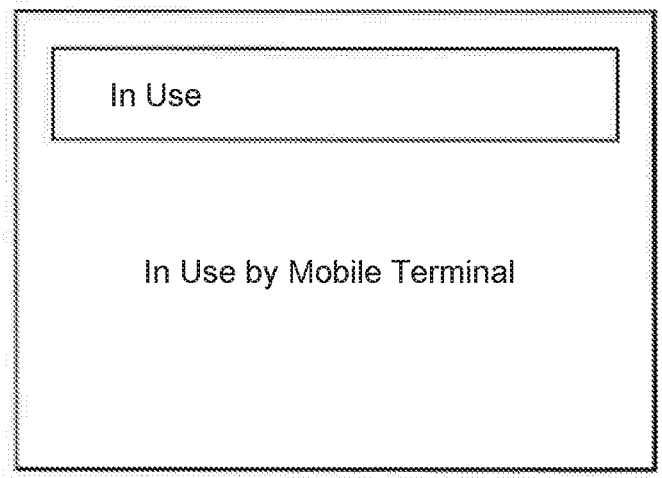
FIG. 23 is an explanatory diagram showing another example of the display screen of the image processing device of the second embodiment.

FIGS. 21-23 show an example of display screens of the image processing device 40. FIG. 21 shows an example of operation standby screen, FIG. 22 shows an example of copy operation screen, and FIG. 23 shows an example of lock screen where the user cannot perform any operation.

By operating the mobile terminal 30 displaying a job setting page SPC, the user can set a job and instruct executing the job. At this time, the image processing device 40 displays the lock screen shown in FIG. 23. When the image processing device 40 is displaying this lock screen, an operation part of the image processing device 40 does not accept the user's operation. Thereby, other users can recognize that the image processing device 40 is in use, and also the image processing device 40 cannot be used simultaneously by multiple users.

Figure 24:
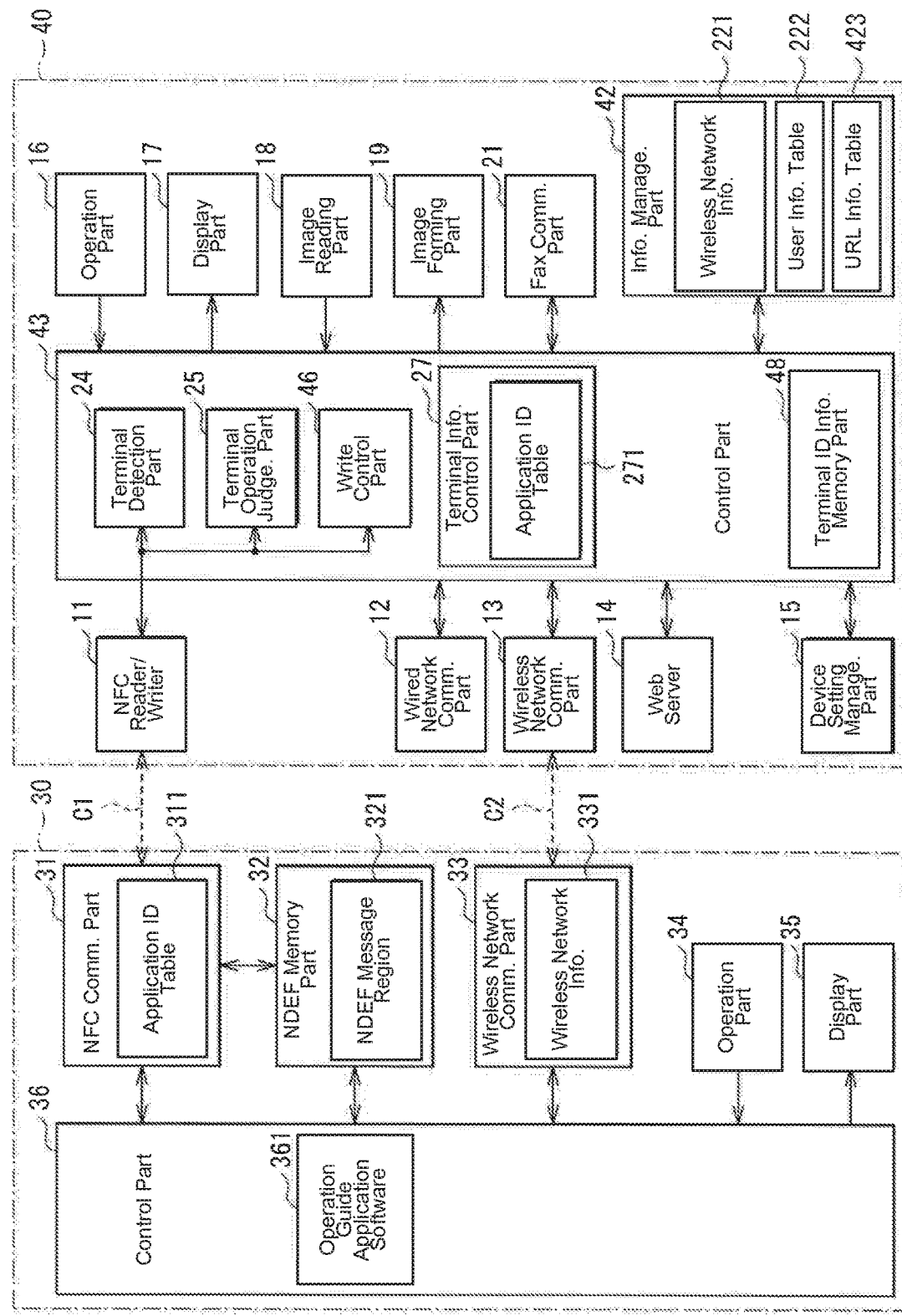
FIG. 24 is a block diagram showing a configuration example of the image processing device and the mobile terminal of the second embodiment.

FIG. 24 shows a configuration example of the image processing device 40. Note that this FIG. 24 also shows the mobile terminal 30. The image processing device 40 has an information management part 42 and a control part 43.

The information management part 42 manages a URL information table 423.

FIG. 25 shows an example of the URL information table 423. Stored in the URL information table 423 are URL information of the manual page MP, URL information of the job setting page SPC, and a lock flag in association with each other. The lock flag is information on whether to display the lock screen (FIG. 23). According to this configuration, based on the URL information of the manual page MP supplied from the mobile terminal 30 and utilizing this URL information table 423, the image processing device 40 acquires URL information of the job setting page SPC and the lock flag corresponding to the URL information of the manual page MP. Then, based on this lock flag, the image processing device 40 judges whether to let the display part 17 display the lock screen.

The control part 43 has a write control part 46 and a terminal identification information memory part 48. The write control part 46 performs a write process A2 that writes information to the mobile terminal 30. The terminal identification information memory part 48 stores terminal identification information ID read from the mobile terminal 30.

Here, the image processing device 40 corresponds to a specific example of the "information processing device" in this invention. The information management part 42, the web server 14, and the device setting management part 15 correspond to a specific example of the "generation part" in this invention. The job setting page SPC corresponds to a specific example of the "first setting related information" in this invention.

Figure 26A:
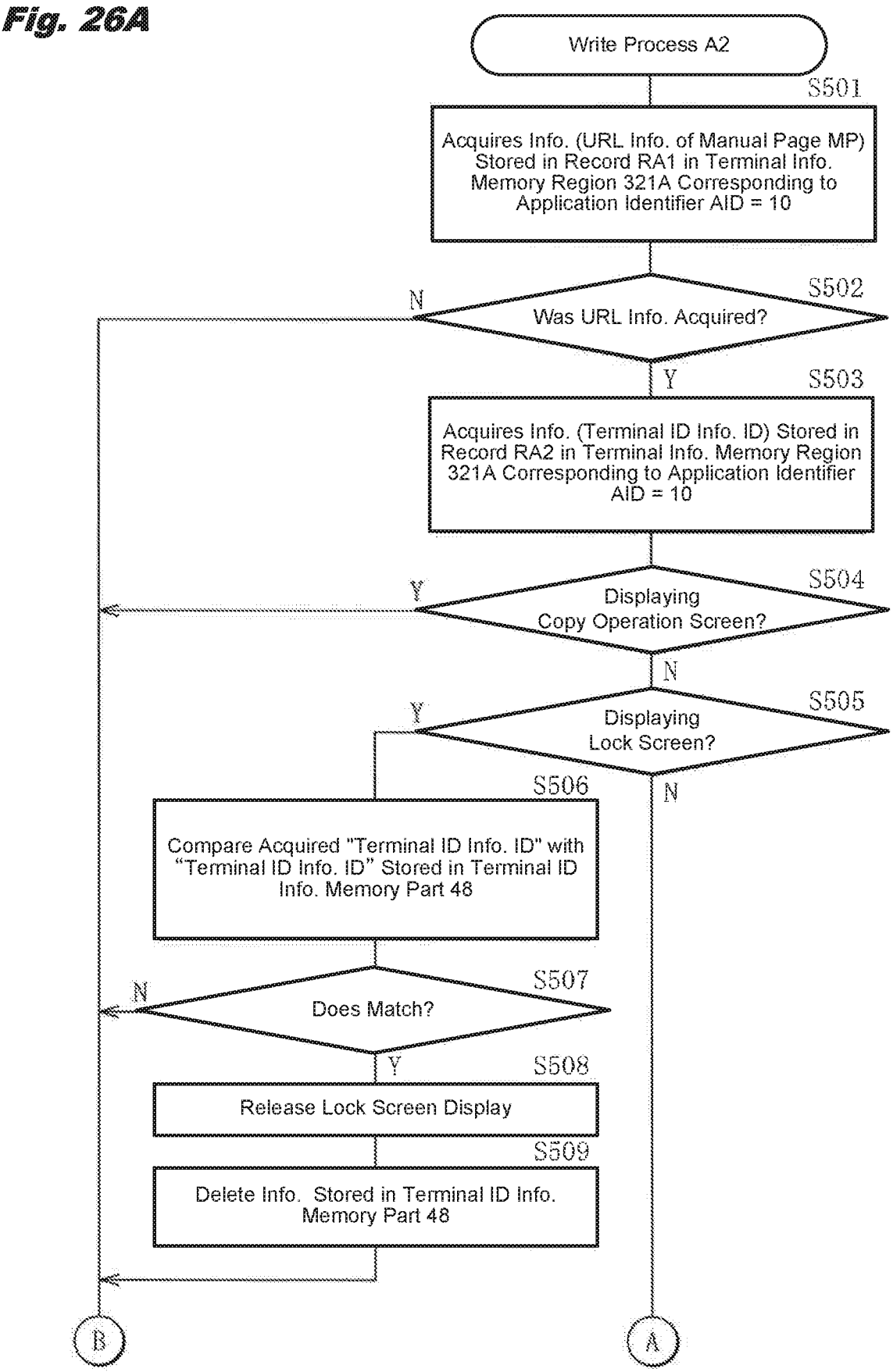
FIG. 26A is a flow chart showing an example of the write process of the second embodiment.
Figure 26B:
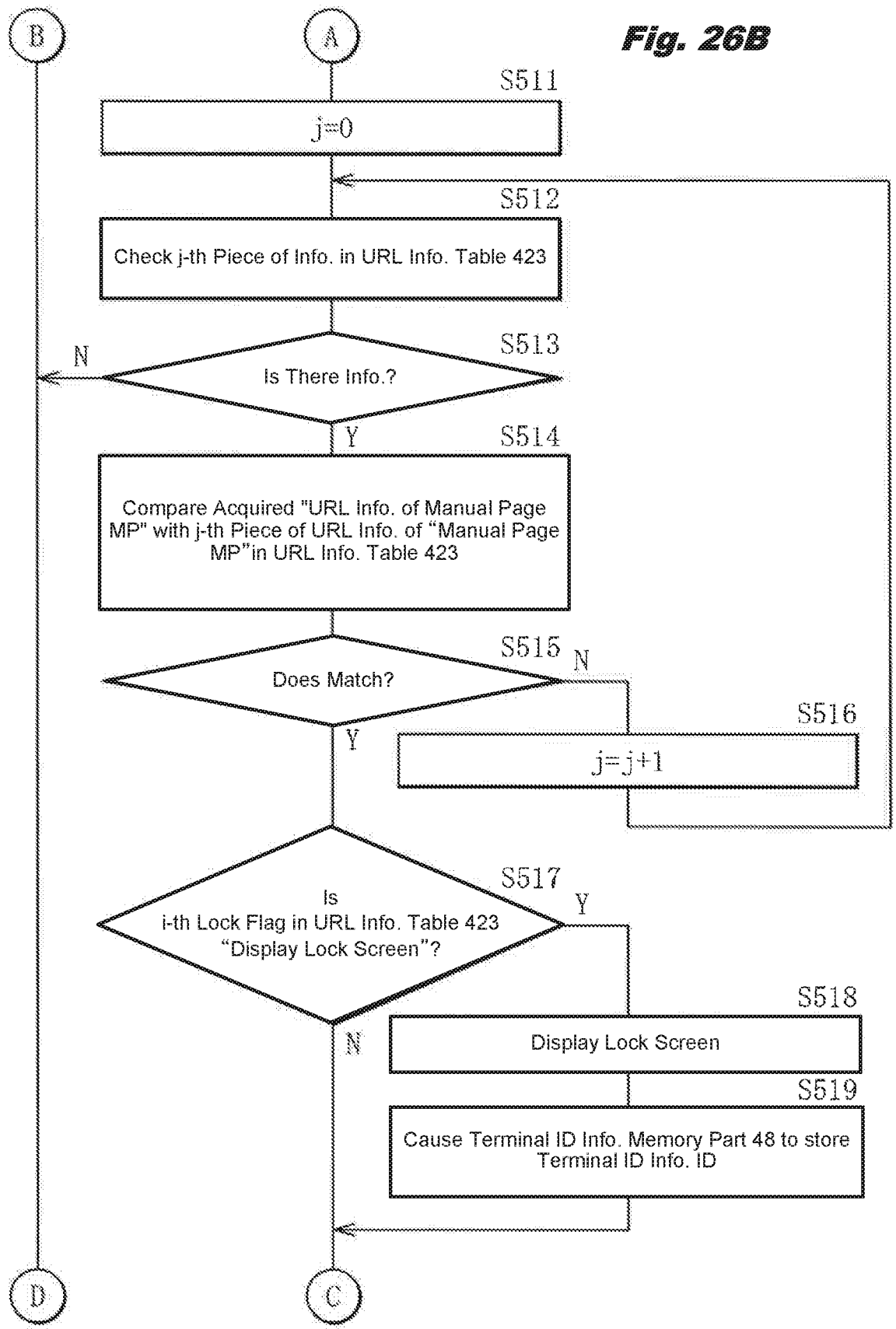
FIG. 26B is another flow chart showing an example of the write process of the second embodiment.
Figure 26C:
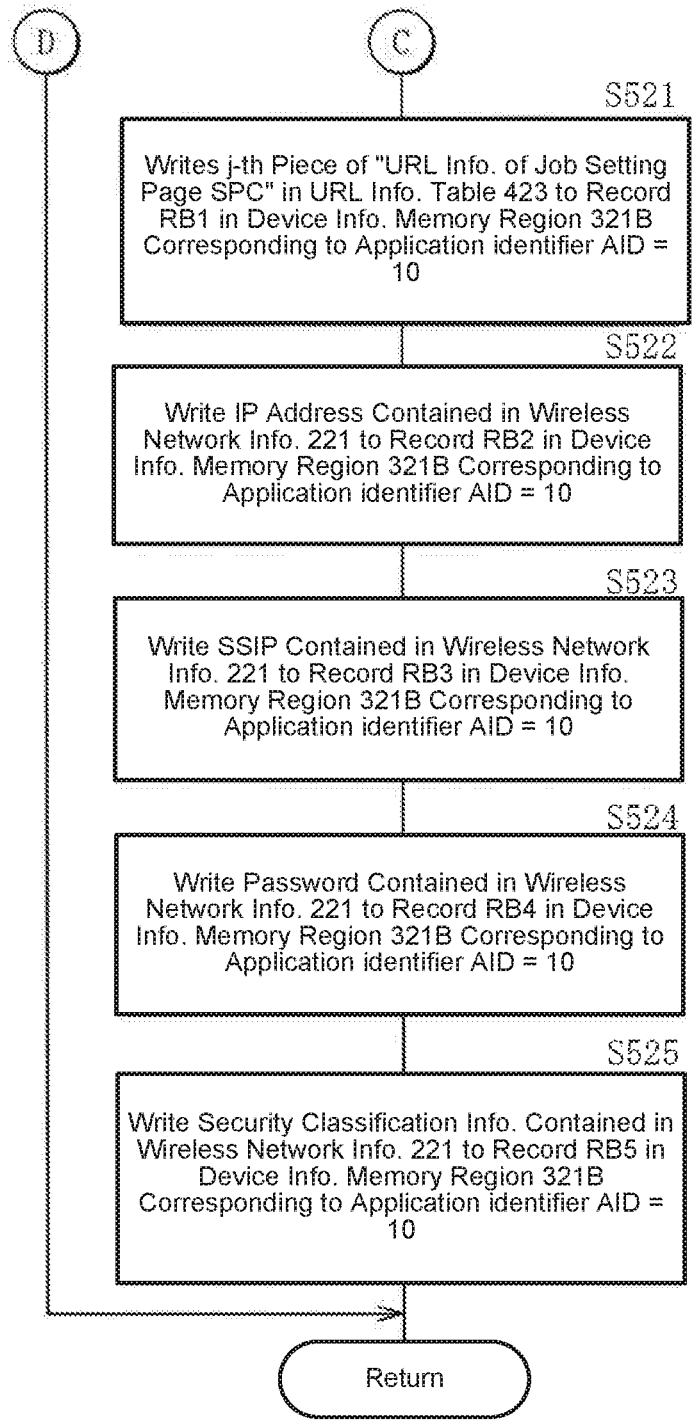
FIG. 26C is another flow chart showing an example of the write process of the second embodiment.

FIGS. 26A-26C show an example subroutine of the write process A2 of the write control part 46.

First, the write control part 46 acquires the information (URL information of the manual page MP) stored in a record RA1 in a terminal information memory region 321A of an NDEF message region 321 corresponding to an application identifier AID=10 (S501). If the URL information of the manual page MP could not be acquired ("N" in S502), this subroutine of the write process A2 ends.

If the URL information of the manual page MP could be acquired ("Y" in S502), the write control part 46 acquires the information (terminal identification information ID) stored in a record RA2 in the terminal information memory region 321A of the NDEF message region 321 corresponding to the application identifier AID=10 (S503).

Next, the write control part 46 checks whether the display part 17 of the image processing device 40 is displaying the copy operation screen (FIG. 22) (S504). If the display part 17 is displaying the copy operation screen ("Y" in S504), this subroutine of the write process A2 ends.

If the display part 17 is not displaying the copy operation screen ("N" in S504), the write control part 46 checks whether the display part 17 of the image processing device 40 is displaying the lock screen (FIG. 23) (S505).

If the display part 17 is displaying the lock screen ("Y" in S505), the write control part 46 compares the "terminal identification information ID" acquired in S503 with the "terminal identification information ID" stored by the terminal identification information memory part 48 (S506). If the two pieces of "terminal identification information ID" do not match ("N" in S507), this subroutine of the write process A2 ends. If the two pieces of "terminal identification information ID" match ("Y" in S507), the display part 17 releases the lock screen display based on an instruction from the write control part 46 (S508), and the write control part 46 deletes information stored in the terminal identification information memory part 48 (S509). Then, this subroutine of the write process A2 ends. That is, when the display part 17 is displaying the lock screen by the user holding the mobile terminal 30 over the image processing device 40, by the user holding again the mobile terminal 30 over the image processing device 40, the image processing device 40 releases the lock screen display.

In S505, if the display part 17 is not displaying the lock screen ("N" in S505), the write control part 46 sets a variable j to 0 (j=0) (S511).

Next, the write control part 46 checks the j-th information in the URL information table 423 (FIG. 25) (S512). If there is no j-th information in the URL information table 423 ("N" in S513), this subroutine of the write process A2 ends.

If there is the j-th information in the URL information table 223 ("Y" in S513), the write control part 46 compares the "URL information of the manual page MP" acquired in S501 with the j-th "URL information of the manual page MP" in the URL information table 423 (S514). If the two pieces of "URL information of the manual page MP" do not match ("N" in S515), it increments the variable j (S516) and returns to S512.

If the two pieces of "URL information of the manual page MP" match ("Y" in S515), the write control part 46 checks whether the j-th lock flag in the URL information table 423 is "Display Lock Screen" (S517). If the j-th lock flag in the URL information table 423 is "Display Lock Screen" ("Y" in S517), the display part 17 displays the lock screen based on an instruction from the write control part 46 (S518), and the terminal identification information memory part 48 stores the terminal identification information ID acquired in S503 based on an instruction from the write control part 46 (S519).

Next, the write control part 46 writes the j-th "URL information of the job setting page SPC" in the URL information table 423 to a record RB1 in a device information memory region 321B of the NDEF message region 321 corresponding to the application identifier AID=10 (S521).

Next, the write control part 46 writes an IP address contained in wireless network information 221 to a record RB2 in the device information memory region 321B of the NDEF message region 321 corresponding to the application identifier AID=10 (S522).

Next, the write control part 46 writes an SSID contained in the wireless network information 221 to a record RB3 in the device information memory region 321B of the NDEF message region 321 corresponding to the application identifier AID=10 (S523).

Next, the write control part 46 writes a password contained in the wireless network information 221 to a record RB4 in the device information memory region 321B of the NDEF message region 321 corresponding to the application identifier AID=10 (S524).

Next, the write control part 46 writes security classification information contained in the wireless network information 221 to a record RB5 in the device information memory region 321B of the NDEF message region 321 corresponding to the application identifier AID=10 (S525).

Here, this subroutine of the write process A2 ends.

In this manner, in the information processing system 2, the user can set a job and instruct to execute the job by operating the mobile terminal 30, therefore user's convenience can be enhanced in comparison with the case where the image processing device 10 is directly operated. That is, for example, even if the display part 17 of the image processing device 40 can display graphics, if its display region is small, the number of setting items that can be simultaneously displayed is limited for example, therefore user's convenience could decline. In the information processing system 2, the user sets a job and instructs to execute the job by operating the mobile terminal 30. Thereby, for example, if the display area of the display part 35 of the mobile terminal 30 is larger than the display area of the display part 17 of the image processing device 10, the mobile terminal 30 can simultaneously display more setting items. As a result, user's convenience can be enhanced in the information processing system 2.

Also, in the information processing system 2, when the mobile terminal 30 is displaying a job setting page SPC, the image processing device 40 displays the lock screen shown in FIG. 23, therefore other users can recognize that the image processing device 40 is in use, and user's convenience can be enhanced.

As stated above, in this embodiment, the user can set a job such as copying and instruct to execute the job by operating the mobile terminal, therefore the user's convenience can be enhanced.

In this embodiment, when the mobile terminal is displaying a job setting page, the image processing device displays the lock screen, therefore user's convenience can be enhanced.

[Modification 2-1]

Although in the embodiment mentioned above, the user sets a copy job and instructs to execute the copy job by operating the mobile terminal 30, this invention is not limited to this. For example, the user can set a scan job and instruct to execute the scan job, or set a fax sending job and instruct to execute the fax sending job.

[Modification 2-2]

Although in the embodiment mentioned above, the user sets a job such as copying by operating the mobile terminal 30, this invention is not limited to this. For example, in combination with the technology of the first embodiment mentioned above, the user could be further allowed to perform a device setting of the image processing device 40 or confirm a device setting of the image processing device 40 by operating the mobile terminal 30.

3. Third Embodiment

Next, an information processing system 3 of the third embodiment is explained. This embodiment selectively displays a device setting page SPA for performing a device setting of an image processing device on a mobile terminal 30. Note that its components that are essentially the same as those in the information processing system 1 of the first embodiment mentioned above are given the same codes, and their explanations are omitted as appropriate.

As shown in FIG. 1, the information processing system 3 is provided with an image processing device 50 and the mobile terminal 30. The image processing device 50 has a function to offer selectively the device setting page SPA for performing a device setting of the image processing device 50 based on URL information of a manual page MP.

Figure 27:
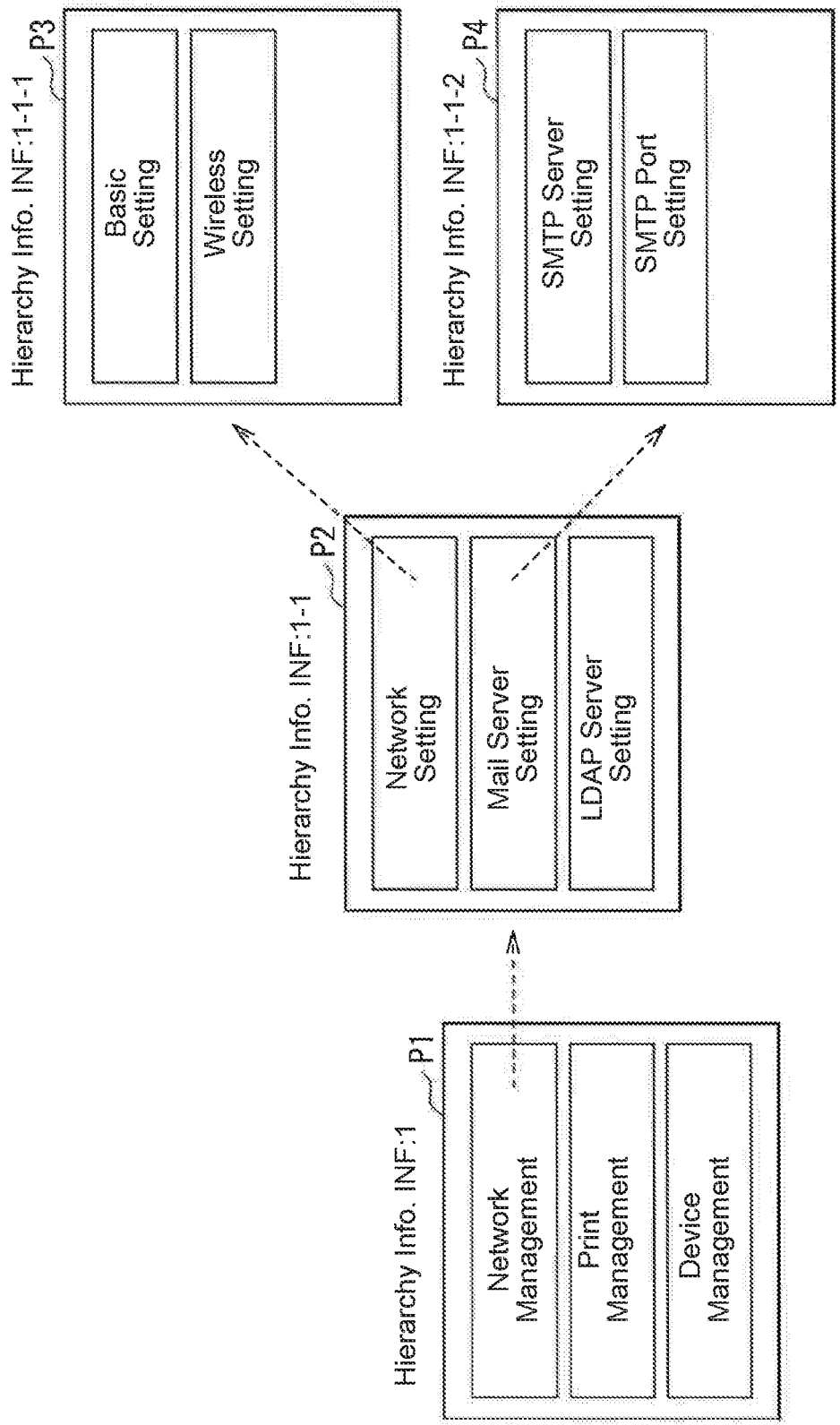
FIG. 27 is an explanatory diagram showing an example of the display screen of the image processing device of the third embodiment.

FIG. 27 shows an example of display screen P (display screens P1-P4) of the image processing device 50. Each of the display screens P1-P4 has hierarchy information INF assigned. The display screen P1 is a screen for selecting one of "Network Management", "Printing Management", and "Device Management". The hierarchy information INF of this display screen P1 is "1". In the display screen P1, once the user selects "Network Management", the image processing device 50 displays the display screen P2. This display screen P2 is a screen for selecting one of "Network Setting", "Mail Server Setting", and "LDAP (Lightweight Directory Access Protocol) Server Setting". The hierarchy information INF of this display screen P2 is "1-1". Once the user selects "Network Setting" on this display screen P2, the image processing device 50 displays the display screen P3. This display screen P3 is a screen for selecting one of "Basic Setting" and "Wireless Setting". The hierarchy information INF of this display screen P3 is "1-1-1". Also, once the user selects "Mail Server Setting" on the display screen P2, the image processing device 50 displays the display screen P4. This display screen P4 is a screen for selecting one of "SMTP (Simple Mail Transfer Protocol) Server Setting" and "SMTP Port Setting". The hierarchy information INF of this display screen P4 is "1-1-2".

In the information processing system 3, by the user holding the mobile terminal 30 over the image processing device 50 when the mobile terminal 30 is displaying a manual page MP concerning a device setting, the image processing device 50 acquires URL information of the manual page MP. Then, based on the URL information of the manual page MP, the image processing device 50 judges whether to display the display screen P or let the mobile terminal 30 display the device setting page SPA.

Figure 28:
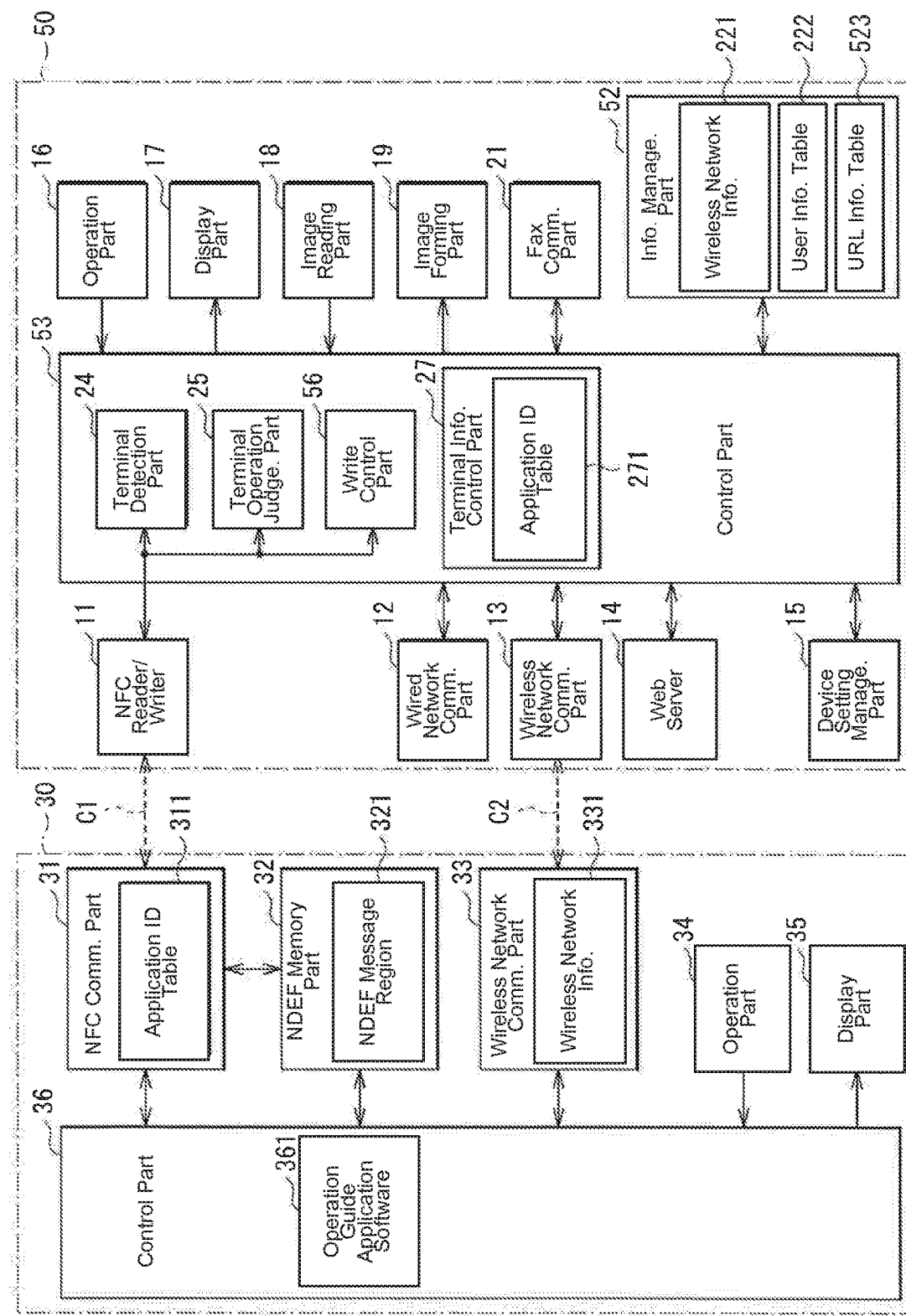
FIG. 28 is a block diagram showing a configuration example of the image processing device and the mobile terminal of the third embodiment.

FIG. 28 shows a configuration example of the image processing device 50. Note that this FIG. 28 also shows the mobile terminal 30. The image processing device 50 has an information management part 52 and a control part 53.

The information management part 52 manages a URL information table 523.

FIG. 29 shows an example of the URL information table 523. The URL information table 523 stores URL information of the manual page MP, a display flag, URL information of the device setting page SPA, and the hierarchy information INF in association with each other. The display flag indicates on which of the image processing device 50 and the mobile terminal 30 to display information. If the display flag is "Image Processing Device", the display screen P corresponding to the hierarchy information INF is displayed on the display part 17 of the image processing device 50. Also, if the display flag is "Mobile Terminal", the device setting page SPA is displayed on the display part 35 of the mobile terminal 30.

The control part 53 has a write control part 56. The write control part 56 performs a write process A2 to write information to the mobile terminal 30.

Here, the image processing device 50 corresponds to a specific example of the "information processing device" in this invention. The information management part 52, the web server 14, and the device setting management part 15 correspond to a specific example of the "generation part" in this invention. The display flag corresponds to a specific example of the "flag information" in this invention.

Figure 30A:
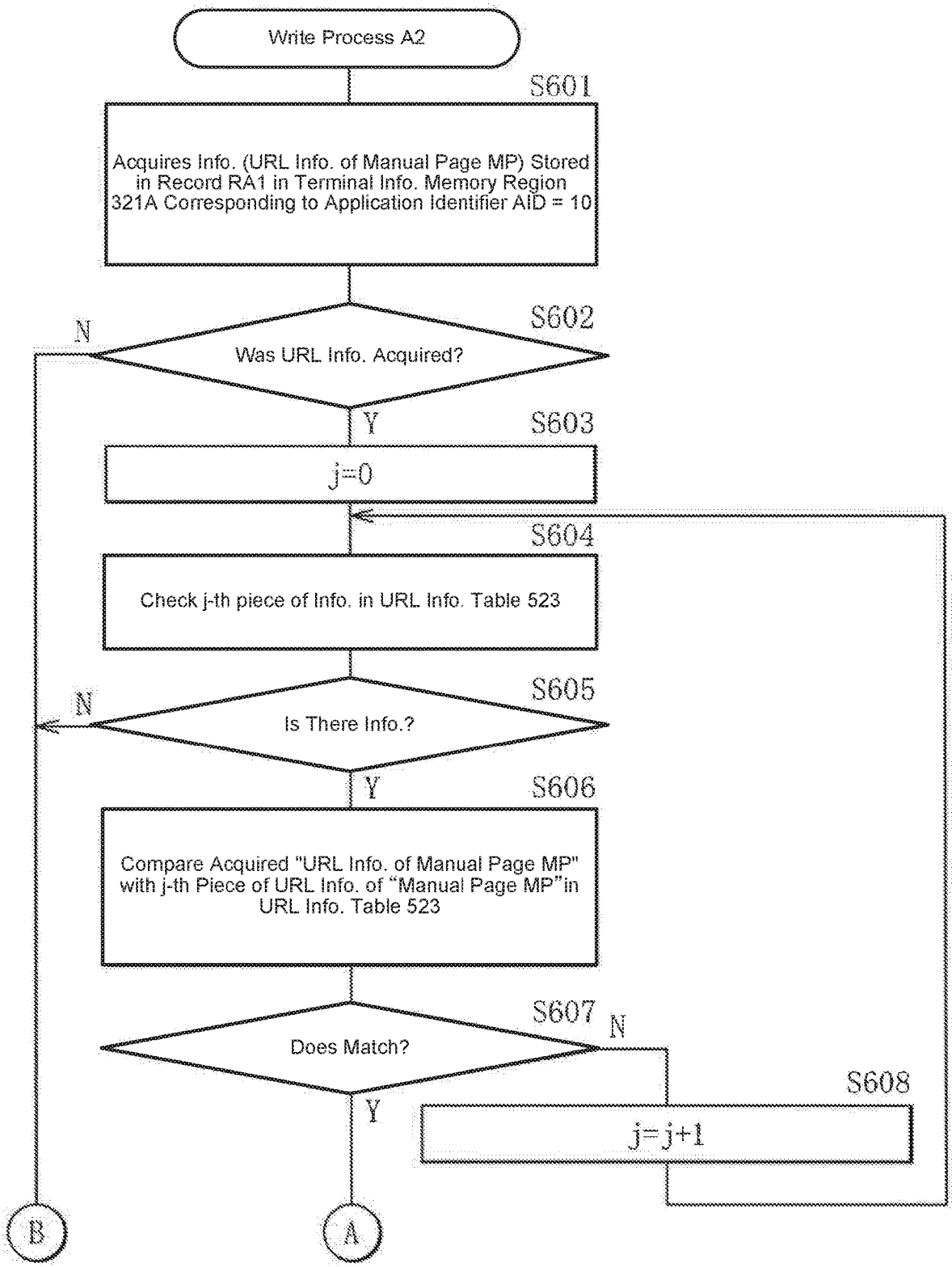
FIG. 30A is a flow chart showing an example of the write process of the third embodiment.
Figure 30B:
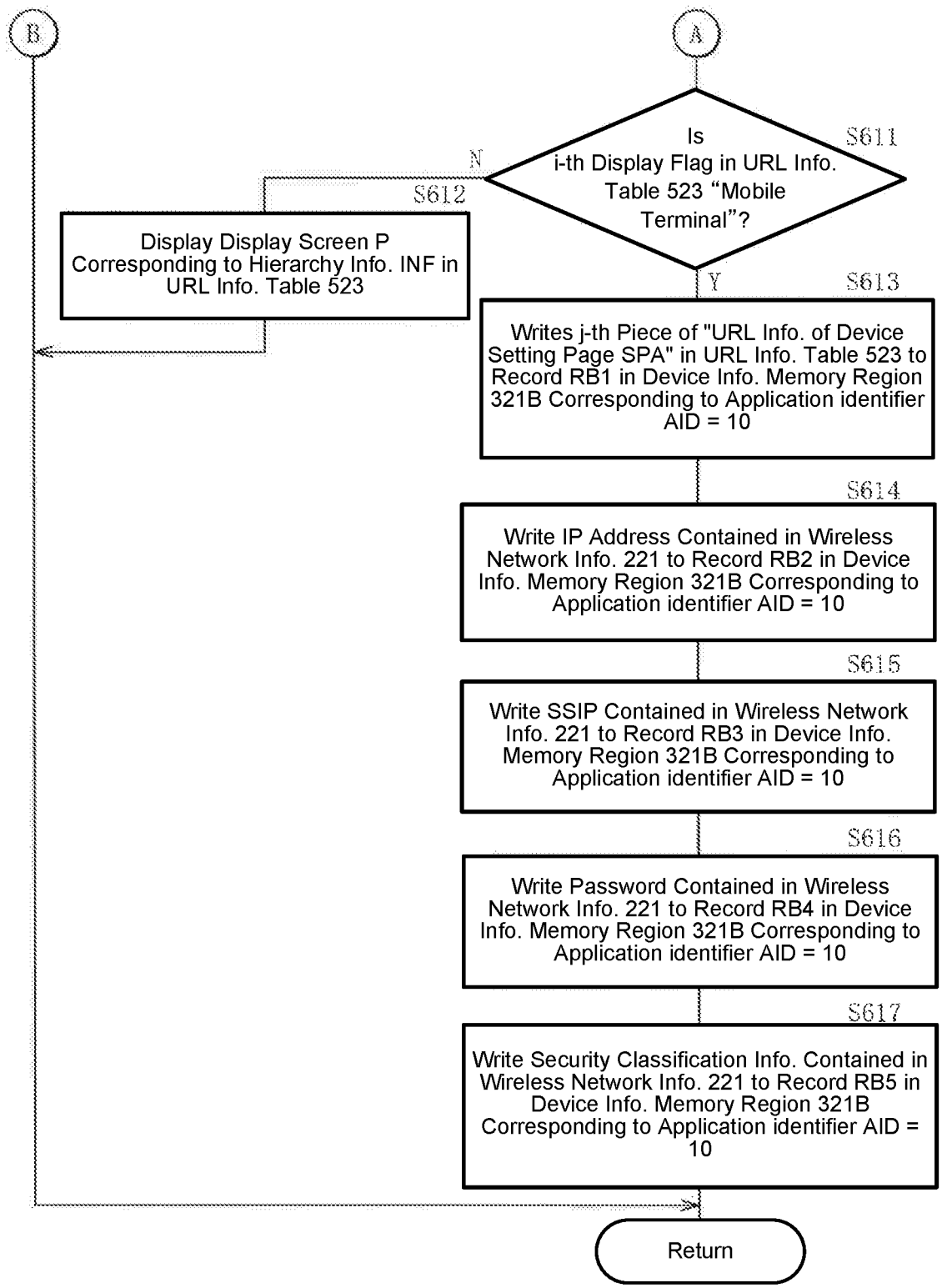
FIG. 30B is another flow chart showing an example of the write process of the third embodiment.

FIGS. 30A and 30B display an example subroutine of the write process A2 of the write control part 56.

First, the write control part 56 acquires the information (URL information of a manual page MP) stored in a record RA1 of a terminal information memory region 321A of an NDEF message region 321 corresponding to an application identifier AID=10 (S601). If the URL information of the manual page MP could not be acquired ("N" in S602), this subroutine of the write process A2 ends.

If the URL information of the manual page MP could be acquired ("Y" in S602), the write control part 56 sets a variable j to 0 (j=0) (S603).

Next, the write control part 56 checks the j-th piece of information of the URL information table 523 (FIG. 29) (S604). If there is no j-th piece of information in the URL information table 523 ("N" in S605), this subroutine of the write process A2 ends.

If there is the j-th piece of information in the URL information table 523 ("Y" in S605), the write control part 56 compares the "URL information of the manual page MP" acquired in S601 with the j-th piece of "URL information of the manual page MP" in the URL information table 523 (S606). If the two pieces of "URL information of the manual page MP" do not match ("N" in S607), it increments the variable j (S608) and returns to S604.

If the two pieces of "URL information of the manual page MP" match ("Y" in S607), the write control part 56 checks whether the j-th display flag in the URL information table 523 is "Mobile Terminal" (S611). If the j-th display flag in the URL information table 523 is not "Mobile Terminal" ("N" in S611), based on an instruction from the write control part 56, the display part 17 displays the display screen P corresponding to the j-th piece of hierarchy information INF in the URL information table 523 (S518). Then, this subroutine of the write process A2 ends.

If the j-th display flag in the URL information table 523 is "Mobile Terminal" ("Y" in S611), the write control part 56 writes the j-th piece of "URL information of the device setting page SPA" in the URL information table 523 to a record RB1 in a device information memory region 321B of the NDEF message region 321 corresponding to the application identifier AID=10 (S613).

Next, the write control part 56 writes an IP address contained in wireless network information 221 to a record RB2 in the device information memory region 321B of the NDEF message region 321 corresponding to the application identifier AID=10 (S614).

Next, the write control part 56 writes an SSID contained in the wireless network information 221 to a record RB3 in the device information memory region 321B of the NDEF message region 321 corresponding to the application identifier AID=10 (S615).

Next, the write control part 56 writes a password contained in wireless network information 221 to a record RB4 in the device information memory region 321B of the NDEF message region 321 corresponding to the application identifier AID=10 (S616).

Next, the write control part 56 writes security classification information contained in wireless network information 221 to a record RB5 in the device information memory region 321B of the NDEF message region 321 corresponding to the application identifier AID=10 (S617).

Here, this subroutine of the write process A2 ends.

In this manner, in the information processing system 3, based on the URL information of the manual page MP supplied from the mobile terminal 30, the image processing device 50 selectively judges whether to display the display screen P or let the mobile terminal 30 display the device setting page SPA. Thereby, in the information processing system 3, for example, when performing a device setting with many setting items, the device setting page SPA can be displayed on the mobile terminal 30. As a result, in the information processing system 3, user's convenience can be enhanced.

As stated above, in this embodiment, based on the URL information of the manual page supplied from the mobile terminal, it is selectively judged whether to display the display screen or let the mobile terminal display the device setting page, therefore user's convenience can be enhanced.

4. Fourth Embodiment

Next, an information processing system 4 of the fourth embodiment is explained. This embodiment lets a mobile terminal display the same setting related screen as a screen displayed on an image processing device. Note that its components that are essentially the same as those of the information processing system 1 of the first embodiment mentioned above are given the same codes, and their explanations are omitted as appropriate.

As shown in FIG. 1, the information processing system 4 is provided with an image processing device 60 and a mobile terminal 70. In the information processing system 4, when the mobile terminal 70 is displaying a manual page MP concerning a device setting, by its user holding the mobile terminal 70 over the image processing device 60, the mobile terminal 70 displays one of a device setting page SPA, a setting confirmation page SPB, a device setting screen SQA, and a setting confirmation screen SQB corresponding to the displayed manual page MP. The device setting screen SQA is a screen for performing a device setting of the image processing device 60 in the same manner as in the device setting page SPA of the first embodiment mentioned above. The setting confirmation screen SQB is a screen for confirming a device setting of the image processing device 60 in the same manner as in the setting confirmation page SPB of the first embodiment mentioned above.

Figure 31:
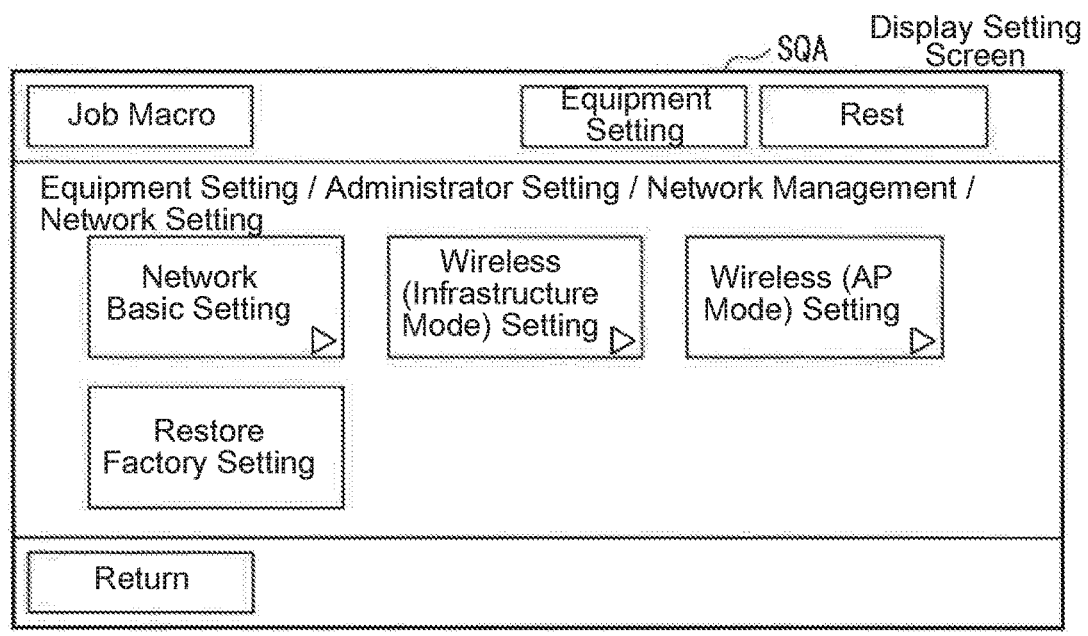
FIG. 31 is an explanatory diagram showing an example of the device setting screen.

FIG. 31 shows an example of the display screen when the mobile terminal 70 is displaying a device setting screen SQA. In this example, the mobile terminal 70 is displaying the device setting screen SQA concerning the network setting. That is, this device setting screen SQA corresponds to the manual page MP concerning the operation method of the network setting. The device setting screen SQA is, for example, the same screen as the screen displayed on the display part 17 of the image processing device 60 when an administrator of the image processing device 60 performs the network setting by operating the operation part 16 of the image processing device 60.

Figure 32:
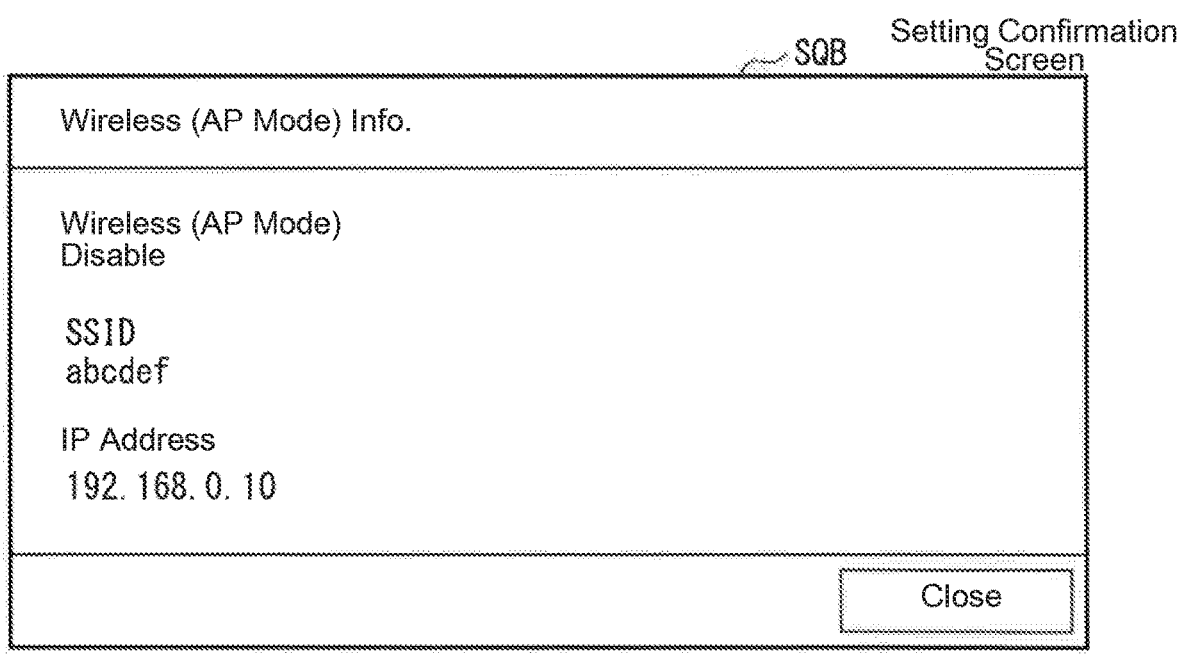
FIG. 32 is an explanatory diagram showing an example of the setting confirmation screen.

FIG. 32 shows an example of the display screen when the mobile terminal 70 is displaying a setting confirmation screen SQB. In this example, the mobile terminal 70 is displaying the setting confirmation screen SQB concerning the network setting. That is, this setting confirmation screen SQB corresponds to the manual page MP concerning the operation method of the network setting shown in FIG. 2. The setting confirmation screen SQB is, for example, the same screen as the screen displayed on the display part 17 of the image processing device 60 when a general user of the image processing device 60 confirms the network setting by operating the operation part 16 of the image processing device 60.

The mobile terminal 70 stores an image database 762 (mentioned below) containing image data of the device setting screens SQAs and the setting confirmation screens SQBs, and operation guide application software 761 (mentioned below) displays a device setting screen SQA or setting confirmation screen SQB using this image database 762. The image database 762 is stored in the mobile terminal 70 when the operation guide application software 761 is installed. This image database 762 is configured so as to be used on a platform of the image processing device 60. That is, the image database 762 is, for example, configured so that it can be handled on an operating system used in the image processing device 60. Then, if an operating system used in the mobile terminal 70 has compatibility with the operating system used in the image processing device 60, the mobile terminal 70 can handle this image database 762 and therefore can display a device setting screen SQA or setting confirmation screen SQB using this image database 762.

In the information processing system 4, by the user holding the mobile terminal 70 over the image processing device 60 when the mobile terminal 70 is displaying the manual page MP concerning a device setting, in addition to URL information of the manual page MP, information on the operating system of the mobile terminal 70 (terminal OS information IOS) is supplied to the image processing device 60. Then, based on this terminal OS information IOS, the image processing device 60 checks whether the operating system used in the mobile terminal 70 has compatibility with the operating system used in the image processing device 60, and if it has compatibility, it supplies a screen identifier QID to the mobile terminal 70. Thereby, based on this screen identifier QID, the mobile terminal 70 can display a device setting screen SQA or setting confirmation screen SQB using the image database 762.

Also, if the operating systems have no compatibility, the image processing device 60 supplies URL information of a device setting page SPA or setting confirmation page SPB to the mobile terminal 70 in the same manner as in the first embodiment. Thereby, based on this URL information, the mobile terminal 70 can display the device setting page SPA or setting confirmation page SPB in the same manner as in the first embodiment.

Hereafter, "setting related screen SQ" is used as indicating either device setting screen SQA or setting confirmation screen SQB as appropriate.

Figure 33:
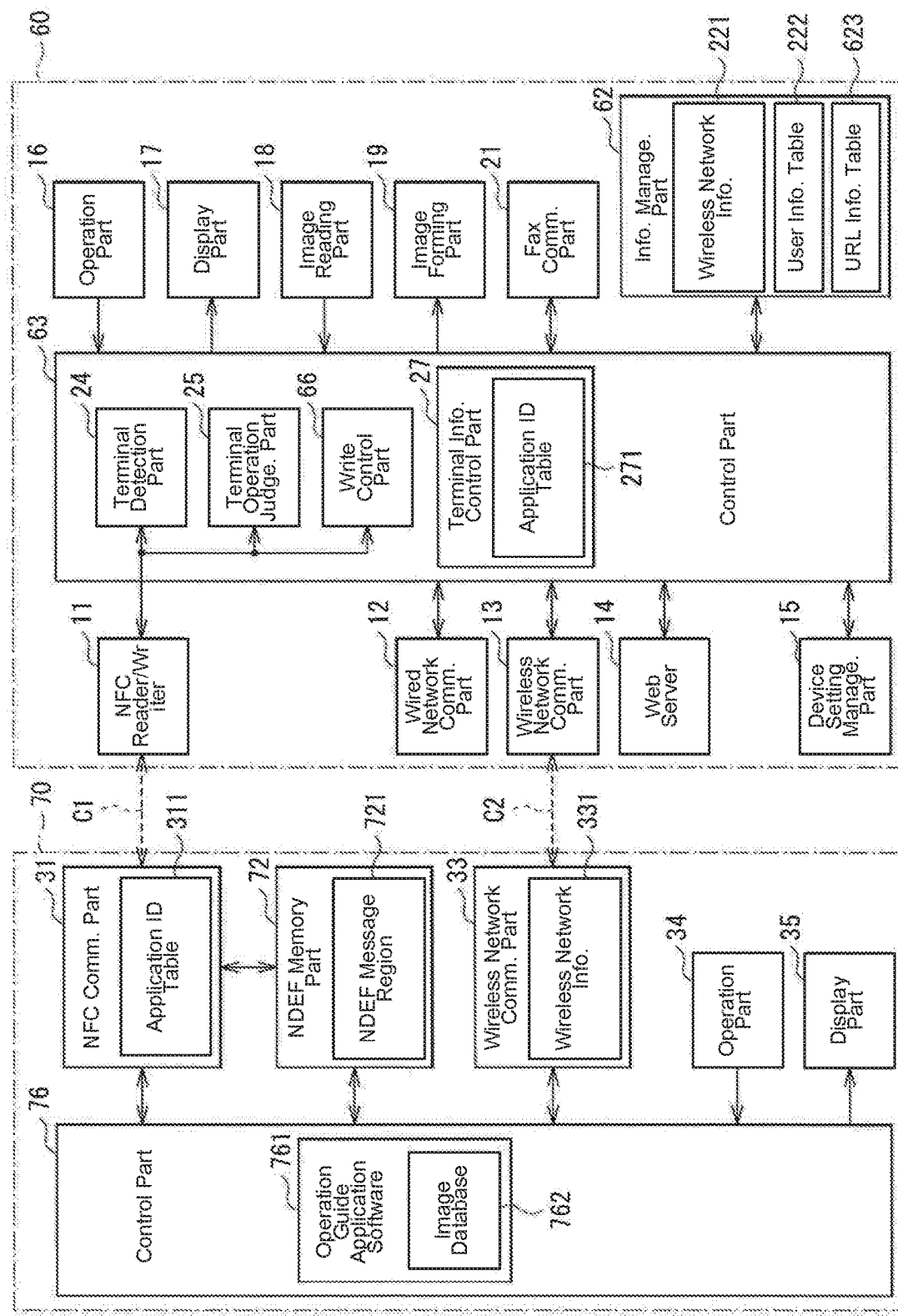
FIG. 33 is a block diagram showing a configuration example of the image processing device and the mobile terminal of the fourth embodiment.

FIG. 33 shows a configuration example of the image processing device 60 and the mobile terminal 70.

The image processing device 60 has an information management part 62 and a control part 63. The information management part 62 manages a URL information table 623.

FIG. 34 shows an example of the URL information table 623. Stored in the URL information table 623 are URL information of the manual pages MPs, URL information of the device setting pages SPAs, URL information of the setting confirmation pages SPBs, the screen identifiers QIDs of the device setting screens SQAs, and the screen identifiers QIDs of the setting confirmation screens SQBs in association with each other. The screen identifier QID is a proper identifier of each setting related screen SQ and is associated with the setting related screen SQ.

The control part 63 has a write control part 66. The write control part 66 performs a write process A2 that writes information to the mobile terminal 70.

The mobile terminal 70 has a control part 76 and an NDEF memory part 72.

The control part 76 executes the operation guide application software 761. The operation guide application software 761 contains the image database 762. Stored is the image database 762 are image data of the setting related screens SQs and the screen identifiers QIDs of the setting related screens SQs in association with each other. The image database 762 is stored in a nonvolatile memory device of the control part 76 for example when the operation guide application software 761 is installed. The mobile terminal 70 can display a setting related screen SQ based on a screen identifier QID supplied from the image processing device 60.

The NDEF memory part 72 stores information exchanged using near field wireless communication C1. Set in the NDEF memory part 72 is an NDEF message region 721.

Figure 35:
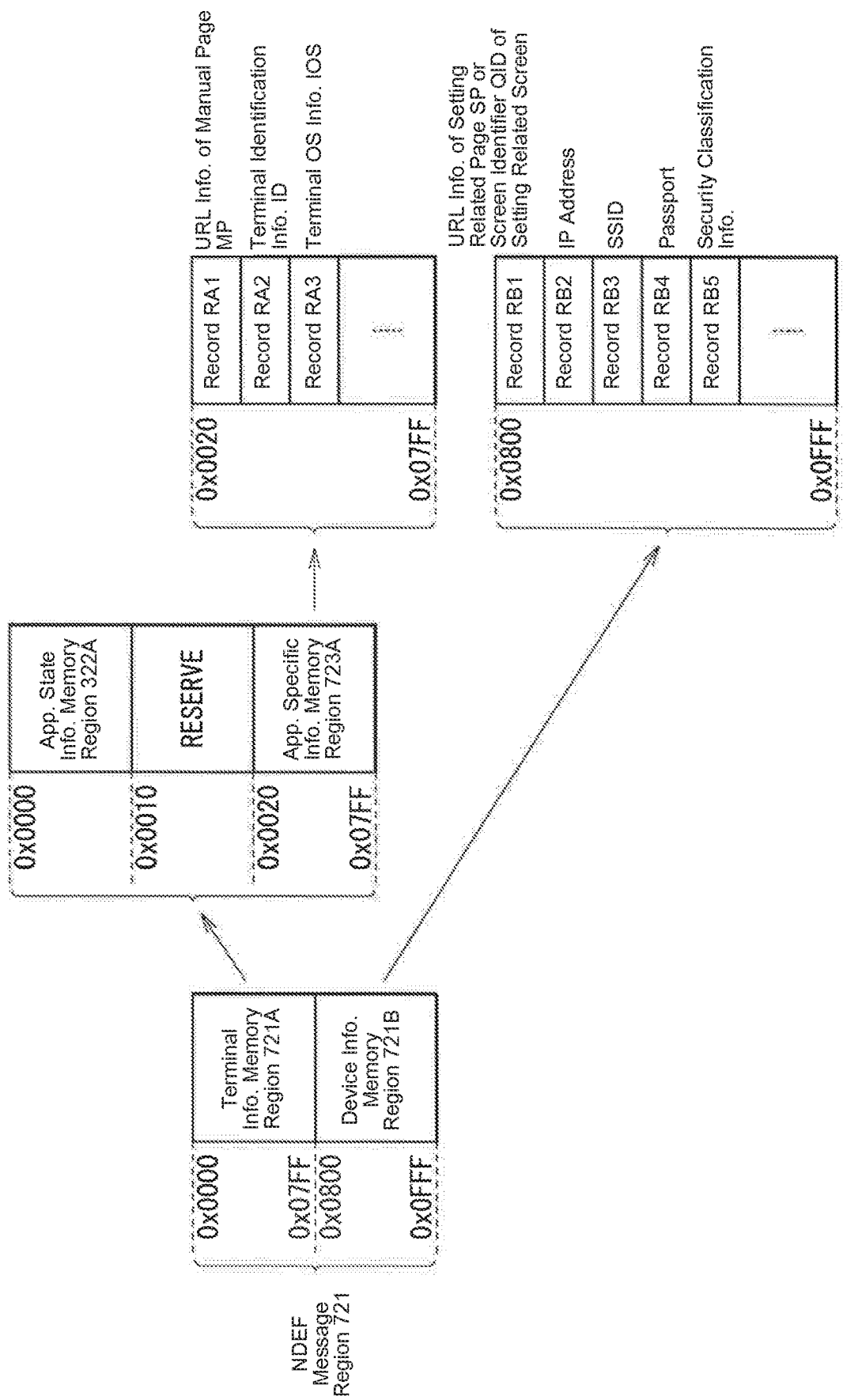
FIG. 35 is an explanatory diagram showing a configuration example of the NDEF message region shown in FIG. 33.

FIG. 35 shows an example of the NDEF message region 721. The NDEF message region 721 contains a terminal information memory region 721A and a device information memory region 721B.

The terminal information memory region 721A contains an application specific information memory region 723A. Stored in a record RA1 of the application specific information memory region 723A is URL information of a manual page MP, stored in a record RA2 is the terminal identification information ID of the mobile terminal 70, and stored in a record RA3 is the terminal OS information IOS. The terminal OS information IOS is information on an operating system used in the mobile terminal 70, and for example contains information such as an identifier for identifying the operating system and version information of the operating system.

Stored in a record RB1 of the device information memory region 721B is URL information of a setting related page SP (device setting page SPA or setting confirmation page SPB)

or the screen identifier QID of a setting related screen SQ (device setting screen SQA or setting confirmation screen SQB), stored in a record RB2 is an IP address, stored in a record RB3 is an SSID, stored in a record RB4 is a password, and stored in a record RB5 is security classification information.

Here, the mobile terminal 70 corresponds to a specific example of the "terminal device" in this invention. The control part 76 corresponds to a specific example of the "control part" in this invention. The image processing device 60 corresponds to a specific example of the "information processing device" in this invention. The information management part 62, a web server 14, the device setting management part 15, and the control part 63 correspond to a specific example of the "generation part" in this invention. The information management part 62 corresponds to a specific example of the "database" in this invention. The device setting pages SPAs, the setting confirmation pages SPBs, the device setting screens SQAs, and the setting confirmation screens SQBs correspond to a specific example of the "first setting related information" in this invention. The terminal OS information IOS corresponds to a specific example of the "platform identifier" in this invention.

Figure 36A:
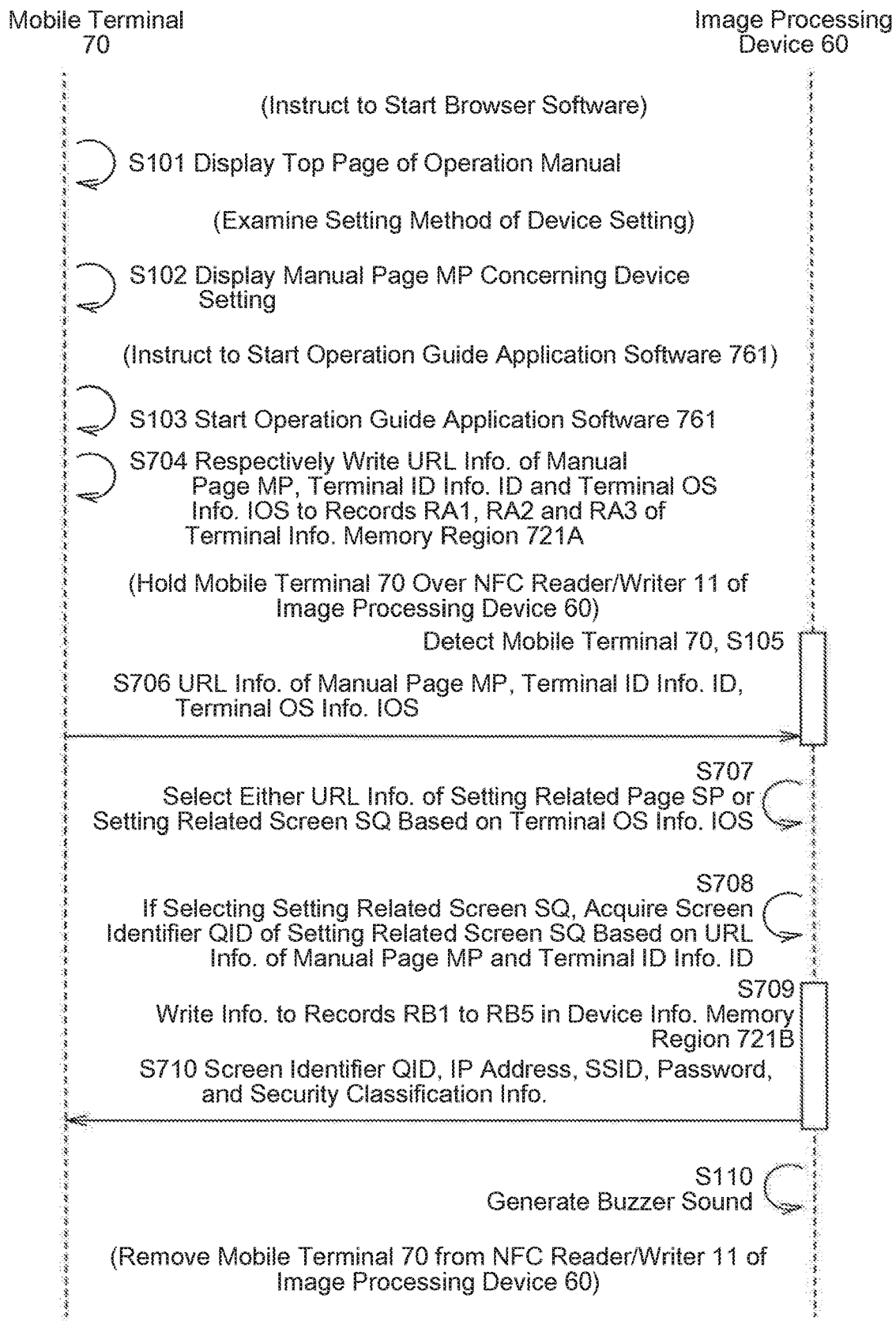
FIG. 36A is a sequence diagram showing an operation example of the information processing system of the fourth embodiment.

FIGS. 36A and 36B show an operation example of the information processing system 4. First, once the user instructs to start browser software by operating an operation part 34 of the mobile terminal 70, a display part 35 of the mobile terminal 70 displays the top page of the operation manual of the image processing device 60 (S101). Then, the user examines the setting method of a device setting by continuing to operate the operation part 34 and performing a keyword search in the operation manual for example. Then, as shown in FIG. 2 for example, the display part 35 of the mobile terminal 70 displays the manual page MP concerning the device setting (S102).

Next, once the user instructs to start the operation guide application software 761, the control part 76 of the mobile terminal 70 starts the operation guide application software 761 (S103). Then, the operation guide application software 761 stores application state information containing a flag "1", indicating a state where the operation guide application software 761 is installed and has been started, in an application state information memory region 322A in the terminal information memory region 721A of the NDEF message region 721 corresponding to the operation guide application software.

Next, the operation guide application software 761 writes the URL information of the manual page MP displayed by the display part 35 to the record RA1, the terminal identification information ID of the mobile terminal 70 to the record RA2, and the terminal OS information IOS to the record RA3 in the terminal information memory region 721A of the NDEF message region 721 (S704). Then, the operation guide application software 761 deletes all the information stored in the device information memory region 721B of the NDEF message region 721.

Next, once the user holds the mobile terminal 70 over an NFC reader/writer 11 of the image processing device 60, a terminal detection part 24 of the image processing device 60 detects the mobile terminal 70 (S105). Then, using near field wireless communication C1, the NFC reader/writer 11 of the image processing device 60 reads the URL information of the manual page MP stored in the record RA1, the terminal identification information ID stored in the record RA2, and the terminal OS information IOS stored in the record RA3 in the terminal information memory region 721A of the mobile terminal 70 (S706).

Next, based on the terminal OS information IOS read in S706, the control part 63 of the image processing device 60 selects one of a setting related page SP and a setting related screen SQ (S707). Specifically, based on the terminal OS information IOS, the control part 63 checks whether the operating system of the mobile terminal 70 has compatibility with the operating system of the image processing device 60. Then, if it has compatibility, the control part 63 selects a setting related screen SQ, and if it has no compatibility, it selects a setting related page SP. Below, an explanation is given citing an example of the case where the control part 63 selected the setting related screen SQ.

If the control part 63 selected a setting related screen SQ based on the terminal OS information IOS in S707, based on the URL information of the manual page MP and the terminal identification information ID read in S706, it acquires the screen identifier QID of the setting related screen SQ (S708). Specifically, first based on the terminal identification information ID read in S706, using a user information table 222 (FIG. 7) managed by the information management part 62, the control part 63 acquires authority information corresponding to the terminal identification information ID. Then, based on the URL information of the manual page MP read in S706, using the URL information table 623 (FIG. 34) managed by the information management part 62, the control part 63 acquires the screen identifier QID of the setting related screen SQ (device setting screen SQA or setting confirmation screen SQB) corresponding to the URL information of the manual page MP. In doing so, if the acquired authority information indicates that the user is registered as an administrator, the control part 63 acquires the screen identifier QID of the device setting screen SQA, and if it indicates that the user is registered as a general user, it acquires the screen identifier QID of the setting confirmation screen SQB.

Next, using the near field wireless communication C1, the NFC reader/writer 11 of the image processing device 60 writes the screen identifier QID of the setting related screen SQ to the record RB1, and the IP address, the SSID, the password, and the security classification information to the records RB2-RB5, respectively, in the device information memory region 721B of the mobile terminal 70 (S709). Thereby, the screen identifier QID of the setting related screen SQ, the IP address, the SSID, the password, and the security classification information are supplied to the mobile terminal 70 (S710).

Next, the image processing device 60 generates a buzzer sound (S110). Thereby, the image processing device 60 notifies the user that the mobile terminal 70 can be removed from the NFC reader/writer 11. In response to this, the user removes the mobile terminal 70 from the NFC reader/writer 11 of the image processing device 60.

The operation guide application software 761 of the mobile terminal 70 detects that the mobile terminal 70 has been removed from the NFC reader/writer 11, and lets wireless network information 331 stored in a wireless network communication part 33 retreat tentatively to RAM as wireless network information 331A (S111).

Next, based on the information (IP address, SSID, password, and security classification information) stored in the records RB2-RB5 of the device information memory region 721B, the operation guide application software 761 performs the network setting (S112). Thereby, the wireless network communication part 33 hereafter can communicate with the image processing device 60 using the wireless network communication C2.

Next, the display part 35 of the mobile terminal 70 displays a setting related screen SQ corresponding to the screen identifier QID stored in the record RB1 of the device information memory region 721B (S713). Specifically, using the image database 762, the operation guide application software 761 of the mobile terminal 70 specifies image data of the setting related screen SQ corresponding to the screen identifier QID stored in the record RB1 of the device information memory region 721B, and the display part 35 displays the setting related screen SQ based on this image data.

Then, the user operates the operation part 34 of the mobile terminal 70. That is, for example, if the user is an administrator of the image processing device 60, as shown in FIG. 31 for example, the display part 35 displays the device setting screen SQA. In this case, the user instructs to change a device setting by operating the operation part 34. The mobile terminal 70 supplies the device setting change instruction to the image processing device 60, and the device setting management part 15 of the image processing device 60 changes the device setting based on the instruction. In this manner, the user can perform a device setting of the image processing device 60. Also, for example, if the user is a general user of the image processing device 60, as shown in FIG. 32 for example, the display part 35 displays a setting confirmation screen SQB. In this case, the user can confirm a device setting of the image processing device 60.

Then, once the user instructs to end the operation guide application software 761 by operating the operation part 34 of the mobile terminal 70, the operation guide application software 761 performs the network setting by having the wireless network information 331A that retreated to the RAM in S111 stored again by the wireless network communication part 33 as the wireless network information 331 (S116).

Then, the control part 76 of the mobile terminal 70 ends the operation guide application software 761 (S117).

Here, this sequence ends.

Although in this example the control part 63 selected the setting related screen SQ in S707 because the operating systems have compatibility, if the operating systems have no compatibility, the control part 63 selects a setting related page SP. Explained below is the operation in the case where the operating systems have no compatibility.

Figure 37B:
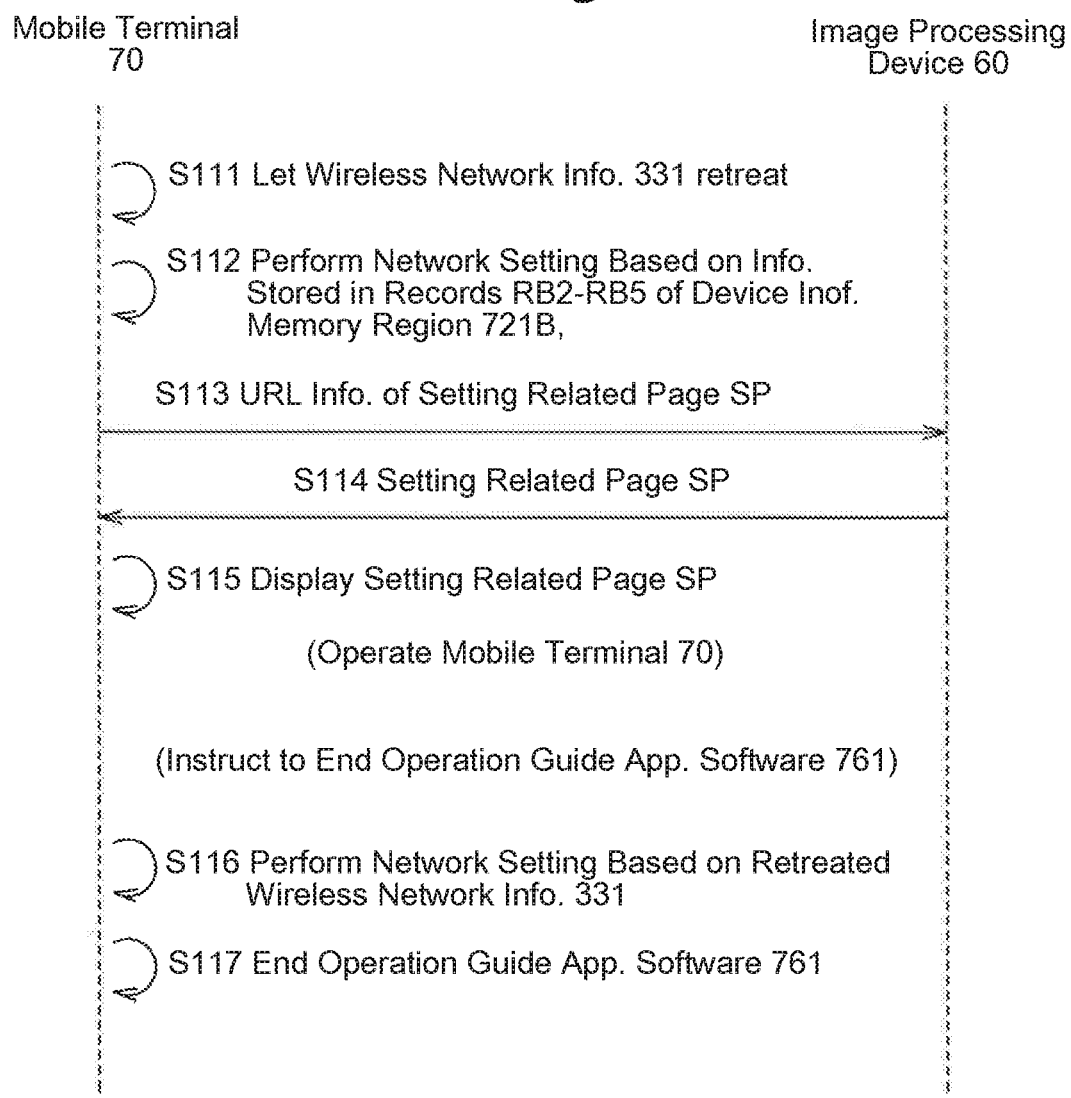
FIG. 37B is another sequence diagram showing another operation example of the information processing system of the fourth embodiment.

FIGS. 37A and 37B show an operation example of the information processing system 4 in the case where the operating systems have no compatibility. S101-S103, S704, S105, S706, and S707 are the same as in FIG. 36A.

If the setting related page SP is selected in S707, based on the URL information of the manual page MP and the terminal identification information ID read in S706, the control part 63 acquires URL information of the setting related page SP (S718). Specifically, first based on the terminal identification information ID read in S706, the control part 63 acquires authority information corresponding to the terminal identification information ID using the user information table 222 (FIG. 7) managed by the information management part 62. Then, based on the URL information of the manual page MP read in S706, the control part 63 acquires URL information of the setting related page SP (device setting page SPA or setting confirmation page SPB) using the URL information table 623 (FIG. 34) managed by the information management part 62. In doing so, if the acquired authority information indicates that the user is registered as an administrator, the control part 63 acquires URL information of the device setting page SPA, and if it indicates that the user is registered as a general user, it acquires URL information of the setting confirmation page SPB.

Next, using the near field wireless communication C1, the NFC reader/writer 11 of the image processing device 60 writes the URL information of the setting related page SP to the record RB1, and the IP address, the SSID, the password, and the security classification information to the records RB2-RB5, respectively, in the device information memory region 721B of the mobile terminal 70 (S108). Thereby, the URL information of the setting related page SP, the IP address, the SSID, the password, and the security classification information are supplied to the mobile terminal 70 (S109).

Next, the image processing device 60 generates a buzzer sound (S110). Thereby, the image processing device 60 notifies the user that the mobile terminal 70 can be removed from the NFC reader/writer 11. In response to this, the user removes the mobile terminal 70 from the NFC reader/writer 11 of the image processing device 60.

Operations hereafter are the same as in the first embodiment mentioned above (FIG. 14B).

S706-S710 in FIG. 36A, and S706, S707, S718, S108, and S109 in FIG. 37A correspond to the write process A2 of the write control part 66. Next, this write process A2 is explained in detail.

Figure 38A:
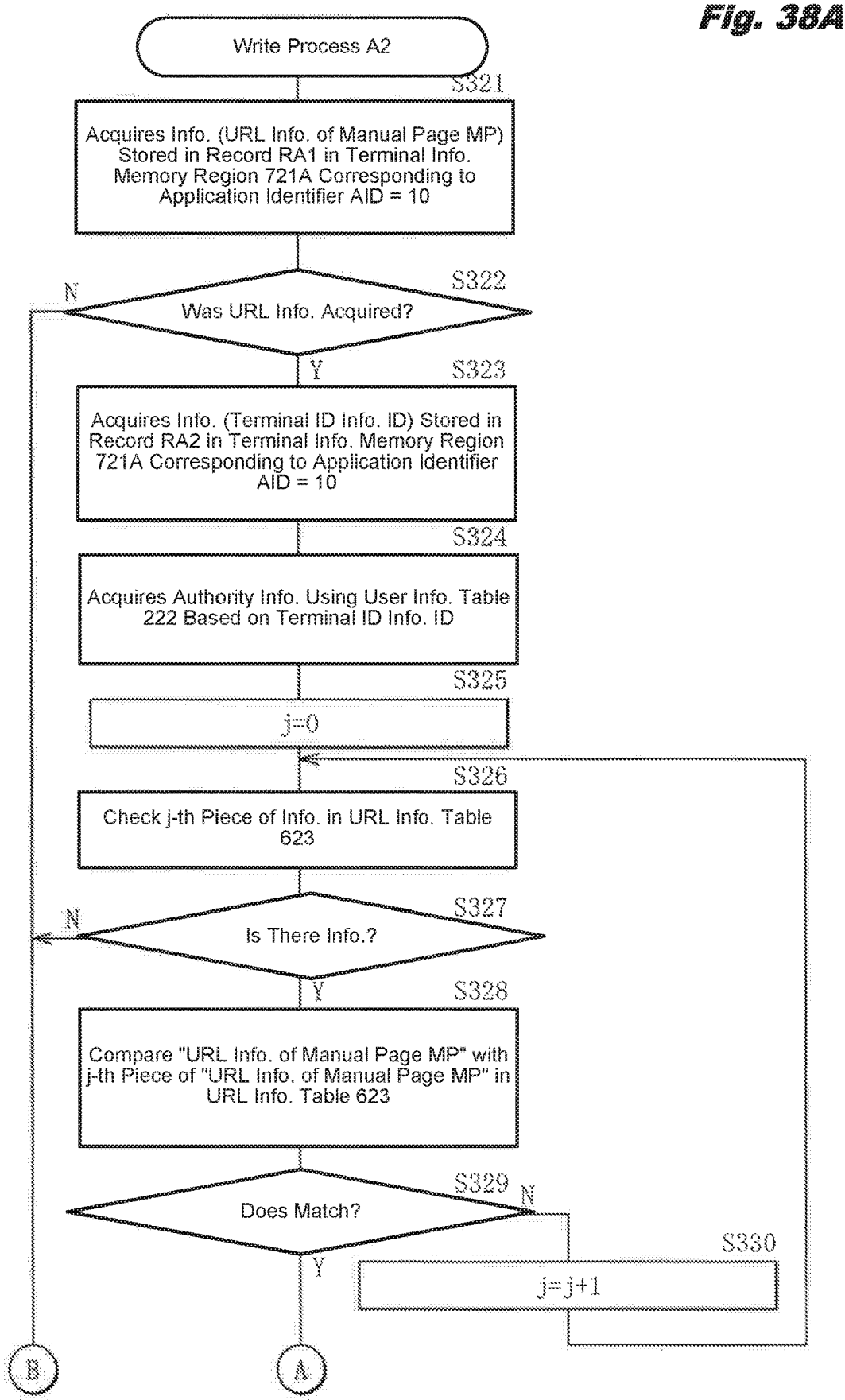
FIG. 38A is a flow chart showing an example of the write process of the fourth embodiment.
Figure 38B:
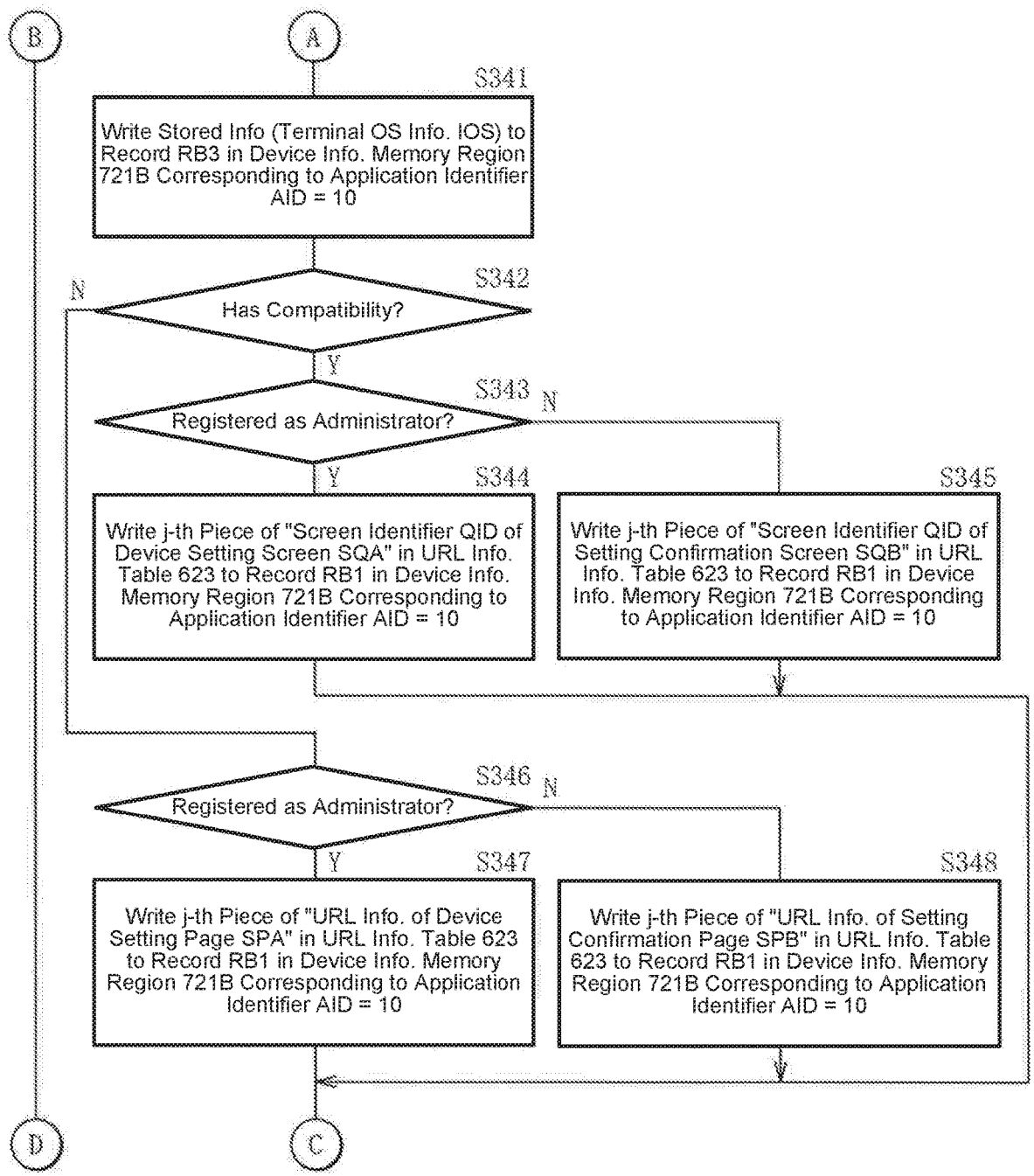
FIG. 38B is another flow chart showing an example of the write process of the fourth embodiment.
Figure 38C:
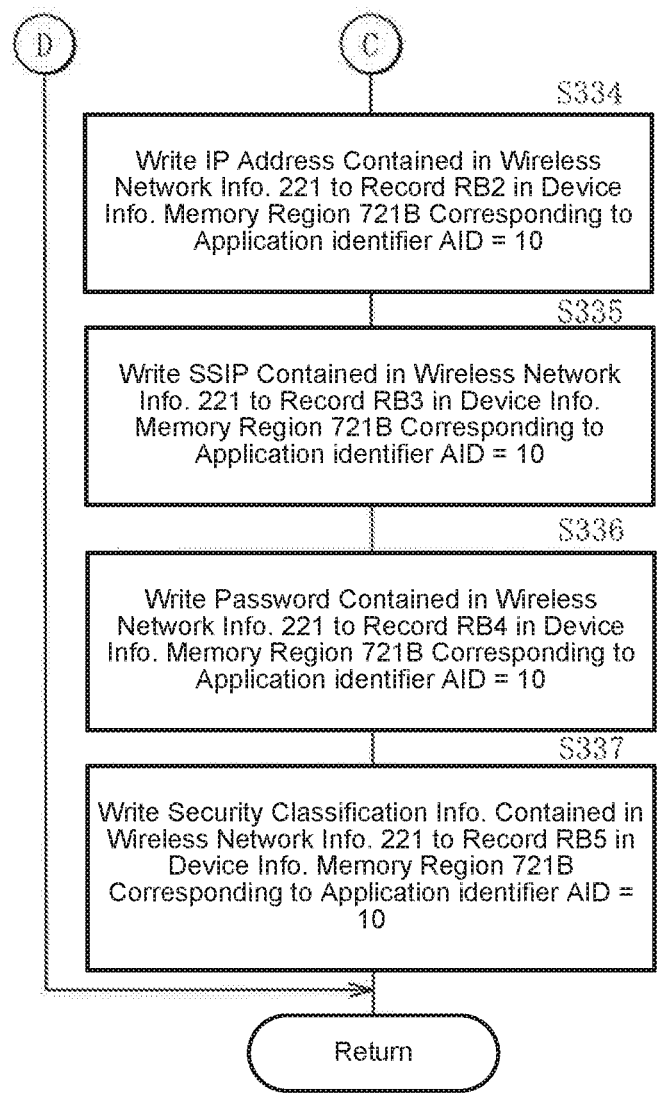
FIG. 38C is another flow chart showing an example of the write process of the fourth embodiment.

FIGS. 38A-38C show an example subroutine of the write process A2 of the write control part 66.

First, the write control part 66 acquires the information (URL information of the manual page MP) stored in the record RA1 in the terminal information memory region 721A of the NDEF message region 721 corresponding to the application identifier AID=10 (S321). If the URL information of the manual page MP could not be acquired ("N" in S322), this subroutine of the write process A2 ends.

If the URL information of the manual page MP could be acquired ("Y" in S322), the write control part 66 acquires the information (terminal identification information ID) stored in the record RA2 in the terminal information memory region 721A of the NDEF message region 721 corresponding to the application identifier AID=10 (S323).

Next, based on the terminal identification information ID acquired in S323, the write control part 66 acquires authority information corresponding to the terminal identification information ID using the user information table 222 (FIG. 7) (S324).

Next, the write control part 66 sets a variable j to 0 (j=0) (S325).

Next, the write control part 66 checks the j-th piece of information in the URL information table 623 (FIG. 34) (S326). If there is no j-th information in the URL information table 623 ("N" in S327), this subroutine of the write process A2 ends.

If there is the j-th piece of information in the URL information table 623 ("Y" in S327), the write control part 66 compares the "URL information of the manual page MP" acquired in S321 with the j-th piece of "URL information of the manual page MP" in the URL information table 623 (S328). If the two pieces of "URL information of the manual page MP" do not match ("N" in S329), the write control part 66 increments the variable j (S330) and returns to S326.

If the two pieces of "URL information of the manual page MP" match ("Y" in S329), the write control part 66 acquires the information (terminal OS information IOS) stored in the record RA3 in the terminal information memory region 721A of the NDEF message region 721 corresponding to the application identifier AID=10 (S341).

Next, based on the terminal OS information IOS acquired in S341, the write control part 66 checks whether the operating system of the mobile terminal 70 has compatibility with the operating system of the image processing device 60 (S342).

If in S342 there is compatibility between the operating systems ("Y" in S342), the write control part 66 checks the authority information acquired in S324 (S343). If this authority information indicates registration as an administrator ("Y" in S343), the write control part 66 writes the j-th "screen identifier QID of the device setting screen SQA" in the URL information table 623 to the record RB1 in the device information memory region 721B of the NDEF message region 721 corresponding to the application identifier AID=10 (S344). Also, if the authority information indicates registration as a general user ("N" in S343), the write control part 66 writes the j-th "screen identifier QID of the setting confirmation screen SQB" in the URL information table 623 to the record RB1 in the device information memory region 721B of the NDEF message region 721 corresponding to the application identifier AID=10 (S345). Then, it proceeds to S334.

On the other hand, if in S342 there is no compatibility between the operating systems ("N" in S342), the write control part 66 checks the authority information acquired in S324 (S346). If this authority information indicates registration as an administrator ("Y" in S346), the write control part 66 writes the j-th piece of "URL information of the device setting page SPA" in the URL information table 623 to the record RB1 in the device information memory region 721B of the NDEF message region 721 corresponding to the application identifier AID=10 (S347). Also, if the authority information indicates registration as a general user ("N" in S346), the write control part 66 writes the j-th piece of "URL information of the setting confirmation page SPB" in the URL information table 623 to the record RB1 in the device information memory region 721B of the NDEF message region 721 corresponding to the application identifier AID=10 (S348). Then, it proceeds to S334.

Next, the write control part 66 writes the IP address contained in the wireless network information 221 to the record RB2 in the device information memory region 721B of the NDEF message region 721 corresponding to the application identifier AID=10 (S334).

Next, the write control part 66 writes the SSID contained in the wireless network information 221 to the record RB3 in the device information memory region 721B of the NDEF message region 721 corresponding to the application identifier AID=10 (S335).

Next, the write control part 66 writes the password contained in the wireless network information 221 to the record RB4 in the device information memory region 721B of the NDEF message region 721 corresponding to the application identifier AID=10 (S336).

Next, the write control part 66 writes the security classification information contained in the wireless network information 221 to the record RB5 in the device information memory region 721B of the NDEF message region 721 corresponding to the application identifier AID=10 (S337).

Here, this subroutine of the write process A2 ends.

Figure 39:
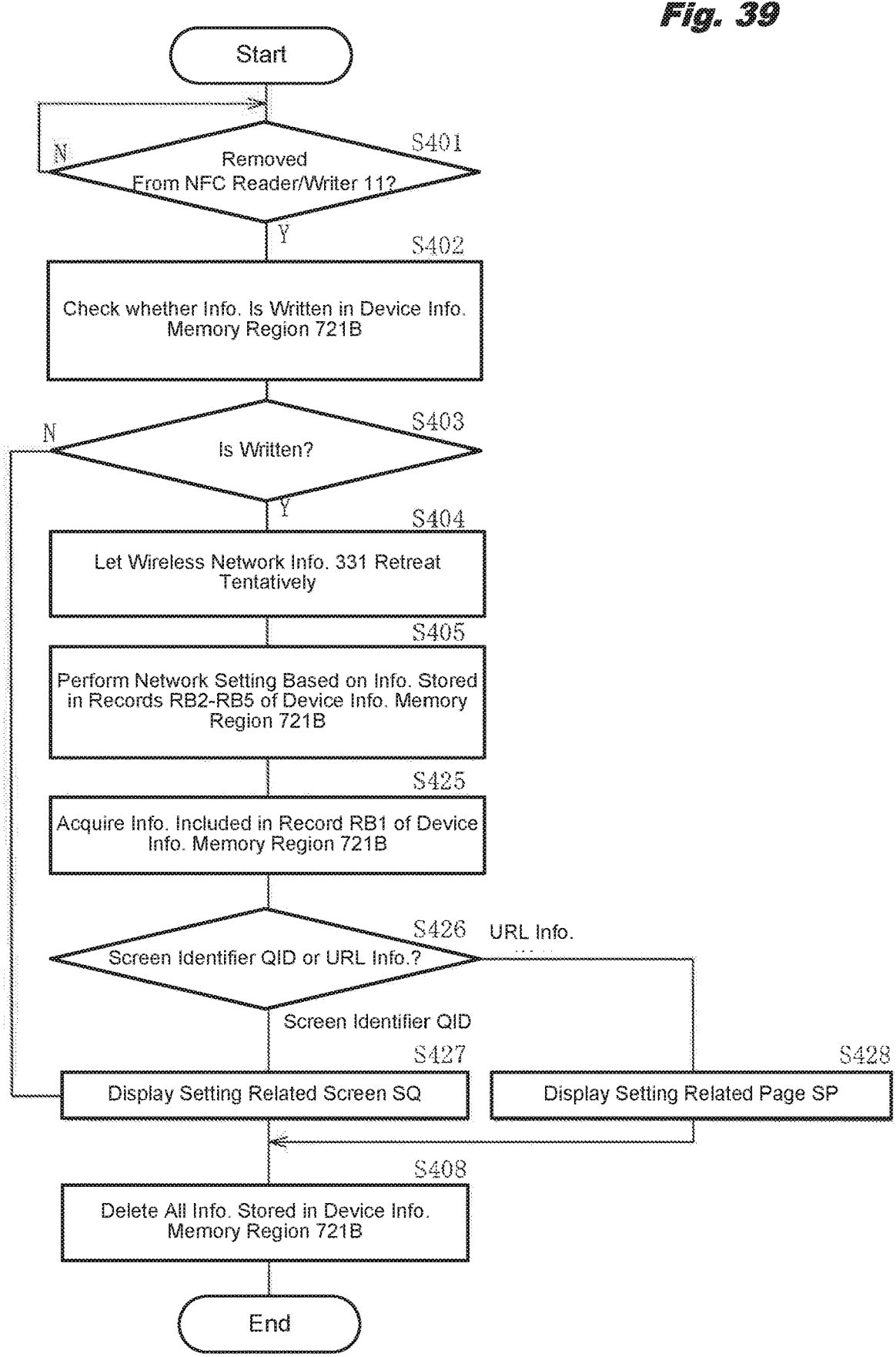
FIG. 39 is a flow chart showing an operation example of the information processing system of the fourth embodiment.

FIG. 39 shows an operation example of the mobile terminal 70 after the user removed the mobile terminal 70 from the NFC reader/writer 11 of the image processing device 60.

First, the operation guide application software 761 checks whether the mobile terminal 70 is removed from the NFC reader/writer 11 (S401). If the mobile terminal 70 is not removed from the NFC reader/writer 11 ("N" in S401), it returns to S401.

If the mobile terminal 70 is removed from the NFC reader/writer 11 ("Y" in S401), the operation guide application software 761 checks whether information is written in the device information memory region 721B of the NDEF message region 721 corresponding to the operation guide application software 761 (S402). If no information is written in the device information memory region 721B ("N" in S403), this flow ends.

If information is written in the device information memory region 721B ("Y" in S403), the operation guide application software 761 lets the wireless network information 331 stored in the wireless network communication part 33 retreat tentatively to the RAM as the wireless network information 331A (S404).

Next, based on the information (IP address, SSID, password, and security classification information) stored in the records RB2-RB5 of the device information memory region 721B, the operation guide application software 761 performs the network setting (S405).

Next, the operation guide application software 761 acquires information stored in the record RB1 of the device information memory region 721B (S425). Then, the operation guide application software 761 checks whether the information acquired in this S425 is the screen identifier QID of a setting related screen SQ or the URL information of a setting related page SP (S426).

If the information acquired in S425 is the screen identifier QID of a setting related screen SQ ("Screen Identifier QID" in S426), the operation guide application software 761 specifies image data of the setting related screen SQ corresponding to the screen identifier QID using the image database 762, and the display part 35 displays the setting related screen SQ based on this image data (S427).

On the other hand, if the information acquired in S425 is the URL information of a setting related page SP ("URL Information" in S426), the operation guide application software 761 supplies the URL information of the setting related page SP to the browser software, the browser software acquires the setting related page SP based on the URL information of the setting related page SP, and the display part 35 displays this setting related page SP (S428).

Next, the operation guide application software 761 deletes all the information stored in the device information memory region 721B (S408).

Here, this flow ends.

In this manner, in the information processing system 4, the mobile terminal 70 displays the same setting related screen SQ as the screen displayed on the image processing device 60. Thereby, by operating the mobile terminal 70 in the same manner as in directly operating the image processing device 60, the user can perform a device setting of the image processing device 60 or confirm a device setting of the image processing device 60, therefore user's convenience can be enhanced.

Also, in the information processing system 4, based on the terminal OS information IOS, the image processing device 60 supplies the screen identifier QID of a setting related screen SQ or the URL information of a setting related page SP to the mobile terminal 70. Specifically, if the operating system used in the mobile terminal 70 has compatibility with the operating system used in the image processing device 60, the image processing device 60 supplies the screen identifier QID of the setting related screen SQ to the mobile terminal 70, and if the operating system used in the mobile terminal 70 has no compatibility with the operating system used in the image processing device 60, the image processing device 60 supplies the URL information of the setting related page SP to the mobile terminal 70. Thereby, in the information processing system 4, even if the mobile terminal 70 cannot display the setting related screen SQ due to the lack of operating system compatibility, it can display the setting related page SP, and using this setting related page SP, the user can perform the device setting of the image processing device 60 or confirm the device setting of the image processing device 60, therefore user's convenience can be enhanced.

As stated above, in this embodiment, the mobile terminal displays the same setting related screen as the screen displayed on the image processing device, therefore user's convenience can be enhanced.

In this embodiment, because the image processing device supplies the screen identifier of a setting related screen or the URL information of a setting related page to the mobile terminal based on the terminal OS information, even if the mobile terminal cannot display the setting related screen due to the lack of operating system compatibility, it can display the setting related page, therefore user's convenience can be enhanced.

[Modification 4-1]

Although in the above embodiment, the mobile terminal 70 displayed a setting related page SP and a setting related screen SQ for performing a device setting of the image processing 60 and confirming a device setting of the image processing device 60, this invention is not limited to this. For example, combining the technology in the above-mentioned second embodiment with this information processing system 4 of the fourth embodiment, a job setting screen for setting a job such as copying can be displayed. This job setting screen can be the same as the screen displayed on the display part 17 of the image processing device 60 when the user of the image processing device 60 sets a job such as copying by operating the operation part 16 of the image processing device 60.

5. Fifth Embodiment

Next, an information processing system 5 of the fifth embodiment is explained. This embodiment stores a history database in a mobile terminal and lets the mobile terminal display a setting related screen SQ utilizing this database. Note that its components that are essentially the same as those of the information processing system 4 of the fourth embodiment mentioned above are given the same codes, and their explanations are omitted as appropriate.

As shown in FIG. 1, the information processing system 5 is provided with an image processing device 60 and a mobile terminal 80. In the information processing system 5, every time the mobile terminal 80 receives a screen identifier QID from the image processing device 60, it registers URL information of a manual page MP and this screen identifier QID in association with each other in a history database 863 (mentioned below). Then, utilizing this history database 863, the mobile terminal 80 displays the setting related screen SQ. Thereby, in the information processing system 5, without its user holding the mobile terminal 80 over the image processing device 60, the mobile terminal 80 can display the setting related screen SQ corresponding to the screen identifier QID registered in this history database 863.

Figure 40:
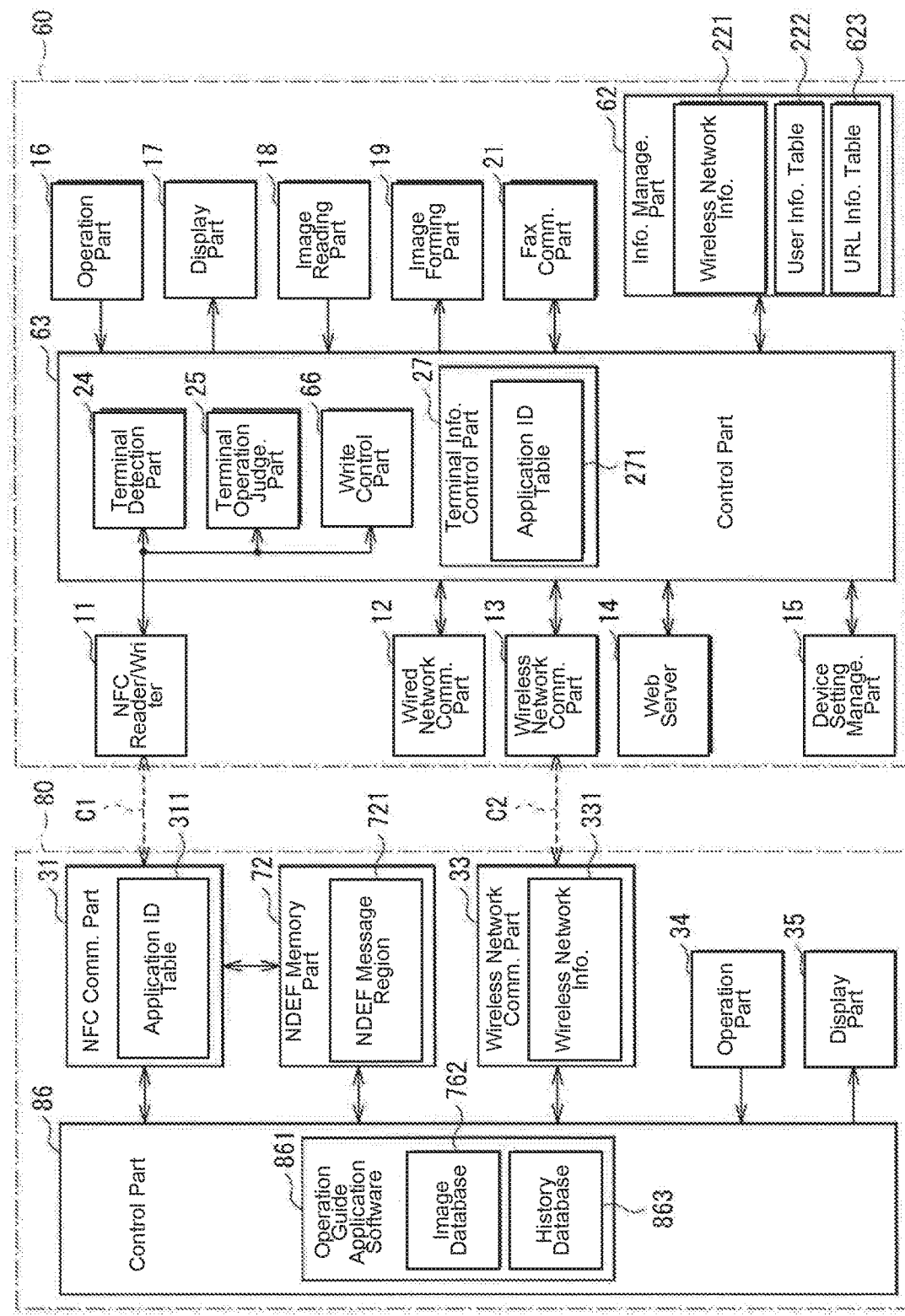
FIG. 40 is a block diagram showing a configuration example of the image processing device and the mobile terminal of the fifth embodiment.

FIG. 40 shows a configuration example of the mobile terminal 80. Note that in this FIG. 40 the image processing device 60 is also depicted. The mobile terminal 80 has a control part 86. The control part 86 executes operation guide application software 861. The operation guide application software 861 contains the history database 863.

FIG. 41 shows a configuration example of the history database 863. The history database 863 stores URL information of the manual pages MPs, the screen identifiers QIDs of device setting screens SQAs, the screen identifiers QIDs of setting confirmation screens SQBs, IP addresses, SSIDs, passwords, and security classification information in association with each other. The IP addresses, the SSIDs, the passwords, and the security classification information are information received from the image processing device 60 together with the screen identifiers QIDs and are information used when communicating with the image processing device 60 using a wireless network communication C2.

Shown in this example is the case where the user is registered as an administrator of the image processing device 60. Thereby, in the history database 863, the screen identifiers QIDs of device setting screens SQAs are registered, and the screen identifiers QIDs of setting confirmation screens SQBs are not registered. For example, if the user is registered as a general user of the image processing device 60, in the history database 863, the screen identifiers QIDs of setting confirmation screens SQBs are registered, and the screen identifiers QIDs of device setting screens SQAs are not registered. Also, in this example, because the mobile terminal 80 communicates only with the image processing device 60, the IP address, the SSID, the password, and the security classification information of only the image processing device 60 are registered. However, if communication with another image processing device is performed for example, the IP address, the SSID, the password, and the security classification information of that image processing device are registered.

Every time the operation guide application software 861 receives a screen identifier QID from the image processing device 60, it registers URL information of a manual page MP and this screen identifier QID in association with each other in the history database 863. In doing so, the operation guide application software 861 also registers in the history database 863 an IP address, an SSID, a password, and security classification information that were supplied from the image processing device 60 and are pieces of information used in communicating with the image processing device 60 using the wireless network communication C2.

When the operation guide application software 861 supplies URL information of the manual page MP to the image processing device 60, it checks whether the URL information is registered in this history database 863. Then, if the URL information of the manual page MP is registered in the history database 863, the operation guide application software 861 displays a device setting screen SQA or setting confirmation screen SQB using an image database 762, based on the screen identifier QID corresponding to the URL information.

FIG. 42 shows an operation example of the information processing system 5. First, once the user instructs to start browser software by operating an operation part 34 of the mobile terminal 80, a display part 35 of the mobile terminal 80 displays the top page of the operation manual of the image processing device 60 (S101). Then, the user examines the setting method of a device setting by continuing to operate the operation part 34 and performing a keyword search in the operation manual for example. Then, as shown in FIG. 2 for example, the display part 35 of the mobile terminal 80 displays the manual page MP concerning the device setting (S102).

Next, once the user instructs to start the operation guide application software 861, the control part 86 of the mobile terminal 80 starts the operation guide application software 861 (S103).

Next, the operation guide application software 861 checks whether the URL information of the manual page MP displayed by the display part 35 is registered in the history database 863 (S803). Explained below as an example is the case where the URL information of the manual page MP is registered in the history database 863.

If the URL information of the manual page MP is registered in the history database 863 in S803, the operation guide application software 861 acquires the screen identifier QID, the IP address, the SSID, the password, and the security classification information corresponding to the URL information (S804).

Next, the operation guide application software 861 lets wireless network information 331 stored in a wireless network communication part 33 retreat tentatively to RAM as wireless network information 331A (S805).

Next, based on the IP address, the SSID, the password, and the security classification information acquired in S804, the operation guide application software 861 performs the network setting (S806). Thereby, the wireless network communication part 33 hereafter can communicate with the image processing device 60 using the wireless network communication C2.

Next, the display part 35 of the mobile terminal 80 displays the setting related screen SQ corresponding to the screen identifier QID acquired in S804 (S807). Specifically, using the image database 762, the operation guide application software 861 of the mobile terminal 80 specifies image data of the setting related screen SQ corresponding to the screen identifier QID acquired in S804, and based on this image data, the display part 35 displays the setting related screen SQ.

Then, the user operates the operation part 34 of the mobile terminal 80. That is, for example, if the user is an administrator of the image processing device 60, as shown in FIG. 31 for example, the display part 35 displays a device setting screen SQA. In this case, by operating the operation part 34, the user instructs to change a device setting. The mobile terminal 80 supplies the device setting change instruction to the image processing device 60, and a device setting management part 15 of the image processing device 60 changes the device setting based on the instruction. In this manner, the user can perform a device setting of the image processing device 60. Also, for example, if the user is a general user of the image processing device 60, as shown in FIG. 32 for example, the display part 35 displays a setting confirmation screen SQB. In this case, the user can confirm a device setting of the image processing device 60.

Then, once the user instructs to end the operation guide application software 861 by operating the operation part 34 of the mobile terminal 80, the operation guide application software 861 performs the network setting by having the wireless network information 331A that retreated to RAM in S805 stored again by the wireless network communication part 33 as the wireless network information 331 (S116).

Then, the control part 86 of the mobile terminal 80 ends the operation guide application software 861 (S117).

Here, this sequence ends.

Although explained in this example was the case where the URL information of the manual page MP was registered in the history database 863 as shown in S804, if the URL information of the manual page MP is not registered in the history database 863, the mobile terminal 80 acquires the screen identifier QID by communicating with the image processing device 60. Explained below is the operation in the case where the URL information of the manual page MP is not registered in the history database 863.

Figure 43B:
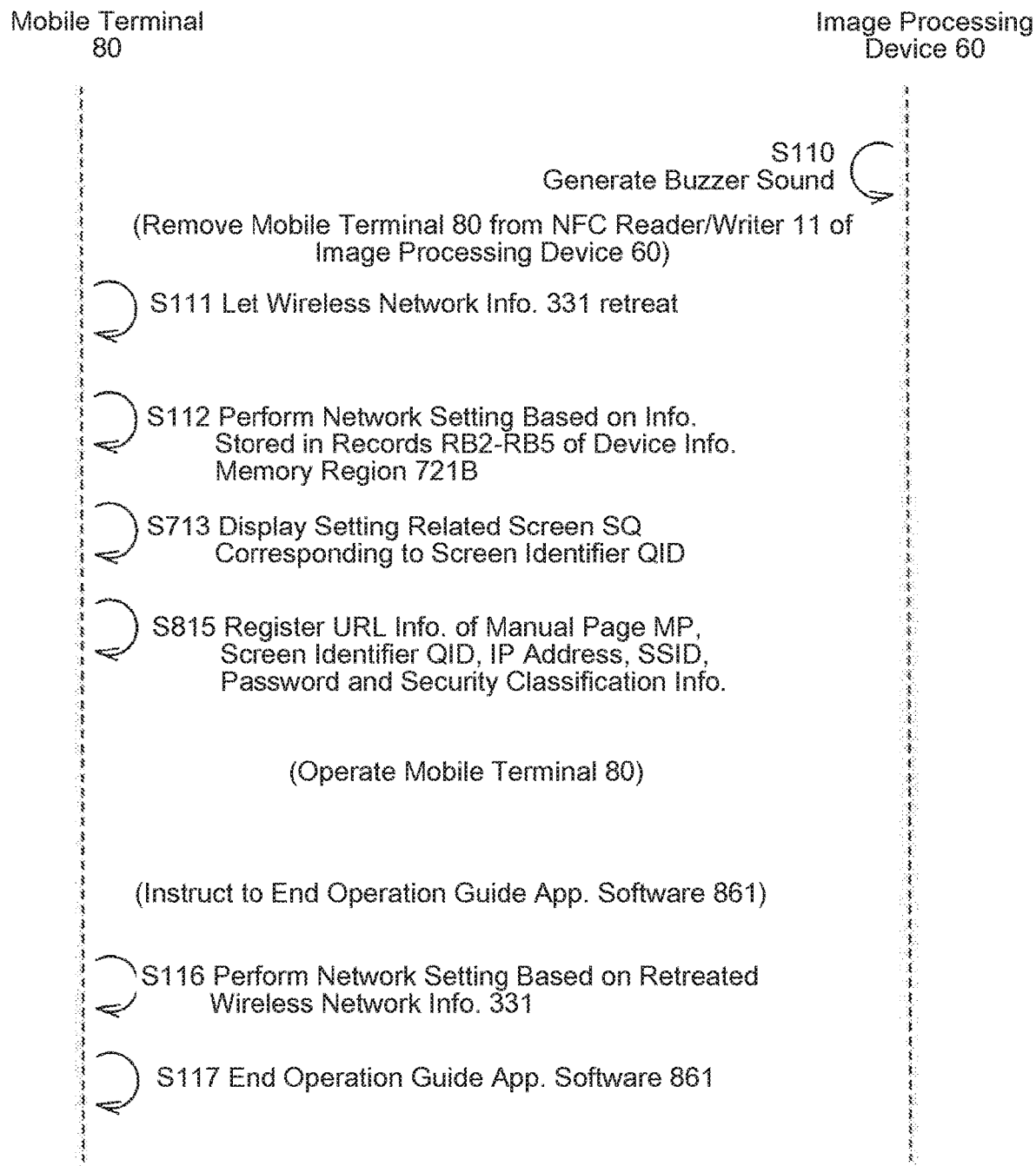
FIG. 43B is another sequence diagram showing another operation example of the information processing system of the fifth embodiment.

FIGS. 43A and 43B show an operation example of the information processing system 5 in the case where the URL information of the manual page MP is not registered in the history database 863. S101-S103, and S803 are the same as in FIG. 42.

If the URL information of the manual page MP is not registered in the history database 863 in S803, the operation guide application software 861 writes the URL information of the manual page MP displayed by the display part 35 to a record RA1, terminal identification information ID of the mobile terminal 80 to a record RA2, and terminal OS information IOS to a record RA3 in a terminal information memory region 721A of an NDEF message region 721 (S814). Then, the operation guide application software 861 deletes all the information stored in a device information memory region 721B of the NDEF message region 721.

Next, the operation guide application software 861 writes the URL information of the manual page MP displayed by the display part 35 to the record RA1, the terminal identification information ID of the mobile terminal 80 to the record RA2, and the terminal OS information IOS to the record RA3 in the terminal information memory region 721A of the NDEF message region 721 (S814). Then, the operation guide application software 861 deletes all the information stored in the device information memory region 721B of the NDEF message region 721.

Next, once the user holds the mobile terminal 80 over an NFC reader/writer 11 of the image processing device 60, a terminal detection part 24 of the image processing device 60 detects the mobile terminal 80 (S105). Then, the NFC reader/writer 11 of the image processing device 60 reads the URL information of the manual page MP stored in the record RA1, the terminal identification information ID stored in the record RA2, and the terminal OS information IOS stored in the record RA3 in the terminal information memory region 721A of the mobile terminal 80 using near field wireless communication C1 (S706).

Next, based on the terminal OS information IOS read in S706, a control part 63 of the image processing device 60 selects one of a setting related page SP and a setting related screen SQ (S707). Below, explained as an example is the case where the control part 63 selected a setting related screen SQ.

Next, if the control part 63 of the image processing device 60 selected a setting related screen SQ based on the terminal OS information IOS in S707, it acquires the screen identifier QID of the setting related screen SQ based on the URL information of the manual page MP and the terminal identification information ID read in S706 (S708).

Next, using the near field wireless communication C1, the NFC reader/writer 11 of the image processing device 60 writes the screen identifier QID of the setting related screen SQ to a record RB1, and an IP address, an SSID, a password, and security classification information to records RB2-RB5, respectively, in the device information memory region 721B of the mobile terminal 80 (S709). Thereby, the screen identifier QID of the setting related screen SQ, the IP address, the SSID, the password, and the security classification information are supplied to the mobile terminal 80 (S710).

Next, the image processing device 60 generates a buzzer sound (S110). Thereby, the image processing device 60 notifies the user that the mobile terminal 80 can be removed from the NFC reader/writer 11. In response to this, the user removes the mobile terminal 80 from the NFC reader/writer 11 of the image processing device 60.

The operation guide application software 861 of the mobile terminal 80 detects that the mobile terminal 80 has been removed from the NFC reader/writer 11, and lets wireless network information 331 stored in the wireless network communication part 33 retreat tentatively to RAM as wireless network information 331A (S111).

Next, based on the information (IP address, SSID, password, and security classification information) stored in the records RB2-RB5 of the device information memory region 721B, the operation guide application software 861 performs the network setting (S112). Thereby, the wireless network communication part 33 hereafter can communicate with the image processing device 60 using the wireless network communication C2.

Next, the display part 35 of the mobile terminal 80 displays the setting related screen SQ corresponding to the screen identifier QID stored in the record RB1 of the device information memory region 721B (S713).

Next, the operation guide application software 861 registers in the history database 863 the URL information of the manual page MP displayed by the display part 35 in S102, and the screen identifier QID, the IP address, the SSID, the password, and the security classification information acquired in S710 in association with each other (S815).

Then, the user operates the operation part 34 of the mobile terminal 80. That is, for example, if the user is an administrator of the image processing device 60, as shown in FIG. 31 for example, the display part 35 displays a device setting screen SQA. In this case, the user instructs to change a device setting by operating the operation part 34. The mobile terminal 80 supplies the device setting change instruction to the image processing device 60, and the device setting management part 15 of the image processing device 60 changes the device setting based on the instruction. In this manner, the user can perform the device setting of the image processing device 60. Also, for example, if the user is a general user of the image processing device 60, as shown in FIG. 32 for example, the display part 35 displays a setting confirmation screen SQB. In this case, the user can confirm a device setting of the image processing device 60.

Then, once the user instructs to end the operation guide application software 861 by operating the operation part 34 of the mobile terminal 80, the operation guide application software 861 performs the network setting by having the wireless network information 331A that retreated to the RAM in S111 stored again by the wireless network communication part 33 as the wireless network information 331 (S116).

Then, the control part 86 of the mobile terminal 80 ends the operation guide application software 861 (S117).

Here, this sequence ends.

Although in this example the control part 63 selected a setting related screen SQ in S707, the case where it selected a setting related page SP is also similar.

In this manner, in the information processing system 5, every time the mobile terminal 80 receives a screen identifier QID from the image processing device 60, it registers in the history database 863 the URL information of a manual page MP and this screen identifier QID in association with each other. Then, the mobile terminal 80 hereafter checks whether the URL information of the manual page MP displayed by the display part 35 is registered in the history database 863, and if the URL information is registered, it displays a setting related screen SQ based on the screen identifier QID corresponding to this URL information. Thereby, in the information processing system 5, the mobile terminal 80 can display the setting related screen SQ corresponding to a frequently-viewed manual page MP without the user holding the mobile terminal 80 over the image processing device 60. Thereby, the user can perform a device setting of the image processing device 60 or confirm a device setting of the image processing device 60 with fewer operations, thereby user's convenience can be enhanced.

Also, in the information processing system 5, when the mobile terminal 80 registers in the history database 863 the URL information of a manual page MP and a screen identifier QID in association with each other, it also registers in the history database 863 an IP address, an SSID, a password, and security classification information that were supplied from the image processing device 60 and are pieces of information used in communicating with the image processing device 60 using the wireless network communication C2. Thereby, in the information processing system 5, the user can perform the network setting for communicating with the frequently-used image processing device 60 without holding the mobile terminal 80 over the image processing device 60. Thereby, the user can perform a device setting of the image processing device 60 or confirm a device setting of the image processing device 60 with fewer operations, thereby user's convenience can be enhanced.

As stated above, in this embodiment, every time the mobile terminal receives a screen identifier from the image processing device, it registers the URL information of a manual page and this screen identifier in association with each other in the history database, and hereafter if the URL information of the manual page displayed by the display part is registered in the history database, it displays a setting related screen based on the screen identifier corresponding to this URL information, thereby user's convenience can be enhanced.

In this embodiment, when the mobile terminal registers the URL information of a manual page and a screen identifier in association with each other in the history database, it also registers in the history database the information that was supplied from the image processing device and is used in communicating with the image processing device using wireless network communication, thereby user's convenience can be enhanced.

[Modification 5-1]

Although in the above-mentioned embodiment, every time the mobile terminal 80 receives the screen identifier QID of a setting related screen SQ from the image processing device 60, it registers in the history database 863 the URL information of the manual page MP and the screen identifier QID in association with each other, this invention is not limited to this. For example, every time the mobile terminal 80 receives the URL information of a setting related page SP from the image processing device 60, it can register the URL information and the URL information of a manual page MP in association with each other in the history database. In this case, the mobile terminal 80 can display the setting related page SP corresponding to the URL information registered in this history database 863 without the user holding the mobile terminal 80 over the image processing device 60.

6. Sixth Embodiment

Next, an information processing system 6 of the sixth embodiment is explained. In this embodiment, based on the model name and the firmware version of an image processing device, and the model name and the firmware version that an operation manual corresponds to, it is judged whether the operation manual corresponds to the image processing device. Note that components that are essentially the same as those in the information processing system 4 of the fourth embodiment mentioned above are given the same codes, and their explanations are omitted as appropriate.

As shown in FIG. 1, the information processing system 6 is provided with an image processing device 90 and a mobile terminal 100. A manual page MP of the operation manual of the image processing device offered by a server device 8 contains information on the model name (model information IM) of the image processing device that the operation manual corresponds to, and information on the firmware version (firmware information IFW) of the image processing device that the operation manual corresponds to. In the information processing system 6, when supplying URL information of the manual page MP to the image processing device 90, the mobile terminal 100 also supplies the model information IM and the firmware information IFW. Based on the model name indicated by this model information IM, the firmware version indicated by the firmware information IFW, and its own model name and firmware version, the image processing device 90 judges whether the operation manual corresponds to the image processing device 90.

Figure 44:
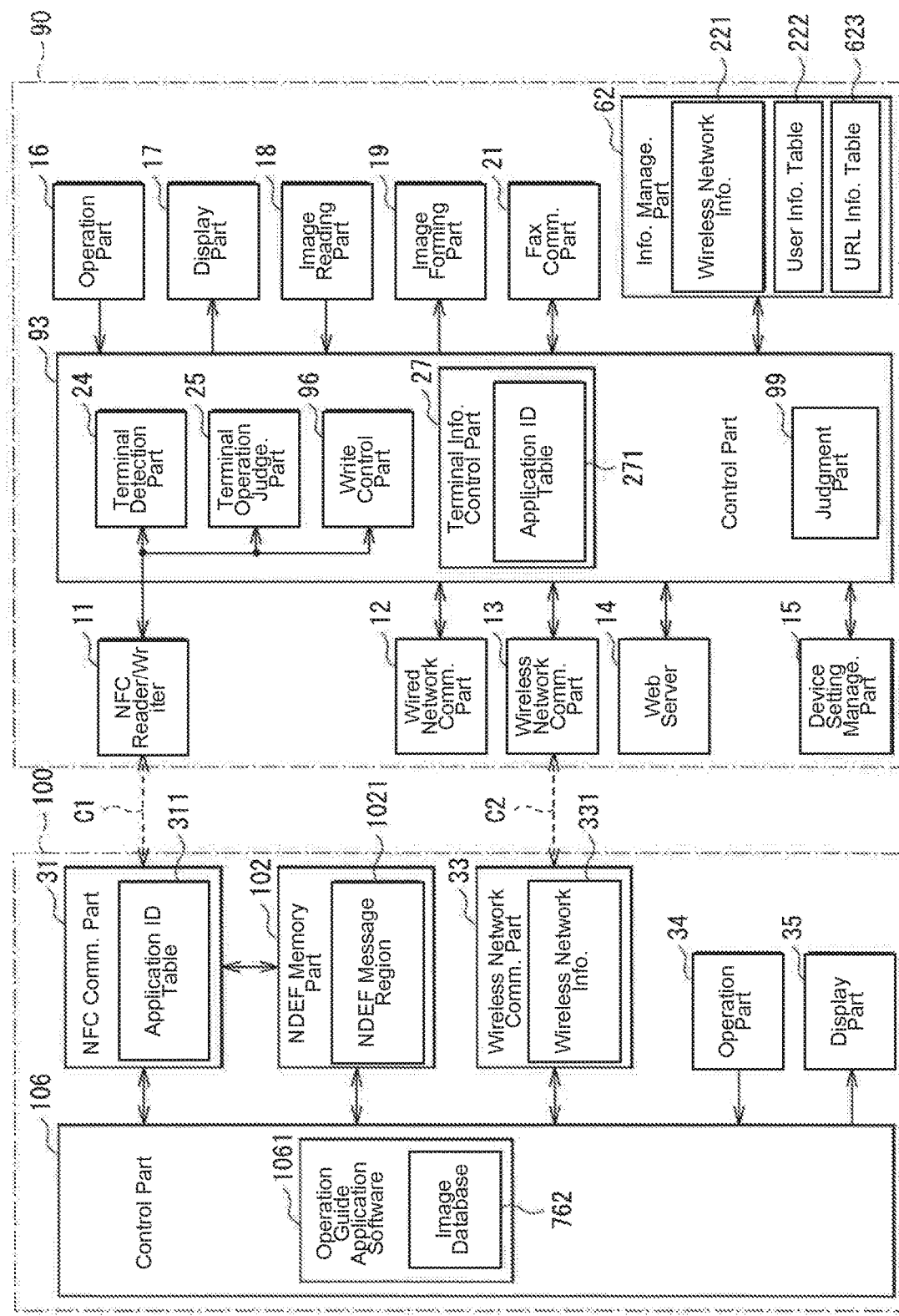
FIG. 44 is a block diagram showing a configuration example of the image processing device and the mobile terminal of the sixth embodiment.

FIG. 44 shows a configuration example of the image processing device 90 and the mobile terminal 100.

The image processing device 90 has a control part 93. The control part 93 has a write control part 96 and a judgment part 99. The write control part 96 performs a write process A2 that writes information to the mobile terminal 100. Based on the model name indicated by the model information IM and the firmware version indicated by the firmware information IFW supplied from the mobile terminal 100, the judgment part 99 judges whether the operation manual corresponds to the image processing device 90.

The mobile terminal 100 has a control part 106 and an NDEF memory part 102.

The control part 106 executes operation guide application software 1061. The operation guide application software 1061 contains an image database 762.

The NDEF memory part 102 stores information exchanged using near field wireless communication C1. Set in the NDEF memory part 102 is an NDEF message region 1021.

Figure 45:
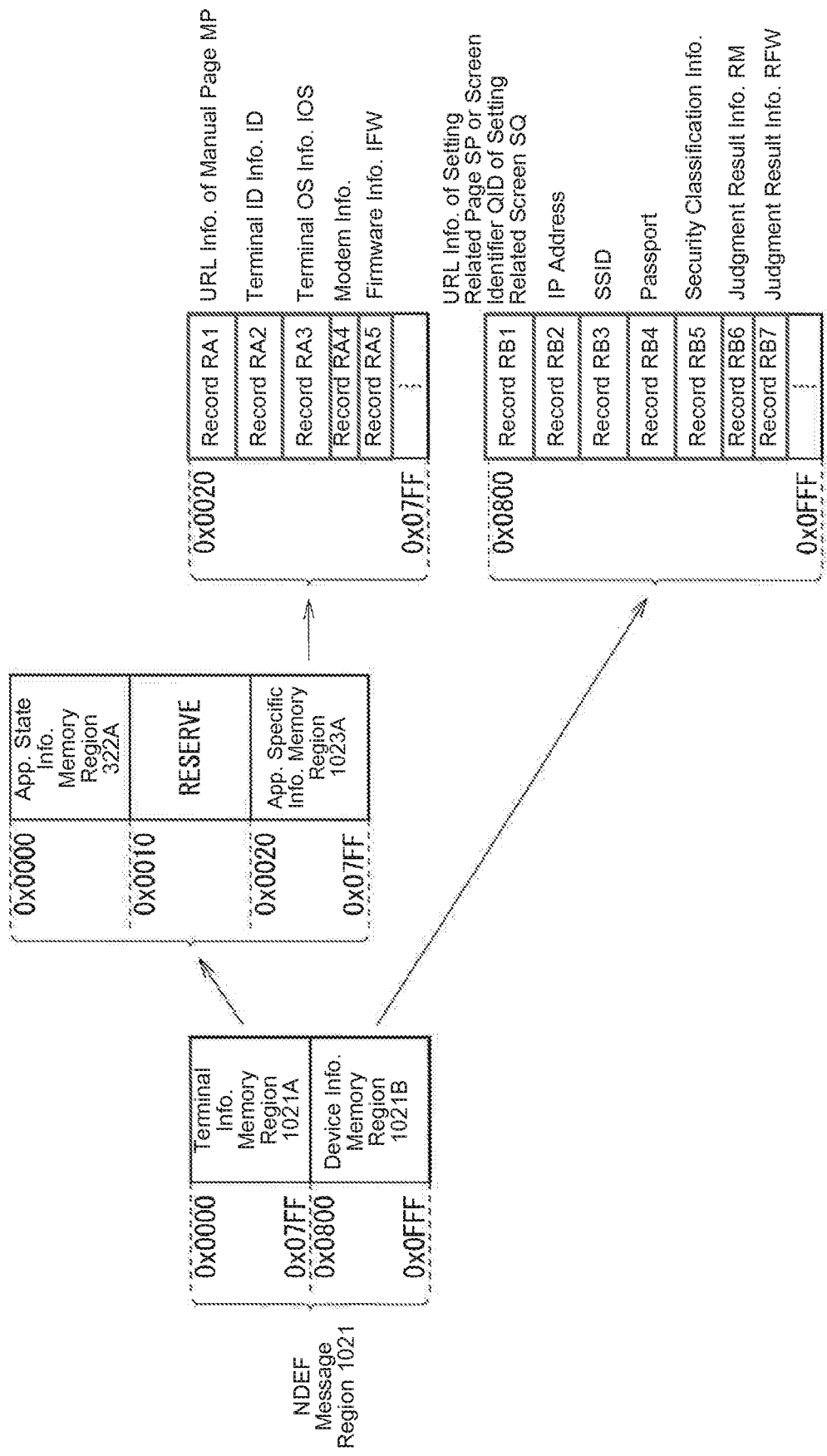
FIG. 45 is an explanatory diagram showing a configuration example of the NDEF message region shown in FIG. 44.

FIG. 45 shows an example of the NDEF message region 1021. The NDEF message region 1021 contains a terminal information memory region 1021A and a device information memory region 1021B.

The terminal information memory region 1021A contains an application specific information memory region 1023A. Stored in a record RA1 of the application specific information memory region 1023A is URL information of a manual page MP, stored in a record RA2 is terminal identification information ID of the mobile terminal 100, stored in a record RA3 is terminal OS information IOS, stored in a record RA4 is the model information IM, and stored in a record RA5 is the firmware information IFW.

Stored in a record RB1 of the device information memory region 1021B is URL information of a setting related page SP (device setting page SPA or setting confirmation page SPB) or a screen identifier QID of a setting related screen SQ (device setting screen SQA or setting confirmation screen SQB), stored in a record RB2 is an IP address, stored in a record RB3 is an SSID, stored in a record RB4 is a password, stored in a record RB5 is security classification information, stored in a record RB6 is judgment result information RM, and stored in a record RB7 is judgment result information RFW. The judgment result information RM contains the judgment result on the model name of the image processing device, and the judgment result information RFW contains the judgment result on the firmware version of the image processing device.

Here, the model information IM and the firmware information IFW correspond to a specific example of the "device information" in this invention.

Figure 46A:
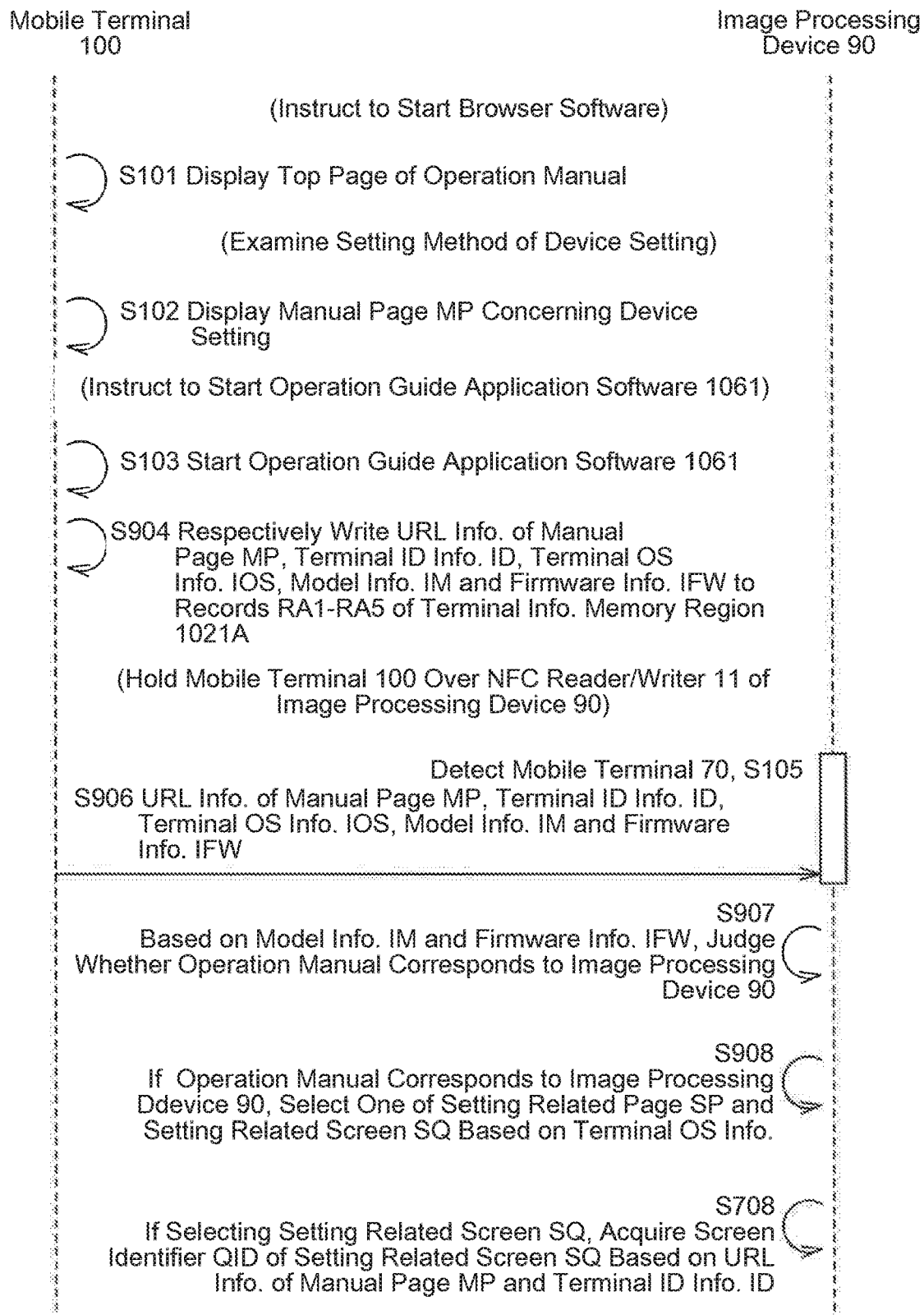
FIG. 46A is a sequence diagram showing an operation example of the information processing system of the sixth embodiment.
Figure 46B:
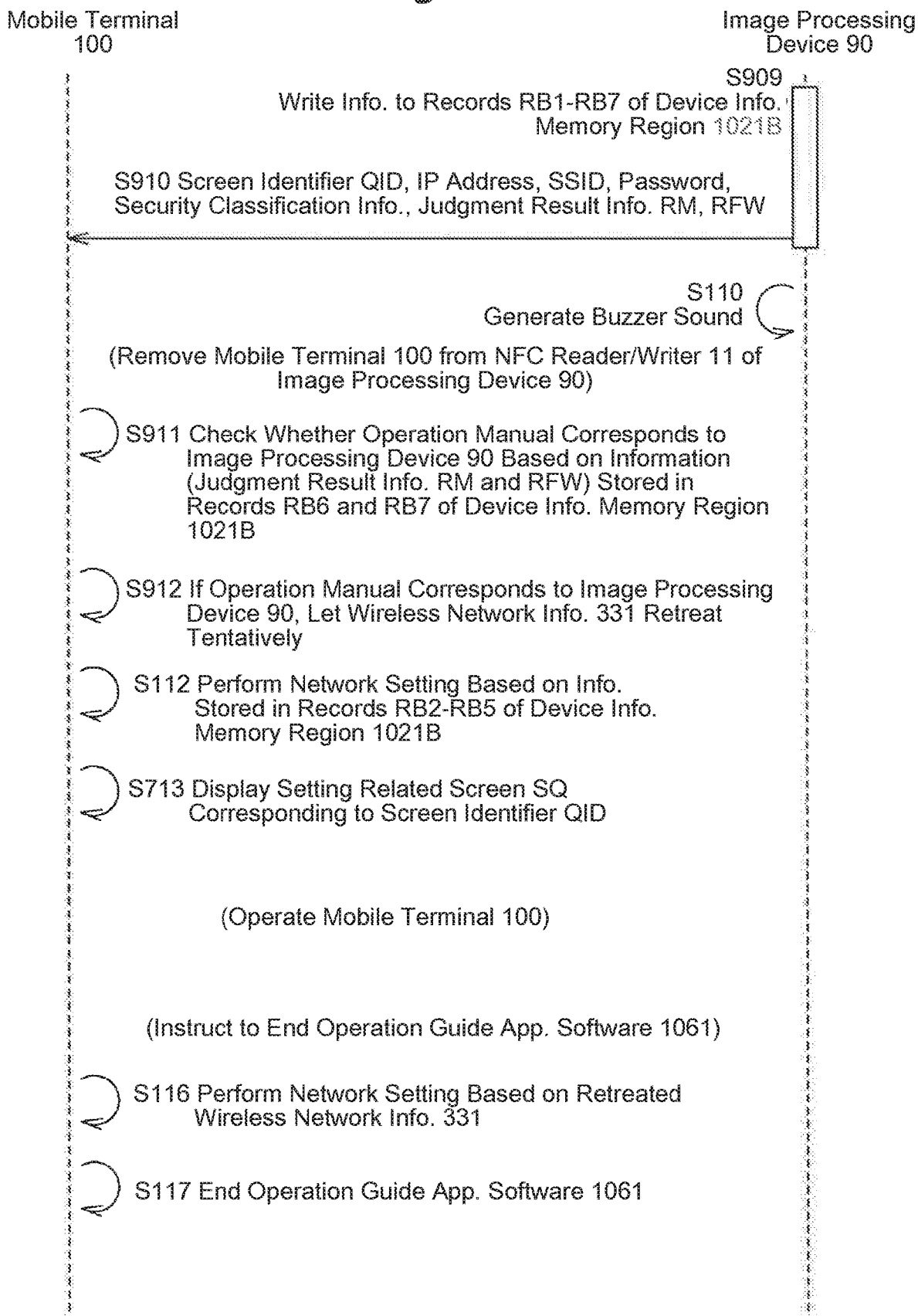
FIG. 46B is another sequence diagram showing an operation example of the information processing system of the sixth embodiment.
Figure 48A:
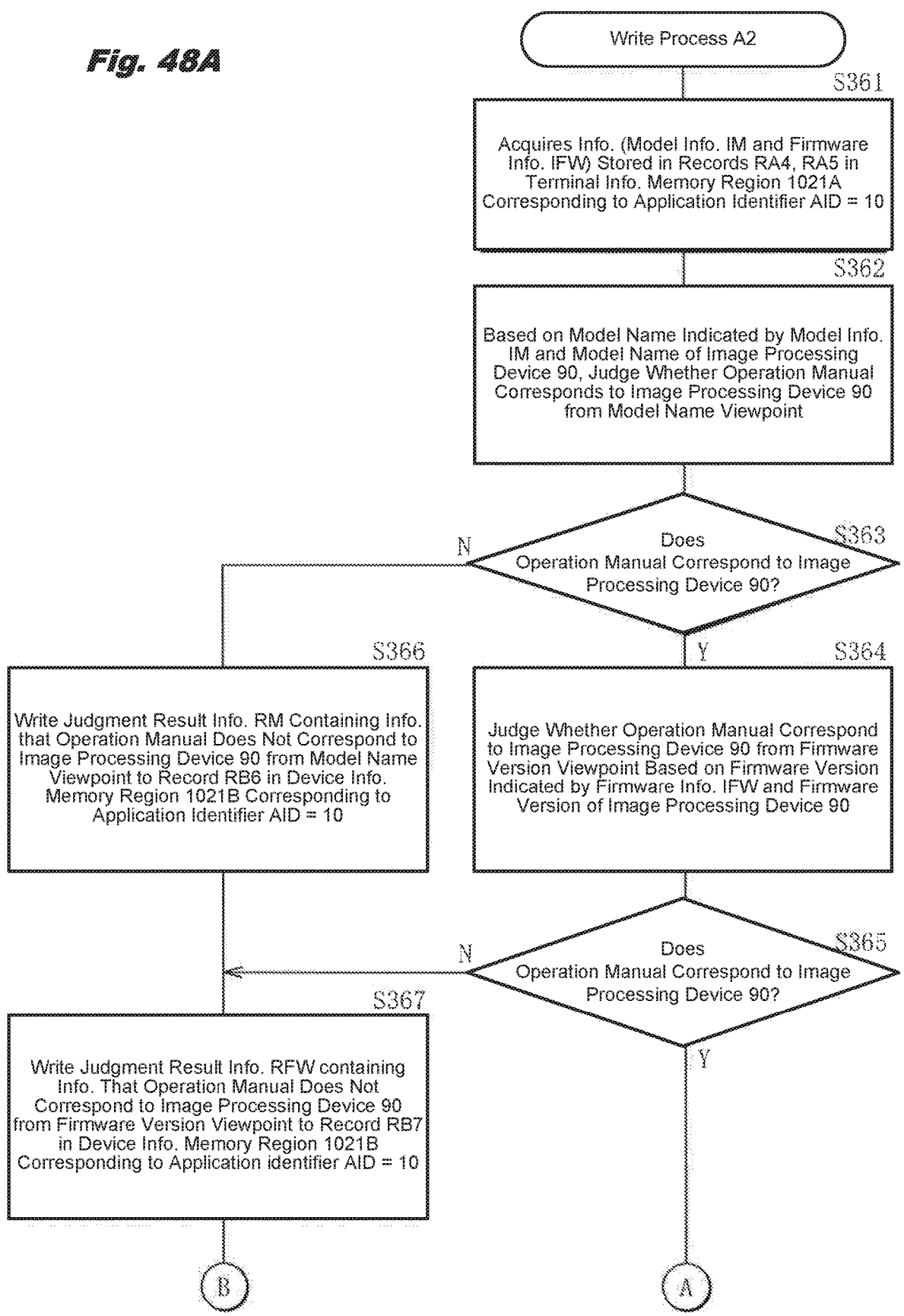
FIG. 48A is a flow chart showing an example of the write process of the sixth embodiment.
Figure 48B:
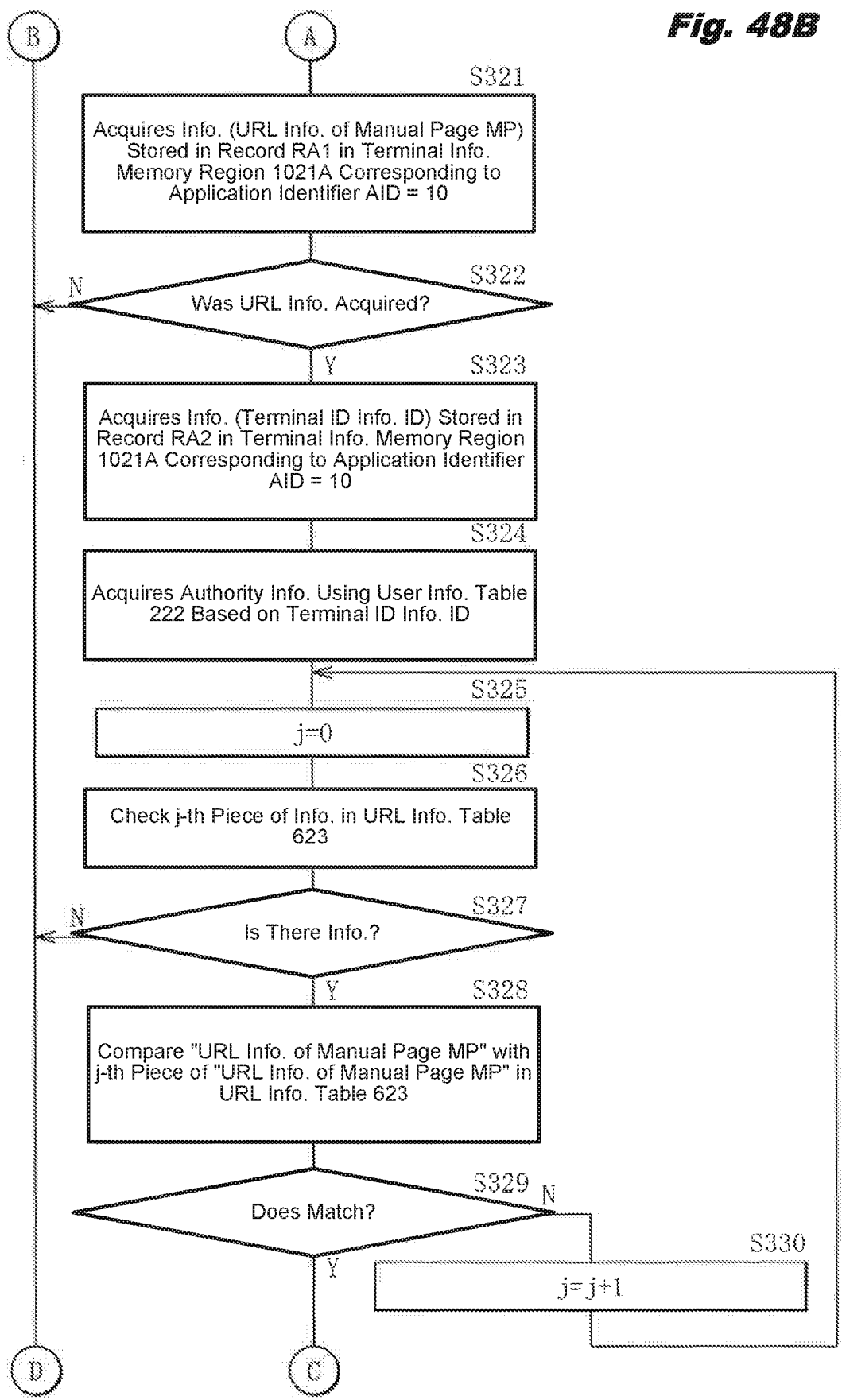
FIG. 48B is another flow chart showing an example of the write process of the sixth embodiment.
Figure 48C:
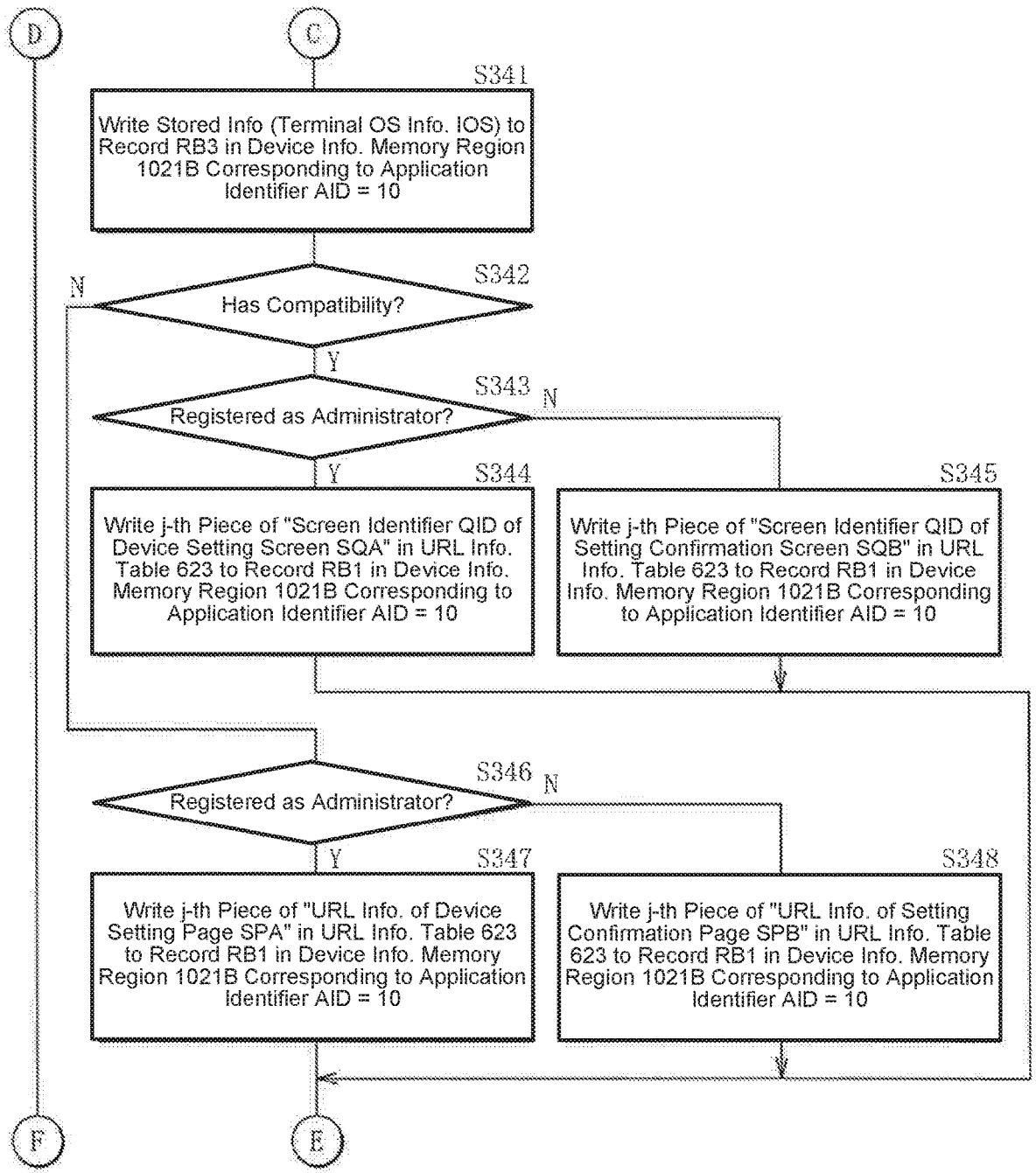
FIG. 48C is another flow chart showing an example of the write process of the sixth embodiment.
Figure 48D:
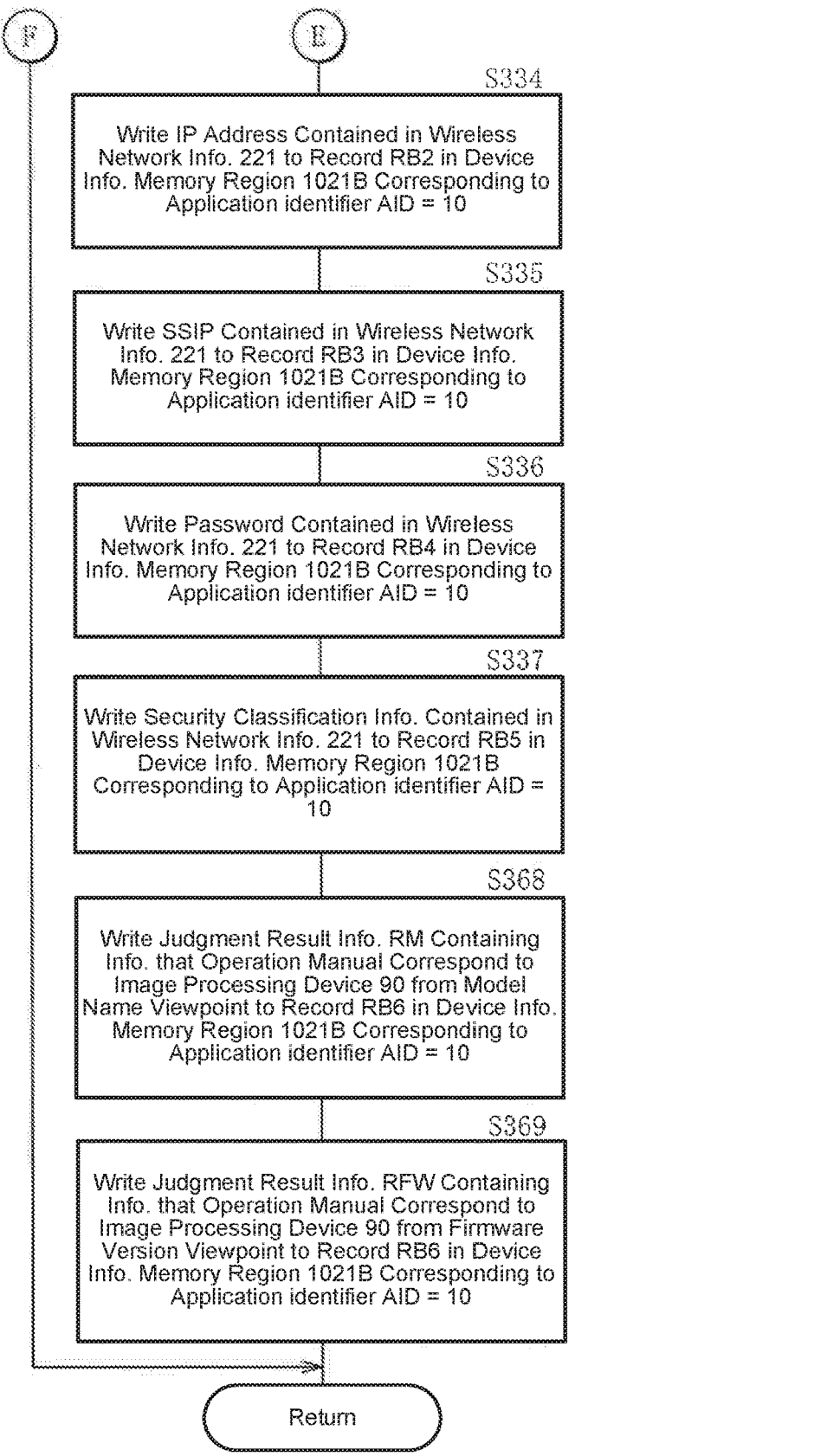
FIG. 48D is another flow chart showing an example of the write process of the sixth embodiment.

FIGS. 46A and 46B show an operation example of the information processing system 6. First of all, once the user instructs to start browser software by operating an operation part 34 of the mobile terminal 100, the display part 35 of the mobile terminal 100 displays the top page of the operation manual of the image processing device 90 (S101). Then, the user examines the setting method of a device setting by continuing to operate the operation part 34 and performing a keyword search in the operation manual for example. Then, as shown in FIG. 2 for example, the display part 35 of the mobile terminal 100 displays a manual page MP concerning the device setting (S102).

Next, once the user instructs to start the operation guide application software 1061, the control part 106 of the mobile terminal 100 starts the operation guide application software 1061 (S103). Then, the operation guide application software 1061 stores, in an application state information memory region 322A in the terminal information memory region 1021A of an NDEF message region 1021 corresponding to the operation guide application software 1061, application state information containing a flag "1" indicating a state where the operation guide application software 1061 is installed and started.

Next, the operation guide application software 1061 writes the URL information of the manual page MP displayed by the display part 35 to a record RA1, the terminal identification information ID of the mobile terminal 100 to a record RA2, the terminal OS information IOS to a record RA3, the model information IM to a record RA4, and the firmware information IFW to a record RA5 in the terminal information memory region 1021A of the NDEF message region 1021 (S904). Then, the operation guide application software 1061 deletes all the information stored in the device information memory region 1021B of the NDEF message region 1021.

Next, once the user holds the mobile terminal 100 over the NFC reader/writer 11 of the image processing device 90, a terminal detection part 24 of the image processing device 90 detects the mobile terminal 100 (S105). Then, using the near field wireless communication C1, the NFC reader/writer 11 of the image processing device 90 reads the URL information of the manual page MP stored in the record RA1, the terminal identification information ID stored in the record RA2, the terminal OS information IOS stored in the record RA3, the model information IM stored in the record RA4, and the firmware information IFW stored in the record RA5 in the terminal information memory region 1021A of the mobile terminal 100 (S906).

Next, based on the model name indicated by the model information IM, the firmware version indicated by the firmware information IFW, and the model name and the firmware version of the image processing device 90, the judgment part 99 of the image processing device 90 judges whether the operation manual corresponds to the image processing device 90 (S907). Specifically, based on the model name indicated by the model information IM, the judgment part 99 judges whether the operation manual corresponds to the image processing device 90 from the model name viewpoint, and based on the firmware version indicated by the firmware information IFW, it judges whether the operation manual corresponds to the image processing device 90 from the firmware version viewpoint. Explained as an example below is the case where the operation manual corresponds to the image processing device 90 in terms of both the model name and the firmware version.

If in S907 the judgment part 99 judges that the operation manual corresponds to the image processing device 90, the control part 93 of the image processing device 90 selects one of a setting related page SP and a setting related screen SQ based on the terminal OS information IOS read in S906 (S908). Explained as an example below is the case where the control part 93 selected a setting related screen SQ.

Next, if the control part 93 of the image processing device 90 selected a setting related screen SQ based on the terminal OS information IOS in S908, it acquires the screen identifier QID of the setting related screen SQ based on the URL information of the manual page MP and the terminal identification information ID read in S906 (S708).

Next, using the near field wireless communication C1, the NFC reader/writer 11 of the image processing device 90 writes the screen identifier QID of the setting related screen SQ to the record RB1, the IP address, the SSID, the password, and the security classification information to the records RB2-RB5, respectively, the judgment result information RM containing the judgment result on the model name of the image processing device to the record RB6, and the judgment result information RFW containing the judgment result on the firmware version of the image processing device to the record RB7 in the device information memory region 1021B of the mobile terminal 100 (S909). This judgment result information RM contains the fact that the operation manual corresponds to the image processing device 90 from the model name viewpoint, and the judgment result information RFW contains the fact that the operation manual corresponds to the image processing device 90 from the firmware version viewpoint. Thereby, the screen identifier QID of the setting related screen SQ, the IP address, the SSID, the password, the security classification information, and the judgment result information RM and RFW are supplied to the mobile terminal 100 (S910).

Next, the image processing device 90 generates a buzzer sound (S110). Thereby, the image processing device 90 notifies the user that the mobile terminal 100 can be removed from the NFC reader/writer 11. In response to this, the user removes the mobile terminal 100 from the NFC reader/writer 11 of the image processing device 90.

Once the operation guide application software 1061 of the mobile terminal 100 detects that the mobile terminal 100 has been removed from the NFC reader/writer 11, it checks whether the operation manual corresponds to the image processing device 90 based on the information (judgment result information RM and RFW) stored in the records RB6 and RB7 of the device information memory region 1021B (S911). In this example, the judgment result information RM contains the fact that the operation manual corresponds to the image processing device 90 from the model name viewpoint, and the judgment result information RFW contains the fact that the operation manual corresponds to the image processing device 90 from the firmware version viewpoint. Therefore, the operation guide application software 1061 confirms that the operation manual corresponds to the image processing device 90.

In this manner, if the operation manual corresponds to the image processing device 90, the operation guide application software 1061 lets wireless network information 331 stored in a wireless network communication part 33 retreat tentatively to RAM as wireless network information 331A (S912).

Next, the operation guide application software 1061 performs the network setting based on the information (IP address, SSID, password, and security classification information) stored in records RB2-RB5 of the device information memory region 1021B (S112). Thereby, the wireless network communication part 33 hereafter can communicate with the image processing device 90 using the wireless network communication C2.

Next, the display part 35 of the mobile terminal 100 displays the setting related screen SQ corresponding to the screen identifier QID stored in the record RB1 of the device information memory region 1021B (S713).

Then, the user operates the operation part 34 of the mobile terminal 100. That is, for example, if the user is an administrator of the image processing device 90, as shown in FIG. 31 for example, the display part 35 displays a device setting screen SQA. In this case, the user instructs to change the device setting by operating the operation part 34. The mobile terminal 100 supplies the device setting change instruction to the image processing device 90, and the device setting management part 15 of the image processing device 90 changes the device setting based on the instruction. In this manner, the user can perform a device setting of the image processing device 90. Also, for example, if the user is a general user of the image processing device 90, as shown in FIG. 32 for example, the display part 35 displays a setting confirmation screen SQB. In this case, the user can confirm a device setting of the image processing device 90.

Then, once the user instructs to end the operation guide application software 1061 by operating the operation part 34 of the mobile terminal 100, the operation guide application software 1061 performs the network setting by having the wireless network information 331A that retreated to the RAM in S111 stored again by the wireless network communication part 33 as the wireless network information 331 (S116).

Then, the control part 106 of the mobile terminal 100 ends the operation guide application software 1061 (S117).

Here, this sequence ends.

Although in this example the control part 93 selected a setting related screen SQ in S908, the case where it selected a setting related page SP is also similar.

Although explained in this example was the case where the operation manual corresponds to the image processing device 90, if the operation manual does not correspond to the image processing device 90, the image processing device 90 provides the mobile terminal 100 with the judgment result information RM and RFW containing the fact that the operation manual does not correspond to the image processing device 90. Explained below is the operation in the case where the operation manual does not correspond to the image processing device 90.

FIGS. 47A and 47B show an operation example of the information processing system 6 in the case where the operation manual does not correspond to the image processing device 90. S101-S103, S904, S105, S906, and S907 are the same as in FIG. 46A.

If in S907 the judgment part 99 has judged that the operation manual does not correspond to the image processing device 90, using the near field wireless communication C1, the NFC reader/writer 11 of the image processing device

90 writes the judgment result information RM containing the judgment result on the model name of the image processing device to the record RB6, and the judgment result information RFW containing the judgment result on the firmware version of the image processing device to the record RB7 in the device information memory region 1021B of the mobile terminal 100 (S917). This judgment result information RM contains the fact that the operation manual does not correspond to the image processing device 90 from the model name viewpoint, and the judgment result information RFW contains the fact that the operation manual does not correspond to the image processing device 90 from the firmware version viewpoint. Thereby, the judgment result information RM and RFW are supplied to the mobile terminal 100 (S918).

Next, the image processing device 90 generates a buzzer sound (S110). Thereby, the image processing device 90 notifies the user that the mobile terminal 100 can be removed from the NFC reader/writer 11. In response to this, the user removes the mobile terminal 100 from the NFC reader/writer 11 of the image processing device 90.

Once the operation guide application software 1061 of the mobile terminal 100 detects that the mobile terminal 100 has been removed from the NFC reader/writer 11, based on the information (judgment result information RM and RFW) stored in the records RB6 and RB7 of the device information memory region 1021B, it checks whether the operation manual corresponds to the image processing device 90 (S919). In this example, the judgment result information RM contains the fact that the operation manual does not correspond to the image processing device 90 from the model name viewpoint, and the judgment result information RFW contains the fact that the operation manual does not correspond to the image processing device 90 from the firmware version viewpoint. Therefore, the operation guide application software 1061 confirms that the operation manual does not correspond to the image processing device 90.

In this manner, if the operation manual does not correspond to the image processing device 90, based on an instruction from the operation guide application software 1061, the display part 35 of the mobile terminal 100 displays a message that this operation manual is not appropriate because the operation manual does not correspond to the image processing device 90 (S920).

The message displayed by the display part 35 can contain the URL information of the operation manual that corresponds to the image processing device 90 for example. By the user operating the part where this URL information is displayed, the mobile terminal 100 can also display a manual page MP of the operation manual that corresponds to the image processing device 90. Thereby, the user can view the manual page MP of the appropriate operation manual.

Also, the message displayed by the display part 35 can contain a message that although the operation manual does not correspond to the image processing device 90, the operation manual can be utilized except for part of the functions.

Then, the control part 106 of the mobile terminal 100 ends the operation guide application software 1061 (S117).

Here, this sequence ends.

S906-S908, S708, S909, and S910 in FIGS. 46A and 46B, and S906, S907, S917, and S918 in FIG. 47A correspond to the write process A2 of the write control part 96. Next, this write process A2 is explained in detail.

FIGS. 48A-48D show an example subroutine of the write process A2 of the write control part 96.

First, the write control part 96 acquires the information stored in the record RA4 (the model information IM) and the information stored in the record RA5 (the firmware information IFW) in the terminal information memory region 1021A of the NDEF message region 1021 corresponding to the application identifier AID=10 (S361).

Next, based on the model name indicated by the model information IM acquired in S361 and the model name of the image processing device 90, the judgment part 99 judges whether the operation manual corresponds to the image processing device 90 from the model name viewpoint (S362). Specifically, for example, the judgment part 99 compares the model name indicated by the model information IM with the model name of the image processing device 90, and if these model names match, it judges that the operation manual corresponds to the image processing device 90.

If the operation manual corresponds to the image processing device 90 from the model name viewpoint ("Y" in S363), the judgment part 99 next judges whether the operation manual corresponds to the image processing device 90 from the firmware version viewpoint based on the firmware version indicated by the firmware information IFW acquired in S361 and the firmware version of the image processing device 90 (S364). Specifically, for example, the judgment part 99 compares the firmware version indicated by the firmware information IFW with the firmware version of the image processing device 90, and if these firmware versions match, it judges that the operation manual corresponds to the image processing device 90 from the firmware version viewpoint.

If the operation manual corresponds to the image processing device 90 from the firmware version viewpoint ("Y" in S365), it proceeds to S321. S321-S330, S341-S348, and S334-S337 are the same as in the fourth embodiment (FIGS. 38A-38C).

Then, following S337 (FIG. 48D), the write control part 96 writes the judgment result information RM containing information that the operation manual corresponds to the image processing device 90 from the model name viewpoint to the record RB6 in the device information memory region 1021B of the NDEF message region 1021 corresponding to the application identifier AID=10 (S368).

Next, the write control part 96 writes the judgment result information RFW containing information that the operation manual corresponds to the image processing device 90 from the firmware version viewpoint to the record RB7 in the device information memory region 1021B of the NDEF message region 1021 corresponding to the application identifier AID=10 (S369).

If in S363 (FIG. 48A) the operation manual does not corresponds to the image processing device 90 from the model name viewpoint ("N" in S363), the write control part 96 writes the judgment result information RM containing information that the operation manual does not correspond to the image processing device 90 from the model name viewpoint to the record RB6 in the device information memory region 1021B of the NDEF message region 1021 corresponding to the application identifier AID=10 (S366). Then, it proceeds to S367.

If in S363 (FIG. 48A) the operation manual does not correspond to the image processing device 90 from the firmware version viewpoint ("N" in S365), the write control part 96 writes the judgment result information RFW containing information that the operation manual does not correspond to the image processing device 90 from the firmware version viewpoint to the record RB7 in the device information memory region 1021B of the NDEF message region 1021 corresponding to the application identifier AID=10 (S367).

Here, this subroutine of the write process A2 ends.

In this manner, in the information processing system 6, based on the model information IM, the image processing device 90 judges whether the operation manual corresponds to the image processing device 90. Thereby, for example, it is possible to reduce the risk that the user becomes confused when performing a device setting of the image processing device 90 by viewing the operation manual of the image processing device of a different model name from the model name of the image processing device 90, therefore user's convenience can be enhanced.

Also, in the information processing system 6, based on the firmware information IFW, the image processing device 90 judges whether the operation manual corresponds to the image processing device 90. Thereby, for example, it is possible to reduce the risk that the user becomes confused when performing a device setting of the image processing device 90 by viewing the operation manual of the image processing device of a different firmware version from the firmware version of the image processing device 90, therefore user's convenience can be enhanced.

As stated above, in this embodiment, the image processing device judges whether the operation manual corresponds to the image processing device based on the model information, therefore user's convenience can be enhanced.

In this embodiment, the image processing device judges whether the operation manual corresponds to the image processing device based on the firmware information, therefore user's convenience can be enhanced.

Although this technology was explained above citing several embodiments and modifications, this technology is not limited to these embodiments etc., but various kinds of modifications are possible.

For example, although the URL information of a manual page MP was supplied to the image processing device by holding the mobile terminal over the NFC reader/writer 11 of the image processing device in the above-mentioned embodiments etc., this invention is not limited to this. Instead, for example, the URL information of the manual page MP can be supplied to the image processing device by operating the operation part of the mobile terminal. Specifically, for example, the URL information of the manual page MP can be supplied to the image processing device by displaying a button on the display part 35 of the mobile terminal and the user operating this button. In this case, using either the near field wireless communication C1 or the wireless network communication C2, the URL information of the manual page MP can be supplied to the image processing device.

For example, although the operation manual was supplied from the server 8 in the above-mentioned embodiments etc., this invention is not limited to this, but instead application software containing the operation manual can be installed in the mobile terminal. In this case, this application software can include the function of the operation guide application software.

Also, for example, although this technology was applied to a multifunction peripheral in the above-mentioned embodiments etc., this invention is not limited to this, but instead it can be applied to a single-function printer etc.

What is claimed is:

1. An information processing system for displaying setting related information at a terminal device based on operation manual information, the terminal device being connected to an information processing device through a network wherein the operation manual information includes a plurality of manual items, and these manual items are concerned with operations performed in the information processing device for processing information, and the setting related information includes a plurality of setting items, and these setting items are concerned with settings used in the information processing device for processing the information, the information processing system, comprising:

the terminal device having a first display part that displays one of the manual items, which is defined as a displayed manual item, the displayed manual item being either pre-stored in the terminal device or distributed through a network from an external server that is not the information processing device, a first communication part that supplies a manual item identifier that identifies the displayed manual item to the information processing device, a first control part that causes the first display part to display the displayed manual item, the information processing device having an information management part that stores corresponding information in which a setting item identifier is related to at least one of the setting items, a second control part that determines the one of the setting items, which is defined as a determined setting item, with the received manual item identifier by referring to the corresponding information, a second communication part that receives the manual item identifier supplied from the terminal device, and supplies setting item information to the terminal device, wherein when receiving the setting item information from the information processing device, the terminal device obtains the setting related information from the network based on the received setting item information, and displays the obtained setting related information at the first display part, when the terminal device is placed within a communicable range of first wireless communication by the second communication part, the first communication part supplies the manual item identifier to the second communication part using the first wireless communication, and the second communication part supplies the determined setting item to the first communication part using second wireless communication.

2. The information processing system according to claim 1, wherein using the first wireless communication, the second communication part further supplies communication setting information for communicating using the second wireless communication to the first communication part, and the first communication part performs a communication setting based on the communication setting information.

3. The information processing system according to claim 1, wherein the setting item information is the determined setting item, the first communication part receives the determined setting item, and the first control part causes the first display part to display the determined setting item.

4. The information processing system according to claim 3, wherein the setting item information is described in an HTML format, and the second control part has a database where the corresponding information is stored, in which the operation manual item identifier and URL information, which is the setting item identifier, corresponding to the determined setting item are stored in association with each other, acquires the URL information utilizing the database based on the operation manual item identifier received by the second communication part, and generates the setting item information based on the URL information.

5. The information processing system according to claim 4, wherein the setting related information further contains setting confirmation information for confirming a device setting of the information processing device, the URL information contains first URL information corresponding to the determined setting item, and second URL information corresponding to the setting confirmation information, the first communication part supplies a terminal identifier corresponding to the terminal device to the second communication part, the second communication part receives the terminal identifier supplied from the terminal device, and the second control part acquires the first URL information or the second URL information utilizing the database based on the operation manual item identifier received by the second communication part and the terminal identifier, and based on the acquired URL information of either the first URL information or the second URL information, generates the determined setting item or the setting confirmation information.

6. The information processing system according to claim 5, wherein the second control part acquires the first URL information utilizing the database if the terminal identifier corresponds to a user who is permitted to perform a device setting of the information processing device, and acquires the second URL information utilizing the database if the terminal identifier corresponds to a user who is prohibited from performing a device setting of the information processing device.

7. The information processing system according to claim 4, wherein stored in the database are the operation manual item identifier, URL information corresponding to the determined setting item and flag information in association with each other, and the second control part selectively generates the determined setting item based on the flag information utilizing the database based on the operation manual item identifier received by the second communication part.

8. The information processing system according to claim 1, wherein the determined setting item contains job setting information for setting jobs executed by the information processing device.

9. The information processing system according to claim 1, wherein the first communication part supplies a platform identifier indicating a platform of the terminal device to the information processing device, the second communication part receives the platform identifier supplied from the terminal device, and the second control part generates the setting item information corresponding to the operation manual item identifier based on the operation manual item identifier and the platform identifier received by the second communication part.

10. The information processing system according to claim 9, wherein the second control part generates either the determined setting item corresponding to the operation manual item identifier or the first screen identifier corresponding to the operation manual item identifier as the setting item information based on the platform identifier, and the first control part causes the first display part to display the determined setting item if the first communication part receives the setting item information, and causes the first display part to display the first setting related screen corresponding to the first screen identifier if the first communication part receives the first screen identifier.

11. The information processing system according to claim 10, wherein the determined setting item is described in an HTML format, and the second control part has a database where the operation manual item identifier, URL information corresponding to the determined setting item, and the first screen identifier are stored in association with each other, acquires the URL information or the first screen identifier utilizing the database based on the operation manual item identifier and the platform identifier received by the second communication part, and if the URL information is acquired, generates the determined setting item based on the URL information.

12. The information processing system according to claim 10, wherein the platform identifier is an identifier of an operating system used in the terminal device, and the second control part generates the first screen identifier as the setting item information if the operating system used in the terminal device and an operating system of the information processing device have compatibility with each other, and generates the determined setting item as the setting item information if these operating systems used in the terminal device and the information processing system have no compatibility with each other.

13. The information processing system according to claim 1, wherein the terminal device further has an operation part that receives user's operations, the determined setting item contains device setting information for performing a device setting of the information processing device, and while the first display part is displaying the device setting information, the first communication part further supplies a device setting instruction to the second communication part based on an instruction from the operation part, which is generated by the user's operations.

14. The information processing system according to claim 1, wherein
the first display part further displays second explanatory information of the information processing device, and second setting related information corresponding to the second explanatory information,
the first communication part further supplies a second information identifier corresponding to the second explanatory information displayed by the first display part to the information processing device, and receives second information corresponding to the second information identifier supplied from the information processing device, and
the control part further causes the first display part to display the second setting related information based on the second information corresponding to the second information identifier received by the first communication part.

15. A display method for displaying setting related information of an information processing device at a terminal device based on operation manual information of the information processing device, the operation manual information being displayed at the terminal device, wherein
the operation manual information includes a plurality of operation manual items, and these operation manual items are concerned with a screen that explains operations performed by a user who operates the information processing device for processing information, and
the setting related information includes a plurality of setting items, and these setting items are concerned with a setting change screen in which the user is able to change a device setting of the information processing device for processing the information,
the display method, comprising:
i) displaying one of the operation manual items included in the operation manual information, which is defined as a displayed operation manual item, at the terminal device, the displayed operation manual item being either pre-stored in the terminal device or distributed through a network from an external server that is not the information processing device,
ii) supplying an operation manual item identifier that identifies the displayed operation manual item displayed at the terminal device to the information processing device,
iii) receiving the operation manual item identifier, then determining one of the setting items at the information processing device, which is defined as a determined setting item, by referring to corresponding information in which the operation manual item identifier, which is able to identify the operation manual item that is displayed in the terminal device, is related to at least the determined setting item, and supplying setting item information, which indicates the determined setting item, to the terminal device,
iv) receiving the setting item information, then obtaining the setting related information from the network based on the received setting item information, and displaying the setting related information, which is obtained based on the displayed operation manual item, at the terminal device, and
v) receiving a change of the device setting with respect to the determined setting item included in the setting related information displayed at the terminal device, and
the step ii), at which the operation manual item identifier is supplied to the information process device, is executed when the terminal device is placed within a communicable range of first wireless communication by the information processing device, and
the step iii), at which the setting item information indicating the determined setting item is supplied to the terminal device, is executed through second wireless communication.

16. The display method of claim 15, wherein
each of the operation manual items is segmented by page, which is determined as a manual page,
each of the setting items is segmented by page, which is determined as a setting page, and
some of the manual pages are related to the setting pages.

17. The display method of claim 16, wherein
some of the manual pages are not related to any of the setting pages.

18. The display method of claim 15, wherein
the information processing device has a display part through which the user inputs a setting data of the device setting, the display method, further comprising:
keeping the display part of the information processing device in a lock state so that the user is not able to input the setting data while the terminal device displays the obtained setting related information.

19. The display method of claim 15, wherein
the terminal device has a first display part and the information processing device has a second display part, the display method, further comprising:
selecting which of the terminal device or the information processing device displays the obtained setting related information by referring to a flag stored in the corresponding information, and
when the terminal device is selected, displaying the obtained setting related information at the first display part,
when the information processing device is selected, obtaining the setting related information at the information processing device from the network based on the setting item information, and displaying the obtained setting related information at the second display part.

20. The display method of claim 15, wherein
the operation manual item identifier is supplied to the information processing device through a network path, and
the network path is different from the network through which the setting item information is supplied to the terminal device.

21. The display method of claim 15, wherein
the information processing device further stores authority information in which user IDs, which identify users who are authorised to edit the settings of the information processing device, are stored, the display method, further comprising:
receiving a user ID at the information processing device from the terminal device, and
determining whether or not the user ID is stored in the authority information,
when the user ID matches the authority information, displaying a device setting page (SPA), which is related to the determined setting item, so that the user is allowed to edit the settings of the information processing device,
when the user ID is not stored in the authority information, displaying a setting confirmation page (SPB), which is related to the determined setting item, so that the user is not allowed to edit the settings of the information processing device.

22. The display method of claim 15, wherein
the terminal device has a first display part and the information processing device has a second display part, the display method, further comprising:
determining a type of operating system that runs in the terminal device,
determining a display part for displaying the determined setting item between the first and second display parts based on the type of the operating system, wherein
when the first display part is determined, the determined setting item is displayed at the first display part, and
when the second display part is determined, the determined setting item is displayed at the second display part, not being displayed at the first display part.

* * * * *